INVENTORS J. F. RETTIG
N. A. RIEDEL
U. K. STAGG JR.
A. R. TRUMBULL
BY S E Hollander
ATTORNEY Aug. 8, 1967

J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 5

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 11

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 12

Aug. 8, 1967 J. F. RETTIG ET AL 3,335,230

EQUIPMENT FOR VERIFYING LINE CONCENTRATOR CIRCUIT OPERATIONS

Filed Feb. 14, 1964 51 Sheets-Sheet 15

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 17

Aug. 8, 1967 J. F. RETTIG ET AL 3,335,230

EQUIPMENT FOR VERIFYING LINE CONCENTRATOR CIRCUIT OPERATIONS

Filed Feb. 14, 1964 51 Sheets-Sheet 19

Aug. 8, 1967 J. F. RETTIG ET AL 3,335,230

EQUIPMENT FOR VERIFYING LINE CONCENTRATOR CIRCUIT OPERATIONS

Filed Feb. 14, 1964 51 Sheets-Sheet 23

Aug. 8, 1967

J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 26

Aug. 8, 1967 J. F. RETTIG ET AL 3,335,230

EQUIPMENT FOR VERIFYING LINE CONCENTRATOR CIRCUIT OPERATIONS

Filed Feb. 14, 1964 51 Sheets-Sheet 27

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 33

FIG. 33 REGISTER CCT.

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 37

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 3

Aug. 8, 1967

J. F. RETTIG ET AL

EQUIPMENT FOR VERIFYING LINE CONCENTRATOR CIRCUIT OPERATIONS 3,335,230

Filed Feb. 14, 1964

51 Sheets-Sheet 41

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 42

Aug. 8, 1967

J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 43

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 44

ONE INPUT OR NOT GATE

TWO INPUT OR NOT GATE

MULTI-INPUT OR NOT GATE

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 49

Aug. 8, 1967 J. F. RETTIG ET AL 3,335,230

EQUIPMENT FOR VERIFYING LINE CONCENTRATOR CIRCUIT OPERATIONS

Filed Feb. 14, 1964

51 Sheets-Sheet 50

SEND FILTER

MODULATOR

POWER AMPLIFIER

United States Patent Office 3,335,230
Patented Aug. 8, 1967

3,335,230
EQUIPMENT FOR VERIFYING LINE CONCENTRATION CIRCUIT OPERATIONS

John F. Rettig, Columbus, Nelson A. Riedel, Whitehall, and Uberto K. Stagg, Jr., and Allan R. Trumbull, Columbus, Ohio, assignors to Bell Telephone Laboratories, Incorporated, New York, N.Y., a corporation of New York Filed Feb. 14, 1964, Ser. No. 344,980
22 Claims. (Cl. 179—18)

ABSTRACT OF THE DISCLOSURE

A system is disclosed for interconnecting a number of telephone lines at a remote switching unit to a central office using a lesser number of trunks on a shared basis. Such connections are established at the remote and central office through crossbar switch networks under control of both electromagnetic and electronic switching facilities. This system employs "delay disconnect" operation in which trunks remain connected to lines after a call until needed to serve new connections. It also includes trunk and call preference circuitry, a separate communication channel for transmitting mark and space frequency signals between the remote and central office and apparatus for verifying proper trunk-to-line connections.

This invention relates to telephone line concentrator systems and more particularly to concentrator systems including delayed disconnect features.

Telephone line concentrators are useful in reducing the total number of connections required between a group of remote substations and a telephone office. By terminating the lines at locations remote from the office and "concentrating" those lines over a smaller number of trunks extending to the office in a ratio, for example, of five lines to one trunk, significant savings can be effected.

Certain prior art concentrators employ the so-called "delayed disconnect" technique wherein when a line is extended over a trunk to a central office and the conversation has terminated, the line-to-trunk connection is not necessarily broken. Instead, the connection is allowed to remain and the path is disconnected at a later time when the trunk is required to service another call, i.e., there is a delayed disconnection of the line-to-trunk path. The advantages inherent in such an arrangement include the capability of continuing partial operation of the lines connected to the concentrator in the event of a failure of the control equipment in the concentrator. In addition, since the trunks remain connected to specific lines previously used in conversation connections, a recall (a second call) by a particular line can be effected more rapidly since the line is directly connected over a trunk to its unique position or termination at the distant office.

In some prior art arrangements, it has been the practice to preselect a particular trunk for utilization on the next succeeding service request or terminating call. Since the identity of the trunk to be used is thus known beforehand, it is possible to effect a connection at the remote unit between the line and the preselected trunk immediately upon the origination of a service request call at the remote unit. Although advantageous, operative and useful, it is possible for certain difficulties to ensue in such a procedure.

For example, it may be assumed that substation 3 at a remote unit is initiating a call to a distant customer. Upon the detection of the service request signal at the remote unit, the control unit of the concentrator at the central office may respond to effect a connection between the preselected trunk at the control unit and the line termination in the central office unique to the calling line. Concurrently, the remote unit may operate to extend a connection between the calling line 3 and the previously selected trunk, e.g., trunk 5. Thereafter the remote unit transmits a "successful closure" signal to the control unit indicating that the line has been connected to the trunk. However, although it is possible to verify that the remote unit line has been connected to a trunk, it is not always feasible to insure that the calling line has been connected to the preselected trunk or indeed to the same trunk to which the control unit has extended a connection. Since the remote unit of the concentrator and the control unit communicate with each other over signal control paths, additional possibilities for error are introduced. The problem is compounded by the nature of telephone concentrator operation and delayed disconnect procedures.

Thus, if in the assumed example, the subscriber at substation 3 is not connected to preselected trunk 5 but instead to trunk 7, whereas the termination unique to the substation at the office is correctly connected to trunk 5, no complete path will extend through the system between the calling substation and the central office. Particularly where the switching apparatus may be of the magnetic latching type, it is possible for the calling substation to be connected at the remote unit to the incorrect trunk which is "open ended" at the control unit and as a result does not receive dial tone. Moreover, in view of the closure of the crosspoint contacts in the remote concentrator, the substation line is disconnected from the usual sensory equipment (e.g., line relay) at the remote unit and his line may be completely "dead"—no dial tone and no sidetone. If the customer receiving no dial tone replaces his receiver in order to effect another call, his line will, disconcertingly, remain dead—in consequence of the delayed disconnect philosophy in which the line remains connected to the trunk after a conversation has been completed.

It is therefore an object of this invention to provide for the verification of a line-to-trunk connection to insure that the remote unit is connected to the correct trunk.

An additional object of this invention is to provide for the transmission of the identity of the trunk to be utilized in a connection to a distant concentrator unit for comparison with the identity of the trunk actually utilized in completing the call.

In general, prior art line concentrators have been expressly designed to service telephone customers by effecting speech communication paths among the customers. However, the transmission of data signals is receiving increasingly greater attention from telephone switching technologists and it has been reliably predicted that data transmission volume will exceed speech transmission volume in less than a decade.

If the nature of data transmission is examined, it may be seen that the duration of a particular data connection may in some instances be a matter of seconds, for example, fifty-five seconds. During this period a data machine at the particular location may transmit data to a memory or store at a distant location at a high rate of speed. Since the transmitter and receiver may conceivably be several hundred miles distant from each other, toll facilities or other expensive communication channels may be involved. As a result, the utilization of some conventional prior art concentrators for data concentration purposes might prove economically unsuitable. This is attributable to the "call setup" time of prior concentrators which may, for example, approach several seconds. Under these conditions the time during which the toll channels are seized merely for the purpose of setting up the call may approach the same order of magnitude as the time utilized in actual data transmission. The unique disadvantage of such an arrangement is manifest as shown in the following example.

It may be assumed that a concentrator provides service to an airline having a central or national reservation center which includes a computer having sufficient memory facilities to catalogue the flights (and reservations on those flights) of the entire airline. Thus, for example, a ticket agent in Boston will be able to transmit signals to the centralized computer facilities in New York requesting a flight reservation from the data substation in Boston. In New York, the data signals are reconverted by a data substation receiver to impulses which are compatible with the computer itself. The computer will examine its stored reservation information in the memory portion of the computer to ascertain if space is available on the desired flight and will transmit the answer back to the inquiring airline ticket agent. It is expected that the elapsed time for transmission of the answer to the ticket agent will be only a matter of seconds.

Thus, as indicated from the airline reservation hypothetical example illustrated above, it is apparent that the data transmission line between New York and Boston will be utilized only for a few seconds in distinction to a voice transmission arrangement in which conversations are of necessity of much longer duration. In consequence, a prior art telephone switching arrangement which requires several seconds or more to establish a connection which only lasts a few seconds would appear economically inefficient. This is particularly the case in the airlines reservation system where a high volume of individual inquiries by the agents throughout the country are continuously being forwarded to the centralized memory facilities. It is apparent that a switching arrangement which requires minimum time to complete the connection is necessary.

It is therefore an additional object of this invention to provide data line concentrating facilities including arrangements for minimizing concentrator call setup time.

These and other objects and features of the invention are achieved in a specific illustrative embodiment in which data substation lines are concentrated at a remote location and extended to the terminating central office over shared channels or trunks. In the present arrangement and in view of the likelihood that computers or other data originating devices may be separated from each other by extreme distances, for example hundreds of miles, the facilities have been designed to permit transmission over extended paths.

The arrangement includes two remote concentrator units at which the data lines are terminated and a single control unit at the central office for governing the operation of both remote units. Broadly, the configuration includes a convergence from approximately eighty lines at each remote unit to sixteen trunks coupling each unit to the control unit at the office. A divergence takes place at the office through a switching network whereby the lines are re-expanded to a number of terminations equal in number to the number of lines.

In order to effect a rapid interconnection of the calling line to the office and in view of the necessity for extensive control signaling traffic between the remote units and the control unit, electronic logic and buffer circuitry are utilized in the remote units and the control unit in conjunction with high speed electronic signaling equipment.

Thus, although rugged and reliable electromechanical crossbar switching equipment is employed to actually effect the line-to-trunk connection, the control signaling and the processing of the control signaling is done electronically. In consequence, the control steps necessary to effect a call may in large measure be done at microsecond rates by the electronic circuitry in lieu of the much longer times required for electromechanical signaling and control circuitry.

A typical service request call from a substation connected to a remote unit is initiated by an off-hook condition at the remote substation. Facilities are provided for identifying the line requesting service and delivering the line identity to an electronic shift register. Upon appropriate storage of the line information, the high speed signaling circuit is energized and the line information stored in the shift register is transmitted to a corresponding shift register control unit in seriatim, and a crosspoint is operated at the remote unit coupling the preselected trunk to the service requesting line.

When the control unit receives the first pulse (preliminary pulse) transmitted by the remote unit, it stores the type of call being originated—in this case a service request. When the last bit of line information is received in the shift register at the control unit, a signal is delivered to the electromechanical equipment in the control unit which causes the line information stored in the shift register to be transferred to a relay register and a crosspoint in the switching network at the control unit to be operated thereby effecting a connection from the line termination unique to the service requesting line to the preselected trunk.

When the control unit has completed its connection to the line, the number of the trunk actually employed to effect the connection is delivered to the shift register.

Subsequently this information is forwarded by the electronic signaling circuitry to the corresponding shift register at the remote unit. When it has has been determined that the entire trunk identity has been received in the shift register at the remote unit, logic circuitry thereat controls its transfer to the electromechanical registers in the remote unit. Equipment in the electromechanical control circuitry at the remote unit accepts the trunk number transmitted from the control unit and compares it with the trunk number stored in the remote unit indicating the trunk utilized in extending the line connection at the remote unit. In this manner the actual connection of the remote line and its corresponding office termination to the same trunk are ascertained.

When the vertification is complete, a signal is returned to the control unit preparing the circuit for release. A signal is delivered to the remote unit causing release of the equipment thereat and a check signal is returned to the control unit, in turn causing the release of the control unit equipment.

On a terminating call to a line connected to the remote unit, the operation at the control unit is initiated when, in the conventional manner, a ground condition is applied to the sleeve conductor of the called line. A relay is operated in consequence of the signal applied to the sleeve conductor and, in turn, operates other relays which identify the called line number and register the line identity in the electromechanical equipment. The information thus stored in the electromechanical equipment is delivered to the electronic shift register in the control unit for transmission. In addition to the line identification, the type of call (terminating call) together with a preliminary pulse are stored. In addition, a crosspoint is operated at the remote unit to couple the preselected trunk to the called line termination.

In response to a signal from the electromechanical equipment, the electronic shift register transmits its contents to its companion shift register at the remote unit associated with the called line.

At the remote unit, the information thus transmitted is transferred to the electromechanical or relay registers. In response to the particular line identity, a hold magnet is operated in the remote unit to couple the called line to the preselected trunk.

At this time, and in order to verify that the trunk actually utilized for extending the connection at the remote unit is the same trunk utilized at the control unit, arrangements are provided for delivering the identity of the trunk actually connected at the remote unit to the shift register thereat. The trunk information is transmitted from the remote unit to the control unit where it is stored in the shift register and ultimately delivered in parallel to the electromechanical equipment at the control unit. The identity of the trunk thus received is compared with the trunk used on the connection at the control unit and if a verification of correctness is effected, a release signal is delivered to the remote unit. When the equipment at the remote unit is released, a check signal is delivered to the control unit, in turn causing the equipment thereat to release.

Since delayed disconnect facilities are employed wherein a line remains connected to a trunk after the conclusion of conversation and when the substation goes on hook, a disconnect call must be made after each service request or terminating call. In short, the sixteen trunks which couple each remote unit to the control unit are arranged in order that fifteen of the sixteen are always connected to lines. The sixteenth trunk is a preselected trunk available for use on the next service request or terminating call. Thus, on each call whether service request or terminating, all sixteen trunks are engaged. It is, therefore, necessary to detect an idle trunk among the sixteen and prepare it for disconnection from the idle line.

The procedure utilized on a disconnect call is similar to that required for a terminating call with the exception that the identity of the line need not be transmitted and instead the identity of the trunk to be disconnected at the remote unit is transmitted. The checking or comparison of the actual trunk disconnected at the remote unit with that disconnected at the control unit is performed in a manner also similar to that described above.

A feature of this invention includes facilities for verifying the connection of a line to a particular preselected trunk at the remote unit.

Another feature of this invention includes arrangements for verifying the connection of a line termination at the central office unique to a concentrator line to a particular preselected trunk.

Still another feature of this invention includes arrangements for verifying that a line is connected to a trunk at a remote unit and the corresponding line termination at the central office is connected to the same trunk in the control unit.

A further feature of this invention includes arrangements for preselecting an idle trunk after each service request and terminating call.

An additional feature of this invention includes facilities for disconnecting a preselected idle trunk after each service request and terminating call.

An additional feature of this invention includes shift register circuitry for storing information respecting line and trunk identities in parallel form and for transmitting the information thus stored in serial form.

Another feature of this invention includes shift register apparatus for receiving information in serial form respecting line and trunk identities and for discharging the information thus received in parallel form.

Still another feature of this invention includes arrangements for maintaining all but one of the trunks in the concentrator connected to lines independent of the off-hook or on-hook condition of these lines.

Still another feature includes arrangements for signaling between concentrator units through the use of two-out-of-five code frequency shift pulsing techniques.

A further feature of this invention includes arrangements for maintaining at least one frequency on control conductors extending between the remote units during standby conditions.

A further feature of this invention includes arrangements for transmitting supervisory signals between the distant units by removing all signal frequencies from the control conductors.

These and other objects and features of the invention may be more readily apprehended from an examination of the following specification, appended claims and attached drawing in which:

FIGS. 1A–1D include a specific illustrative embodiment of the invention in outline form;

FIGS. 2–3 show the crossbar switches of the magnetic latching type for the remote unit;

Figure 1A:
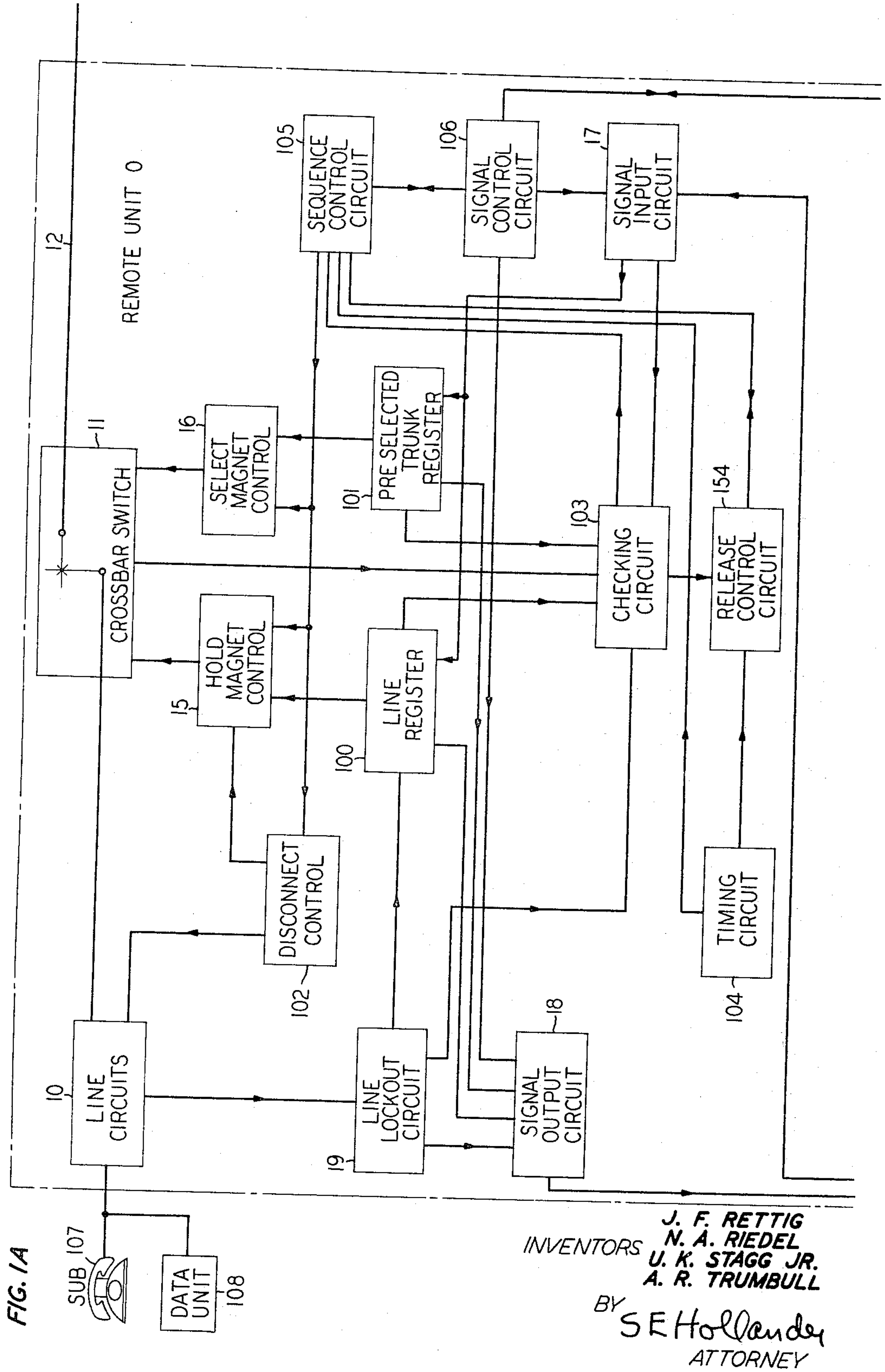
Figure 1B:
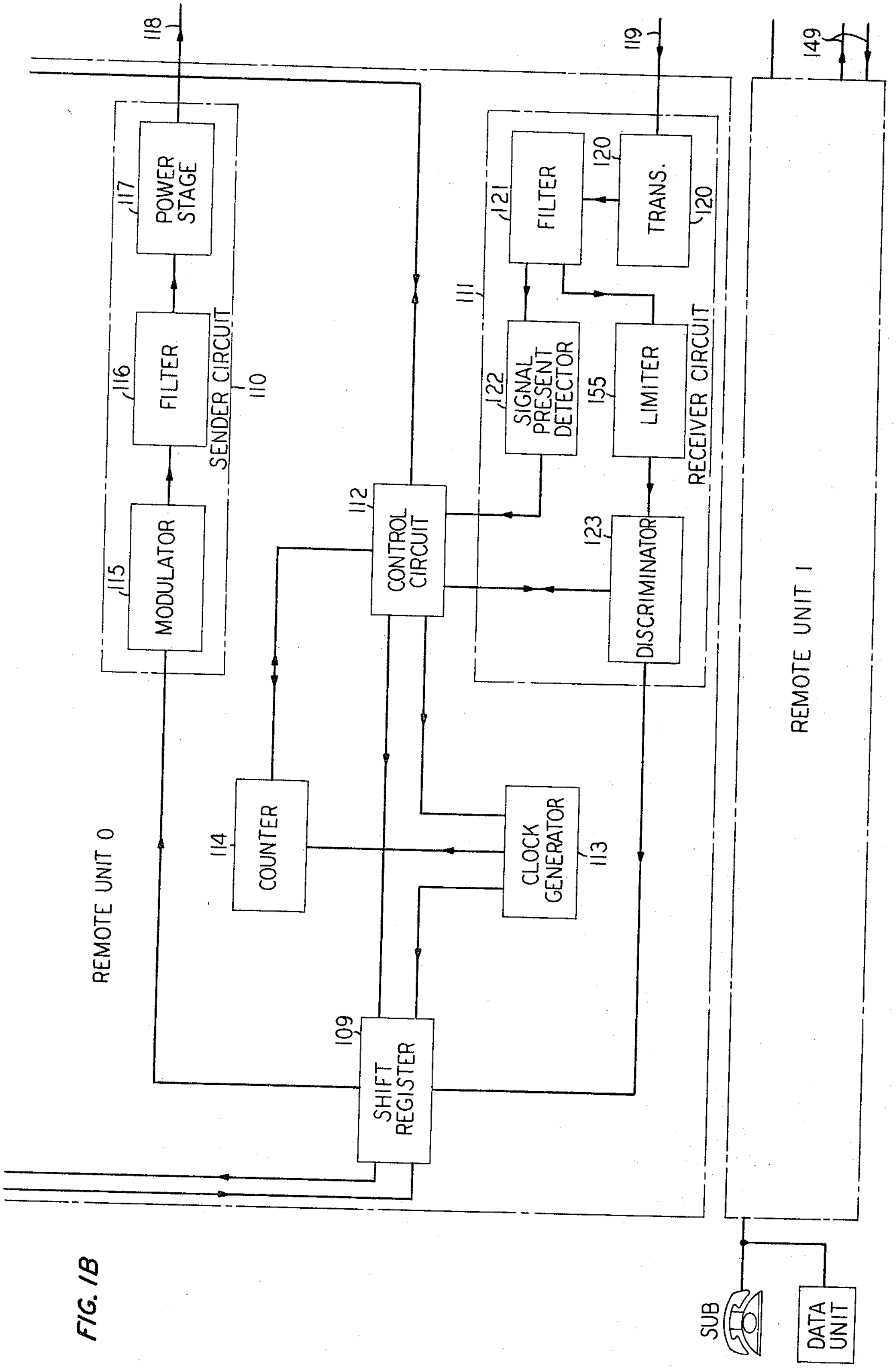
Figure 1C:
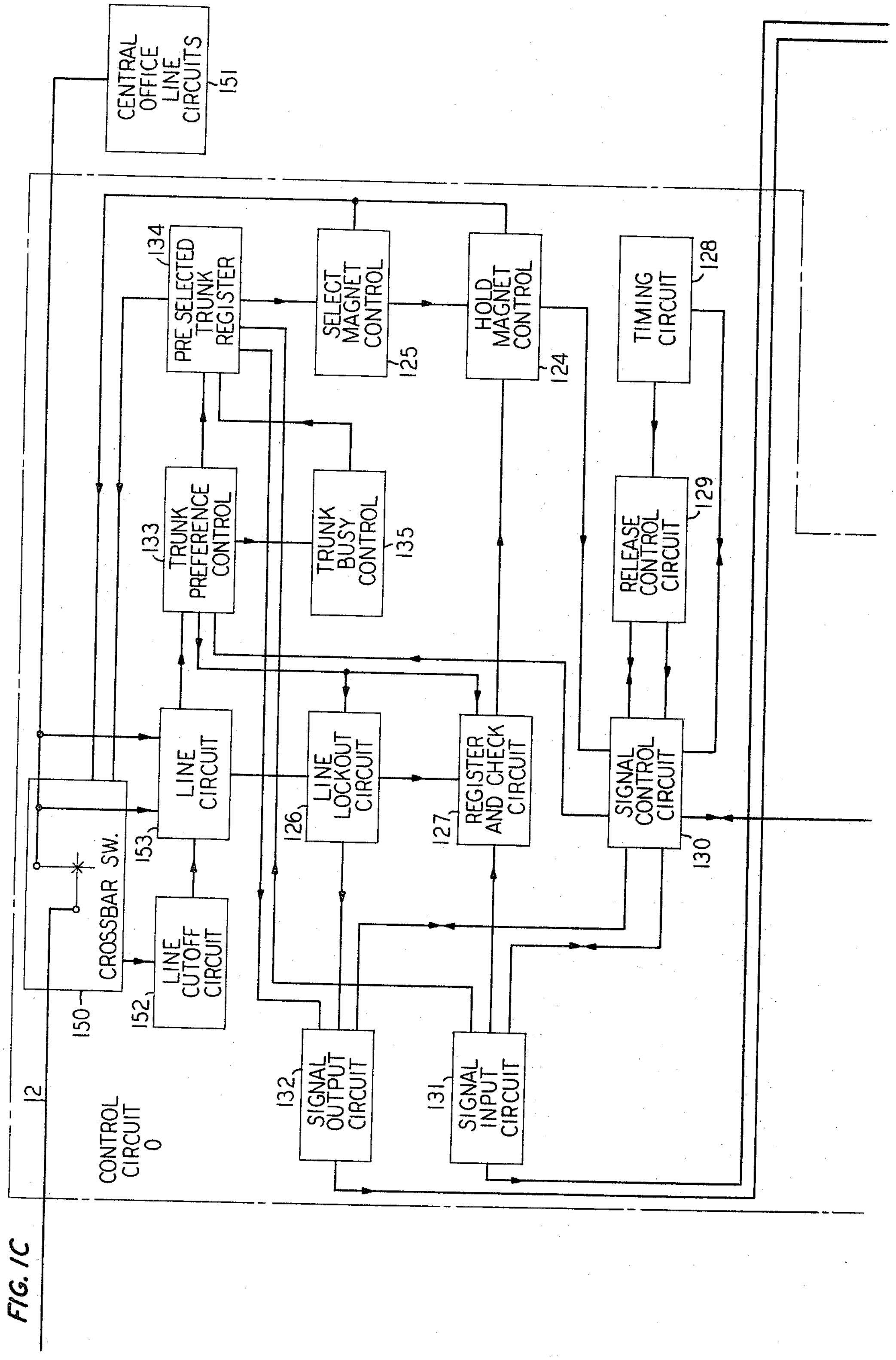
Figures 1D, 1E:
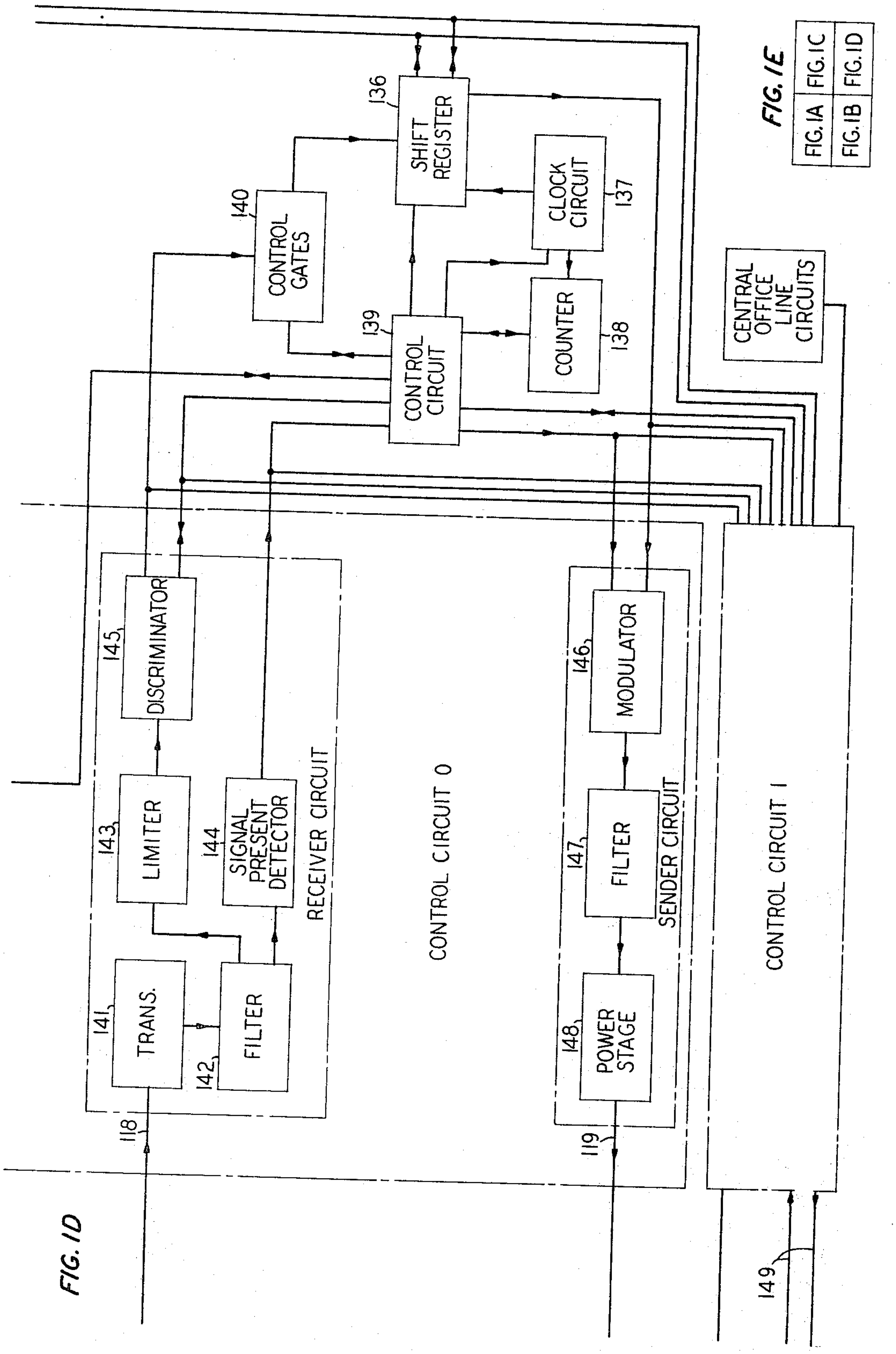
Figure 2:
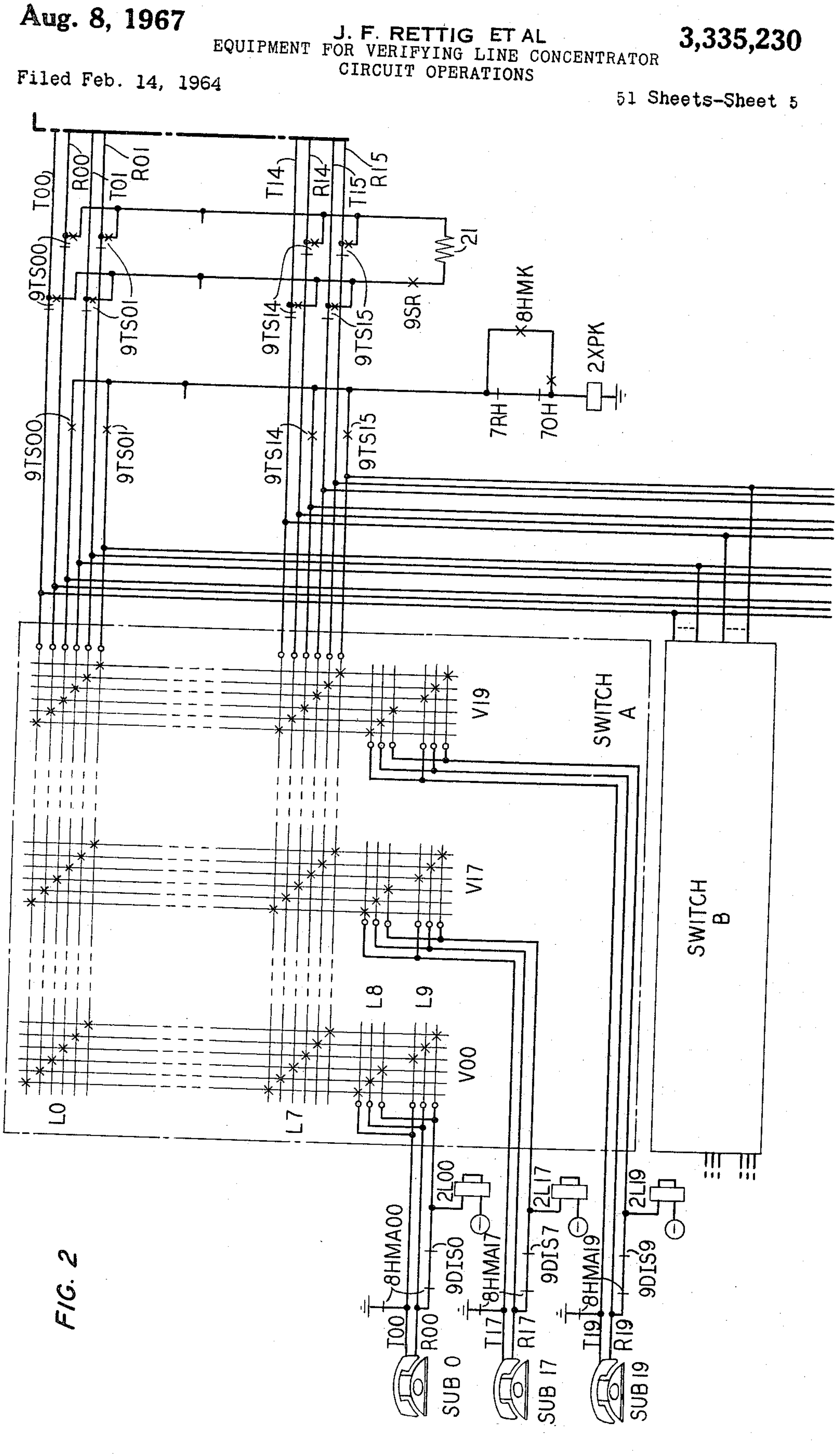
FIGS 2–16 show the details of a remote unit 0 shown in outline form in FIGS. 1A and 1B.
Figure 3:
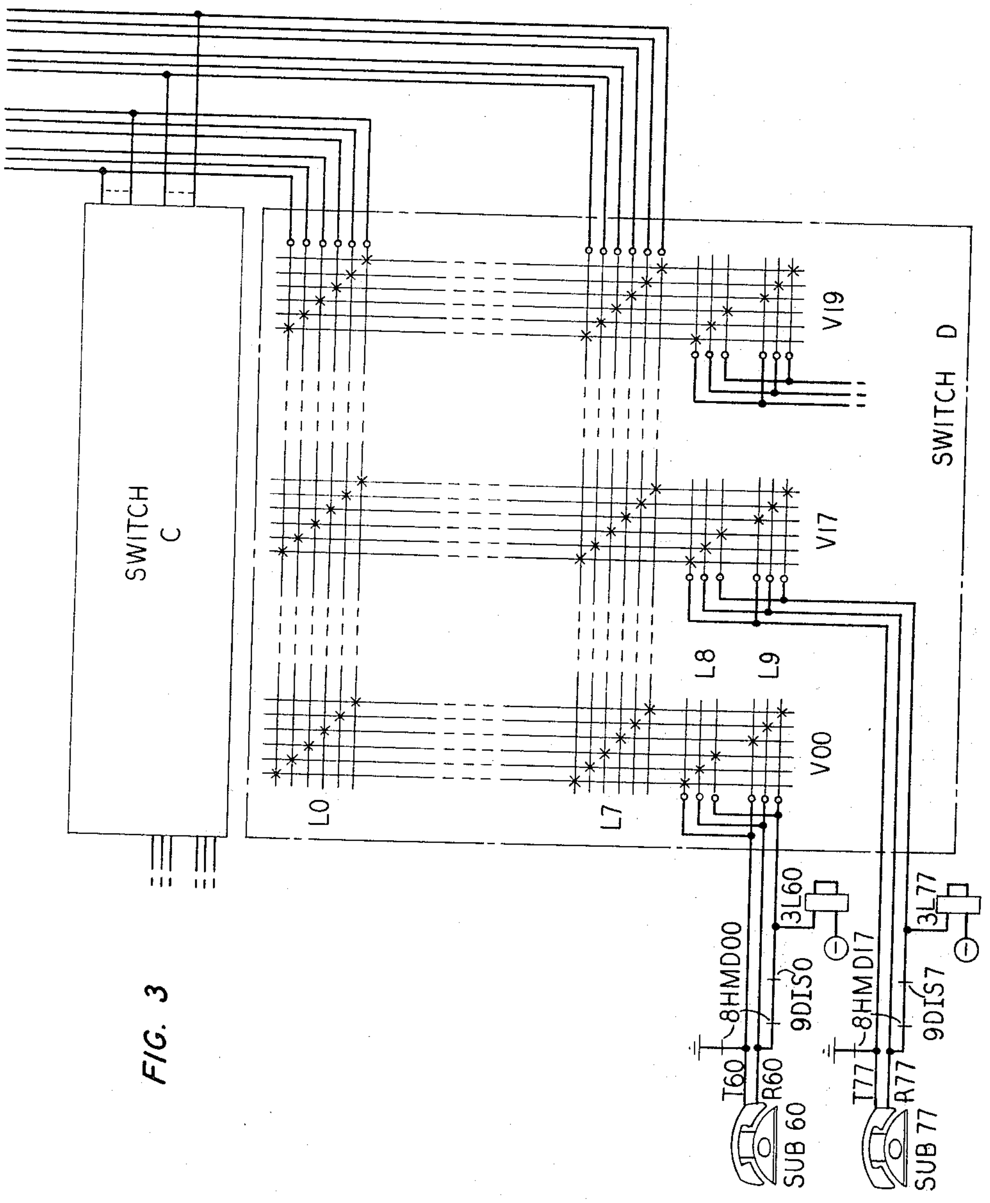
Figure 4:
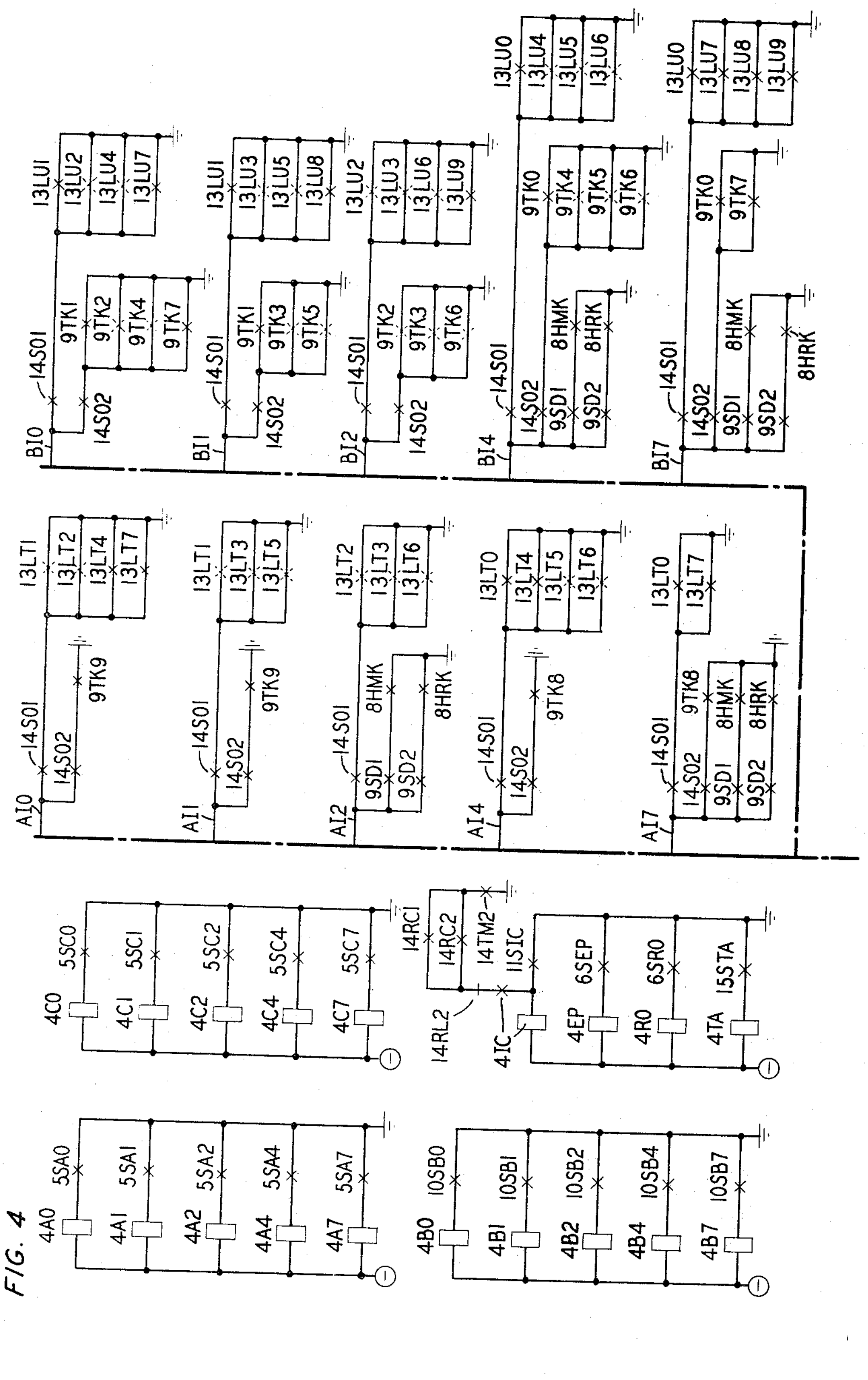
Figure 5:
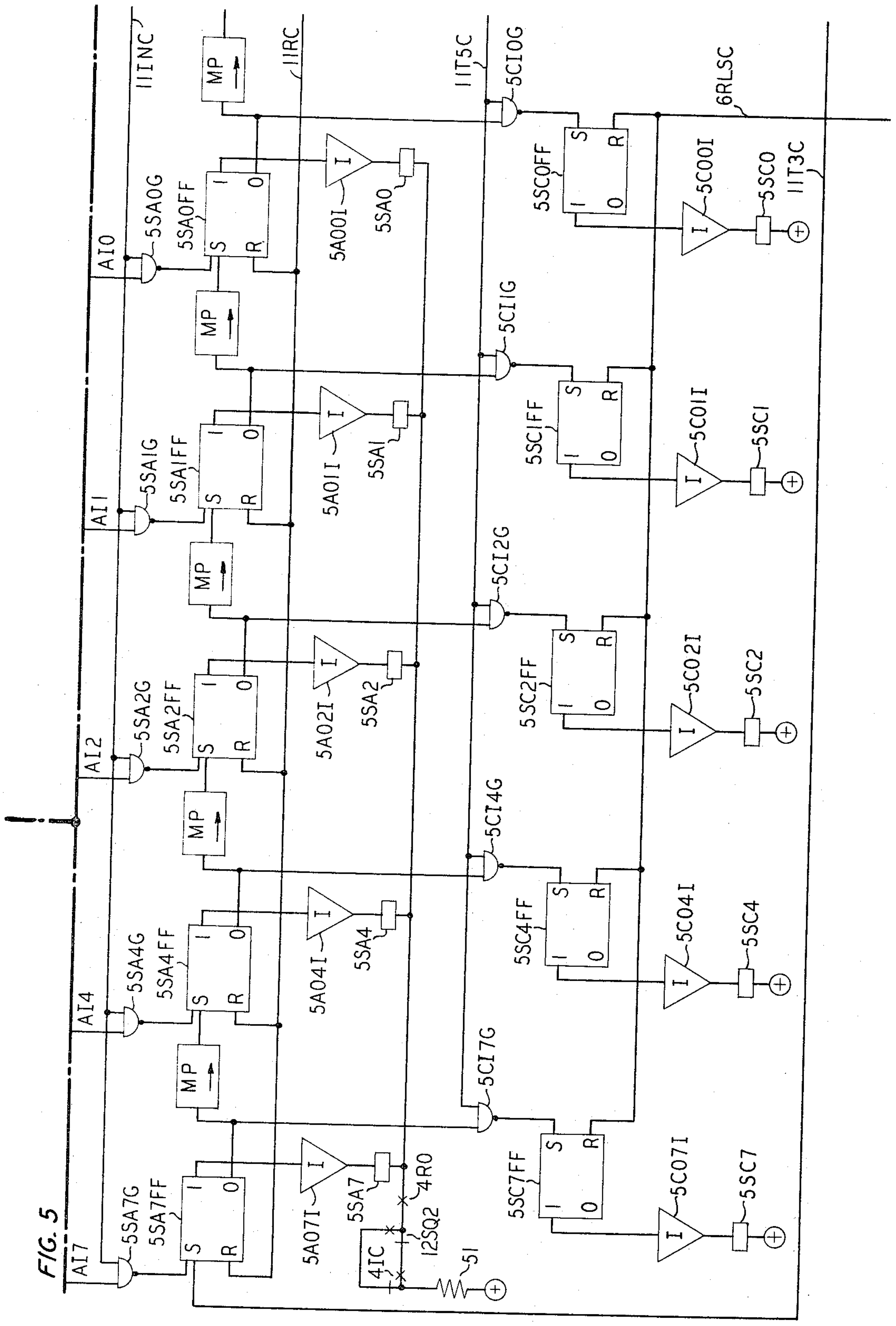
Figure 6:
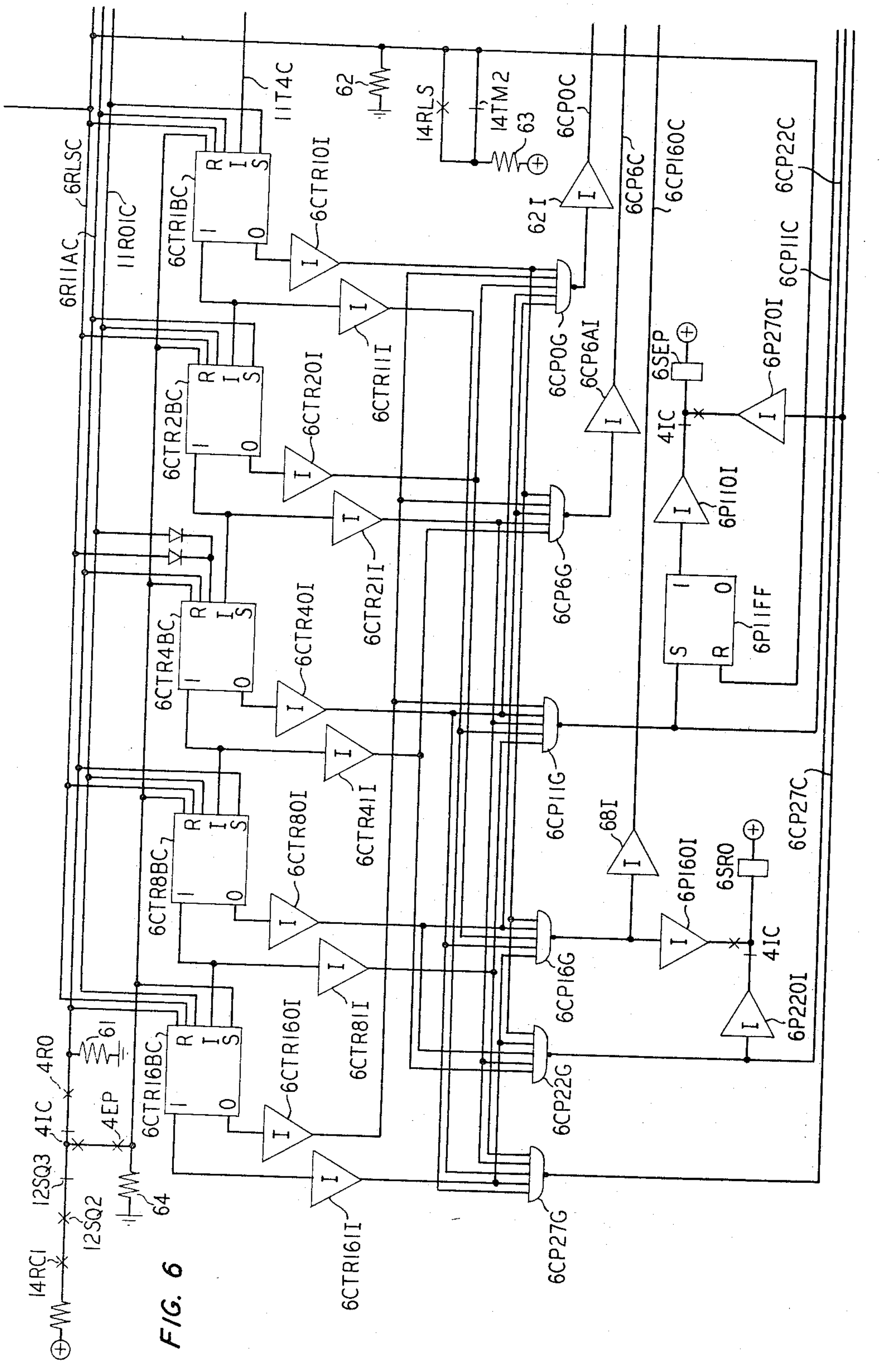
Figure 7:
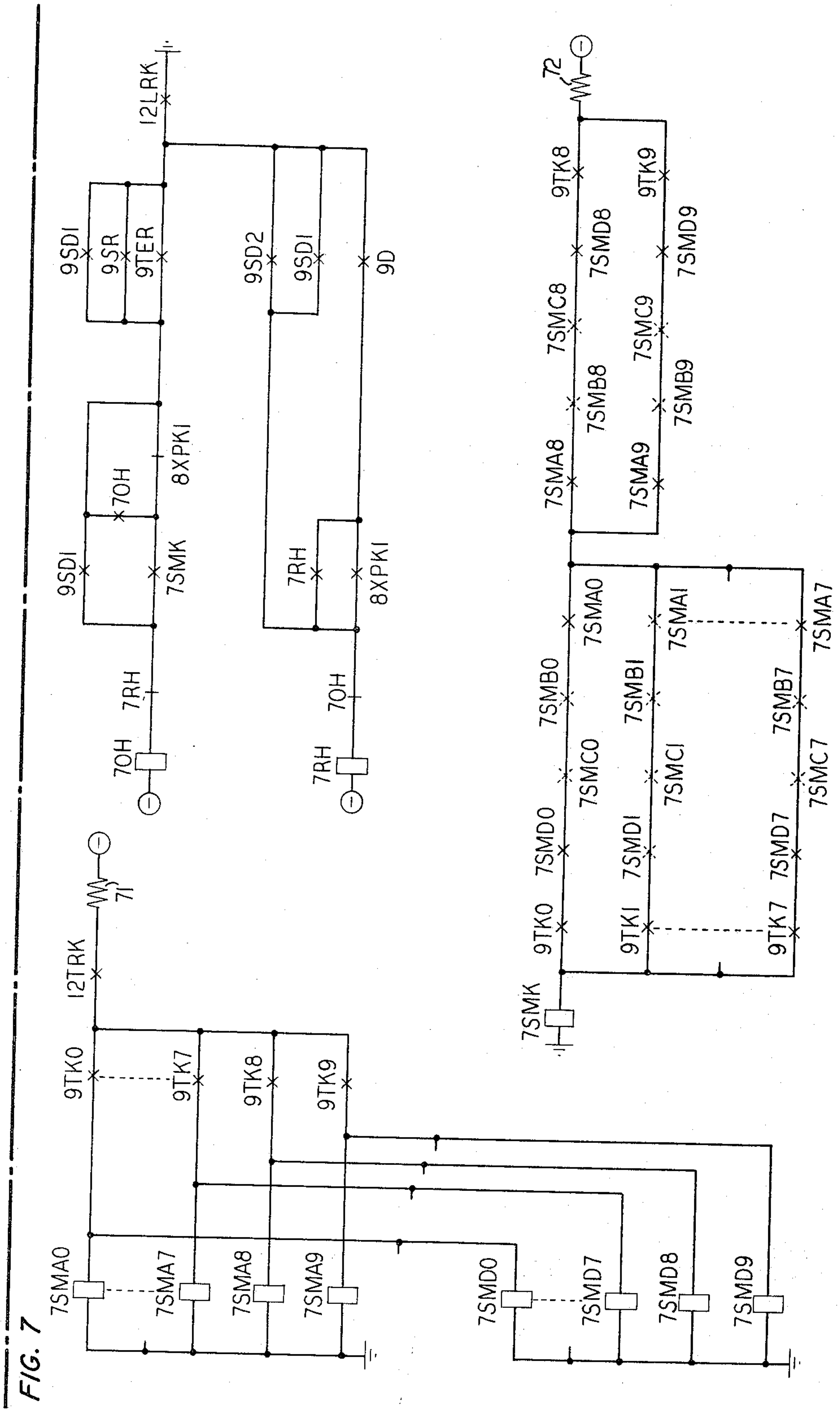
Figure 8:
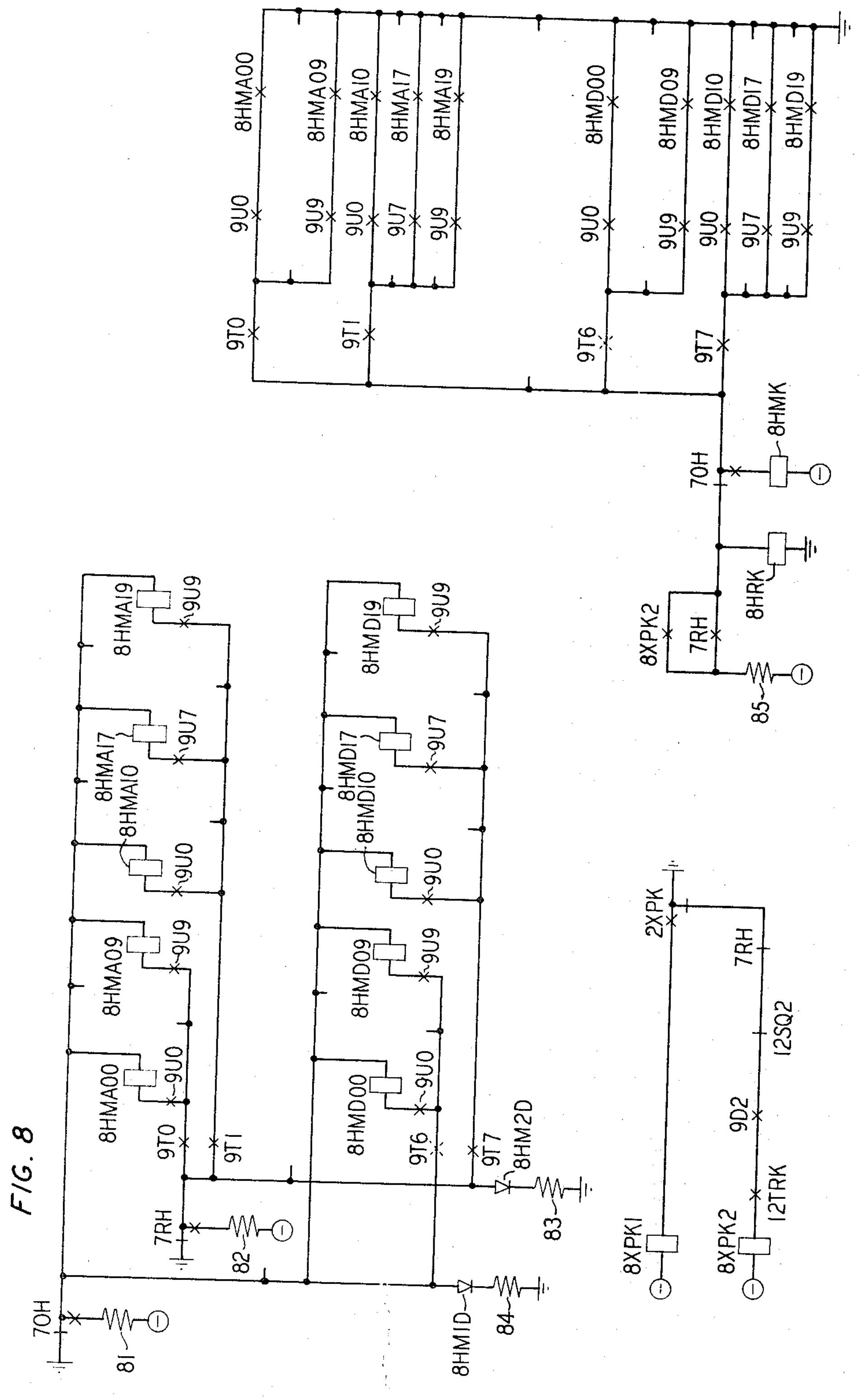
Figure 9:
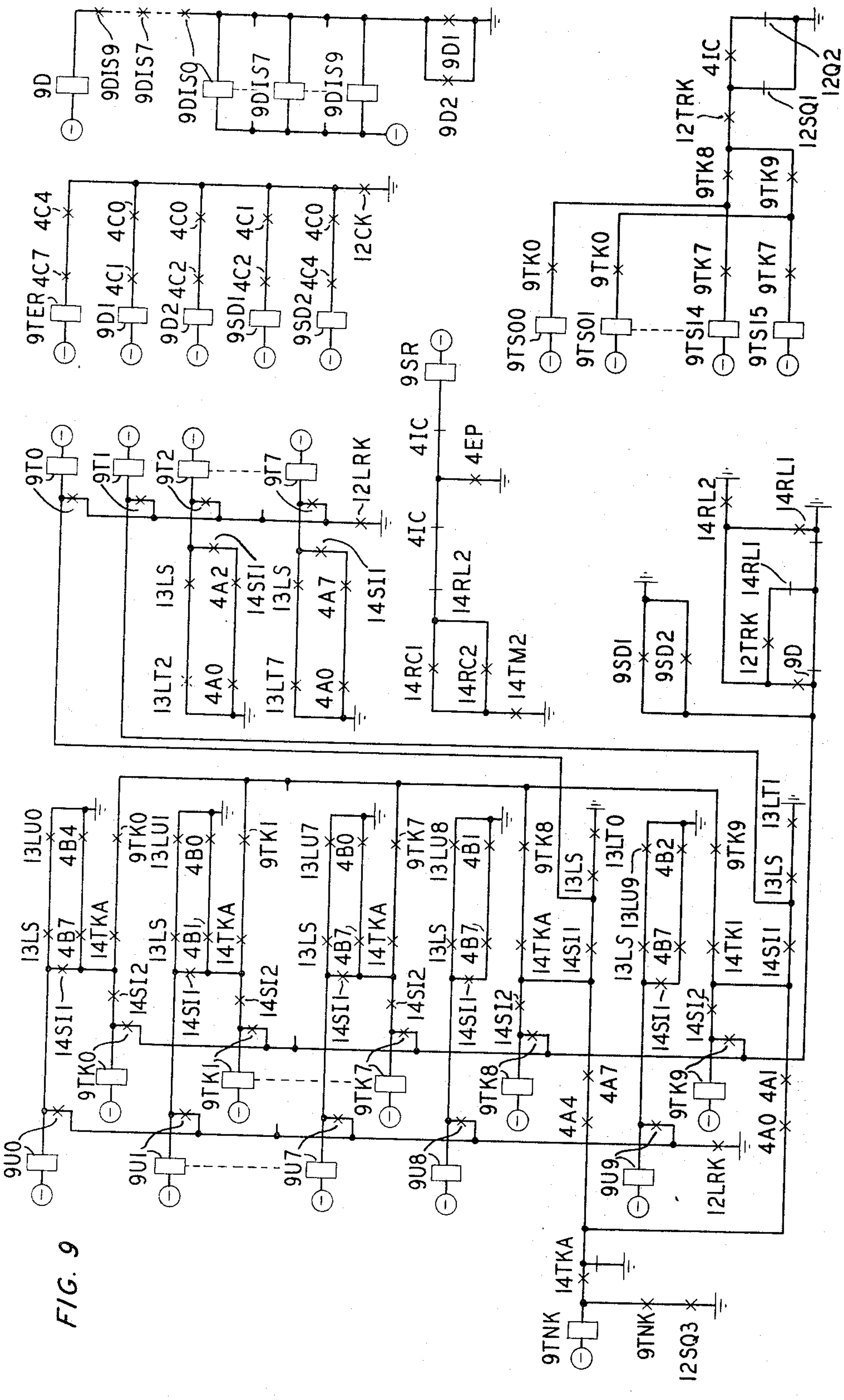
Figure 10:
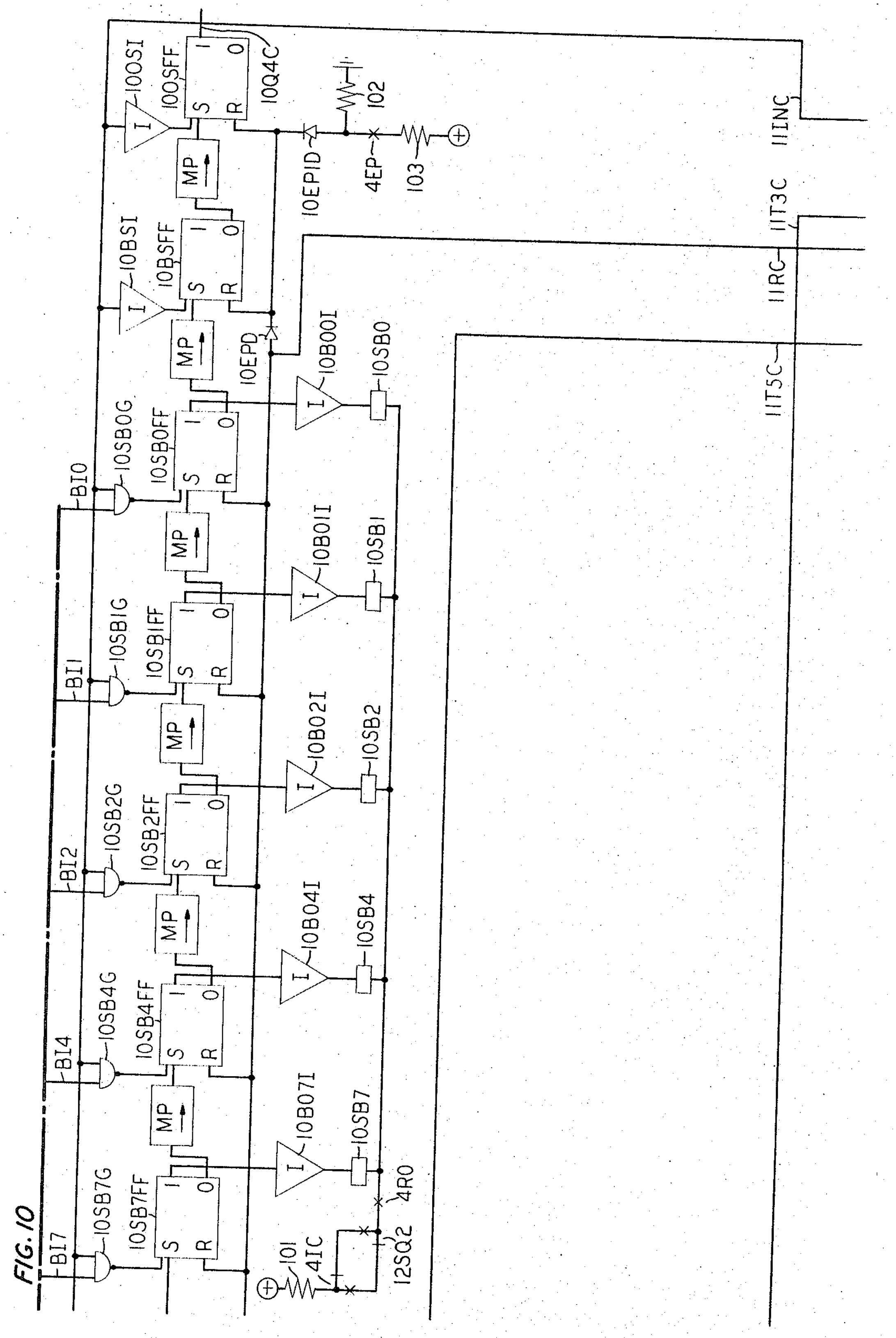
Figure 11:
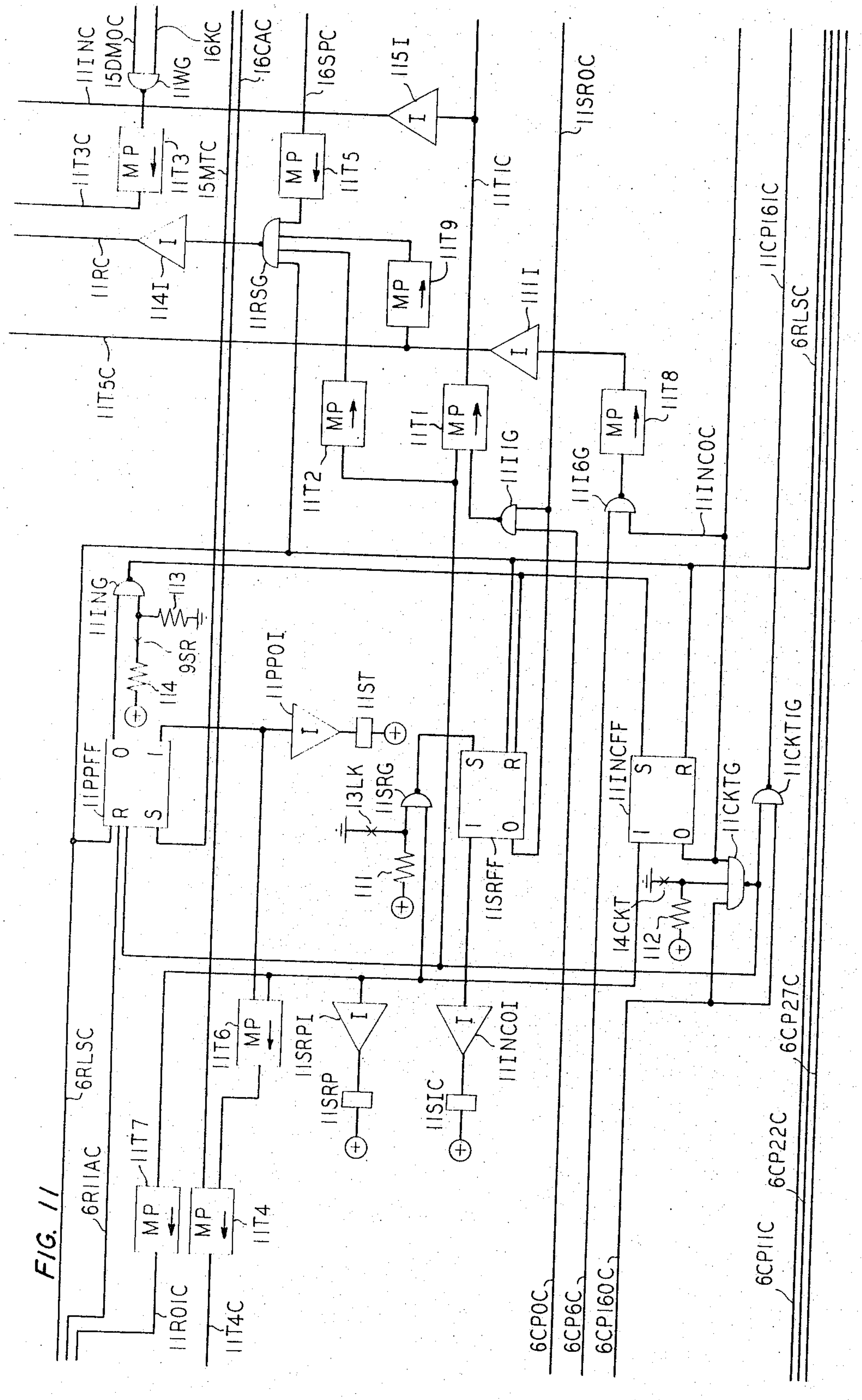
Figure 12:
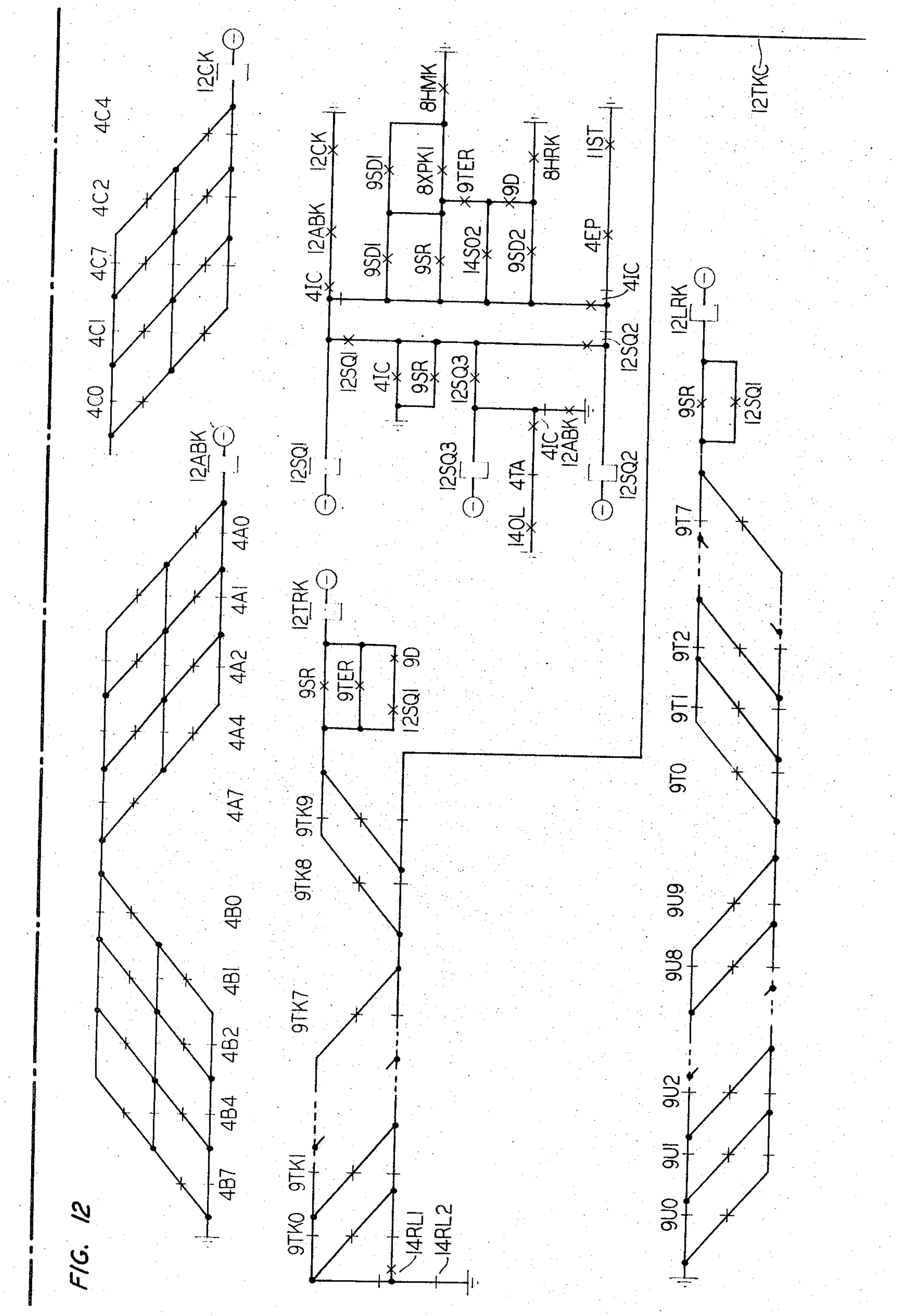
Figure 13:
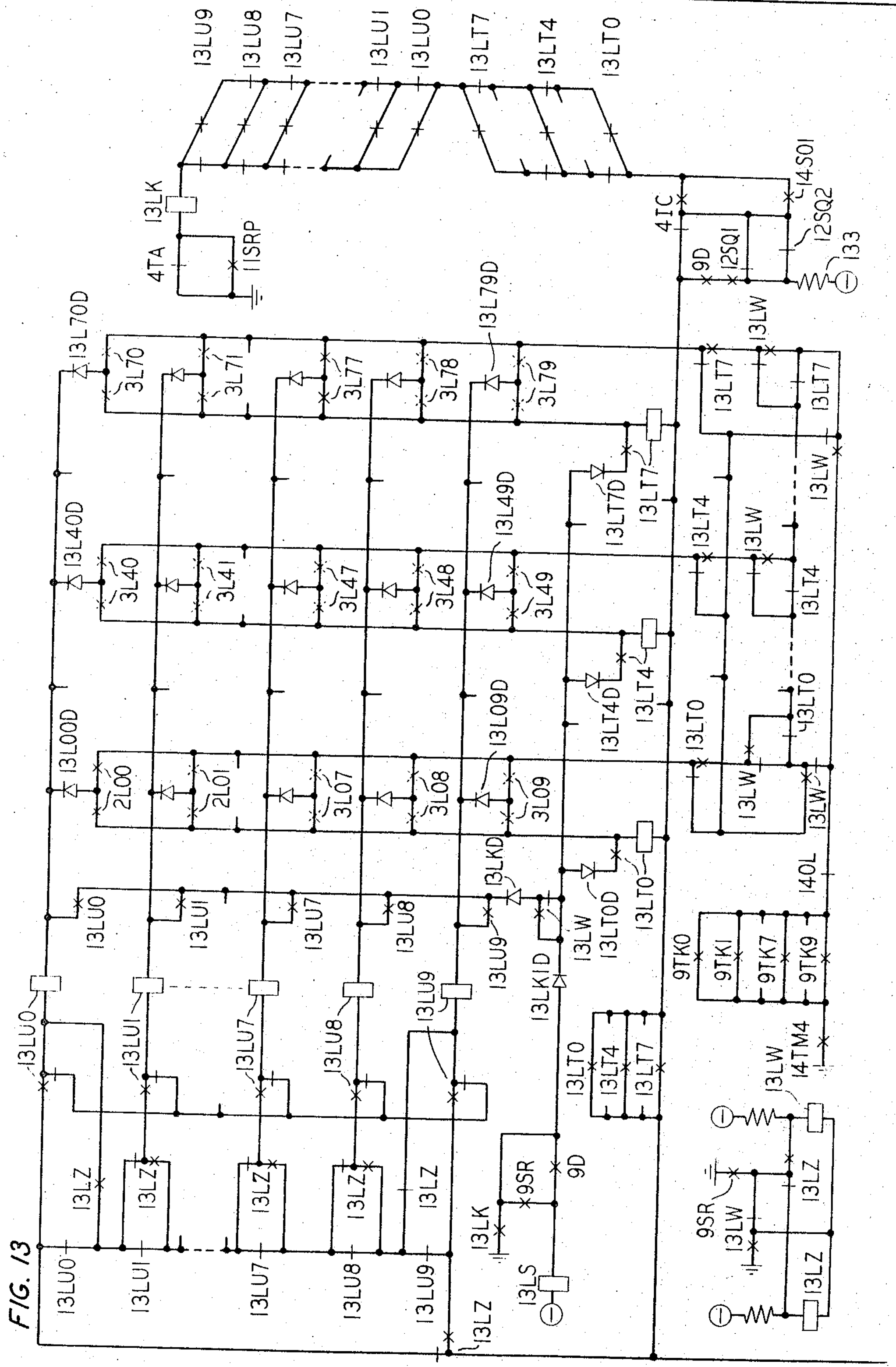
Figure 14:
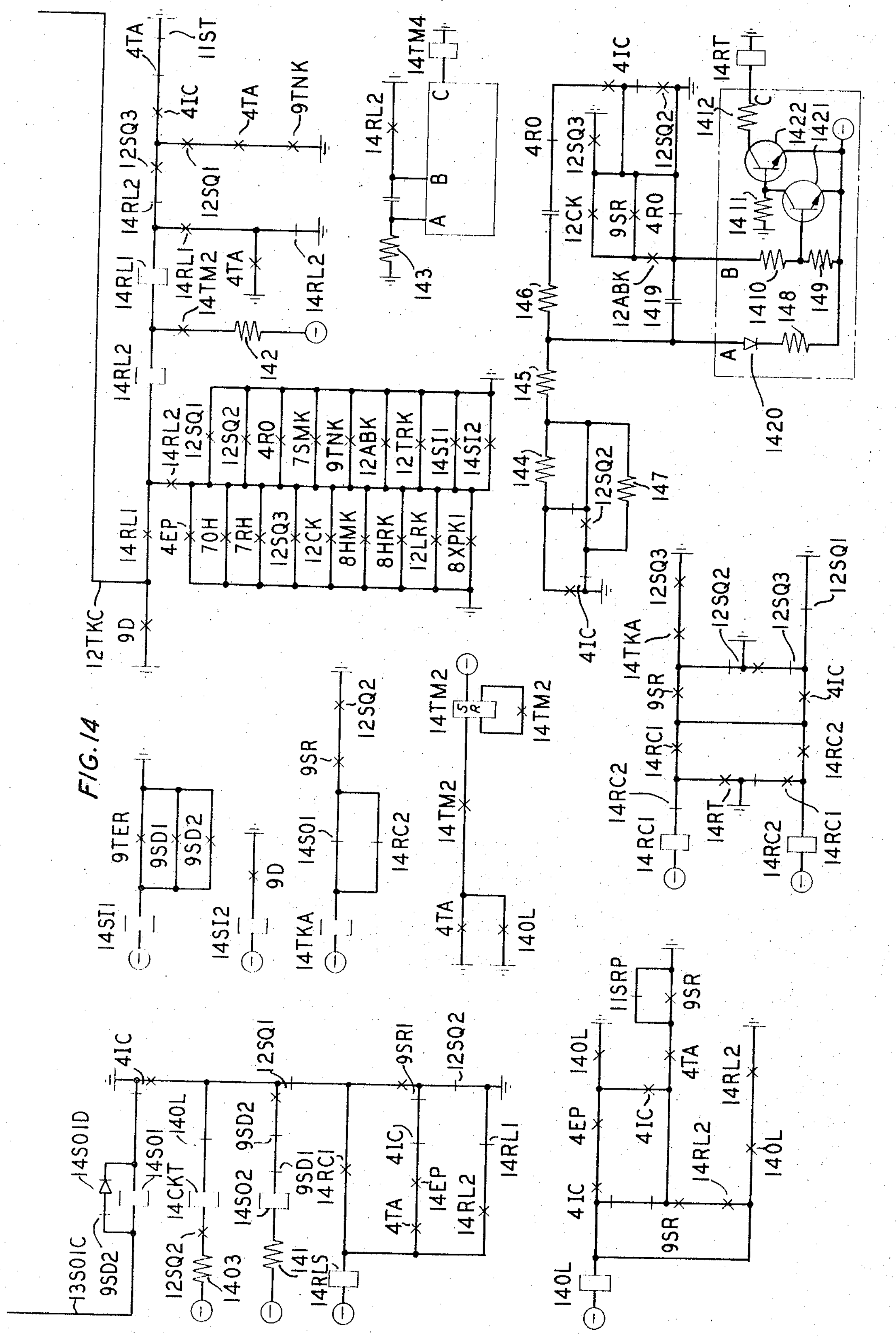
Figure 15:
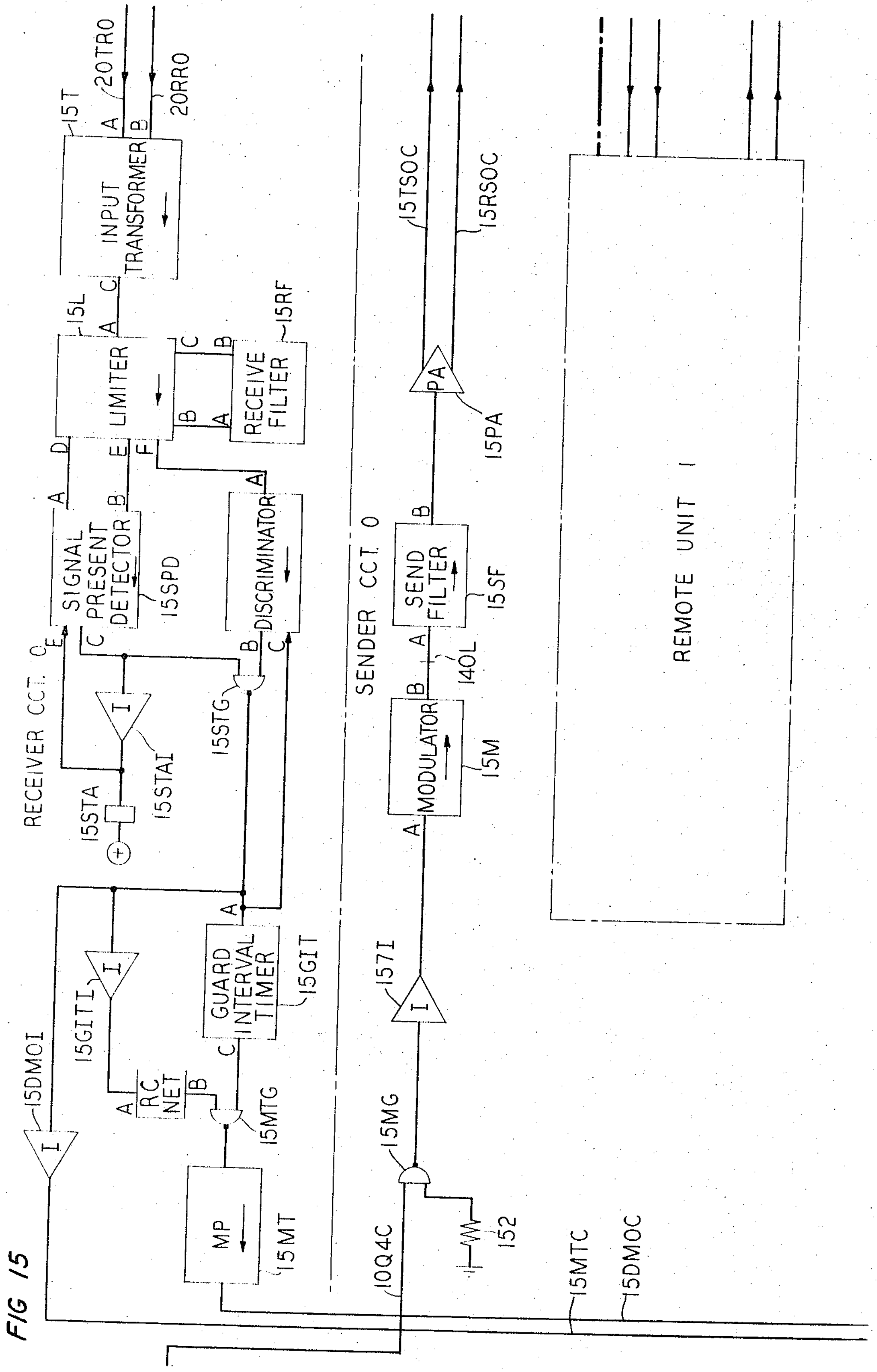
Figure 16:
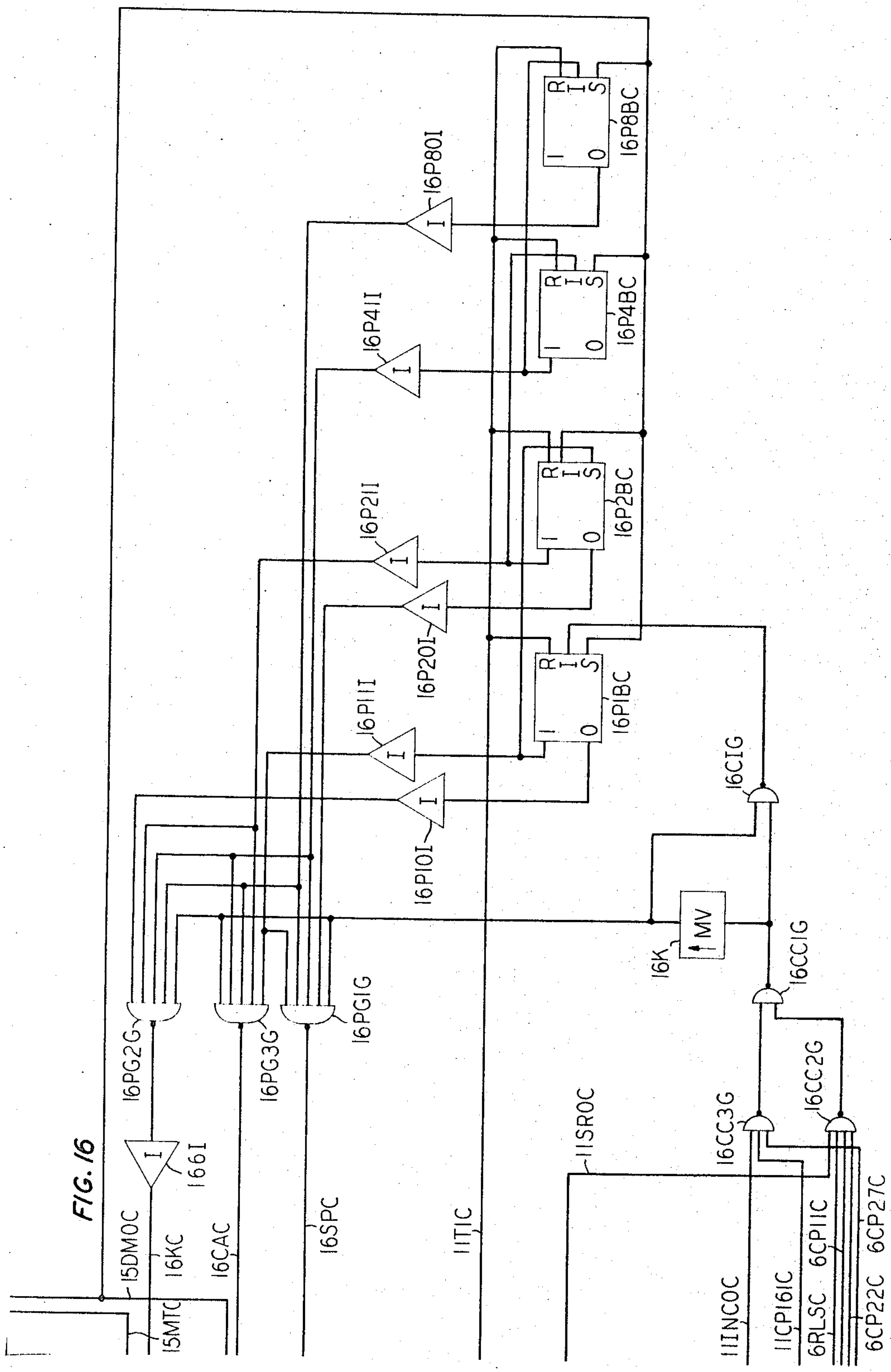
Figure 17:
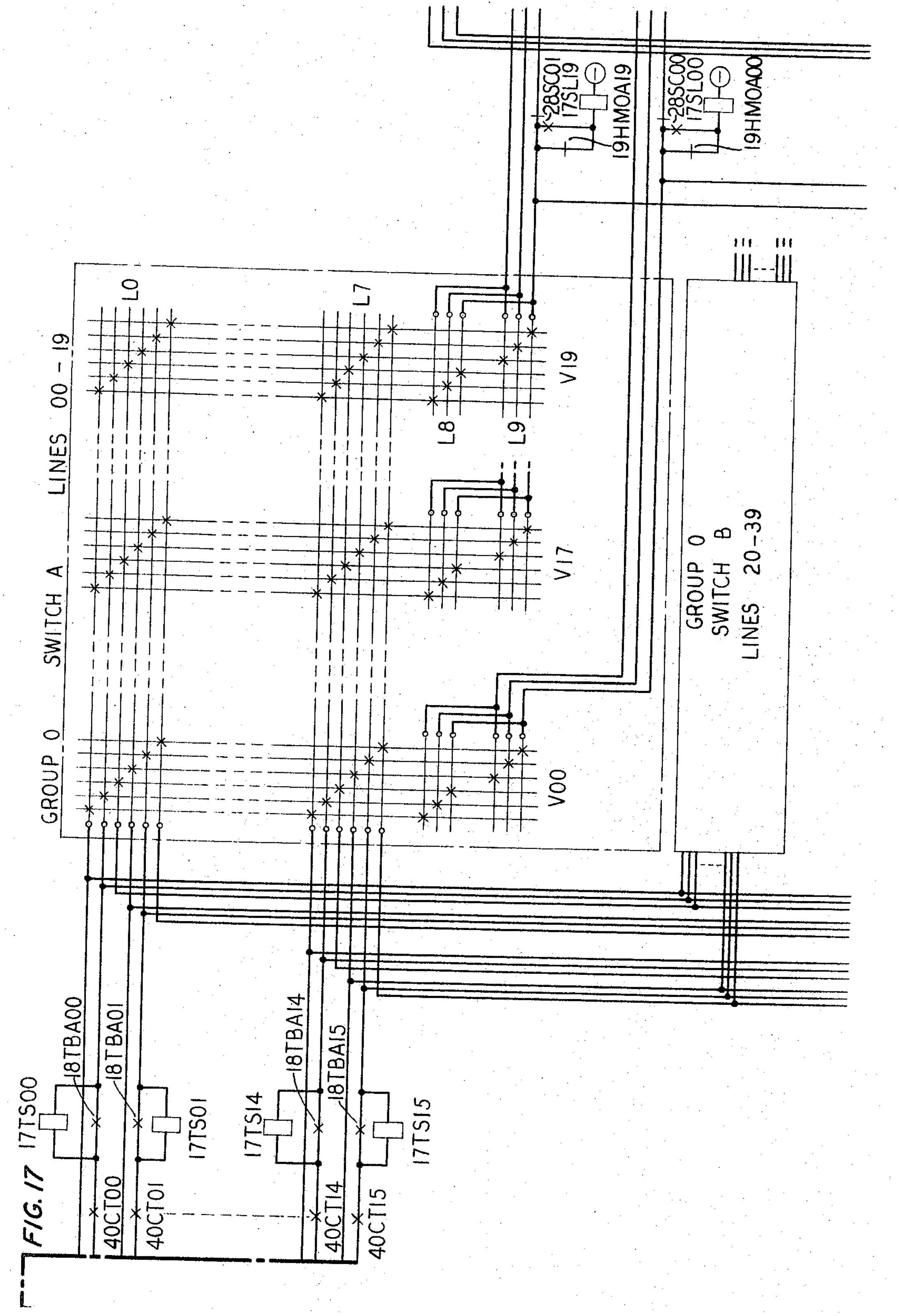
Figure 18:
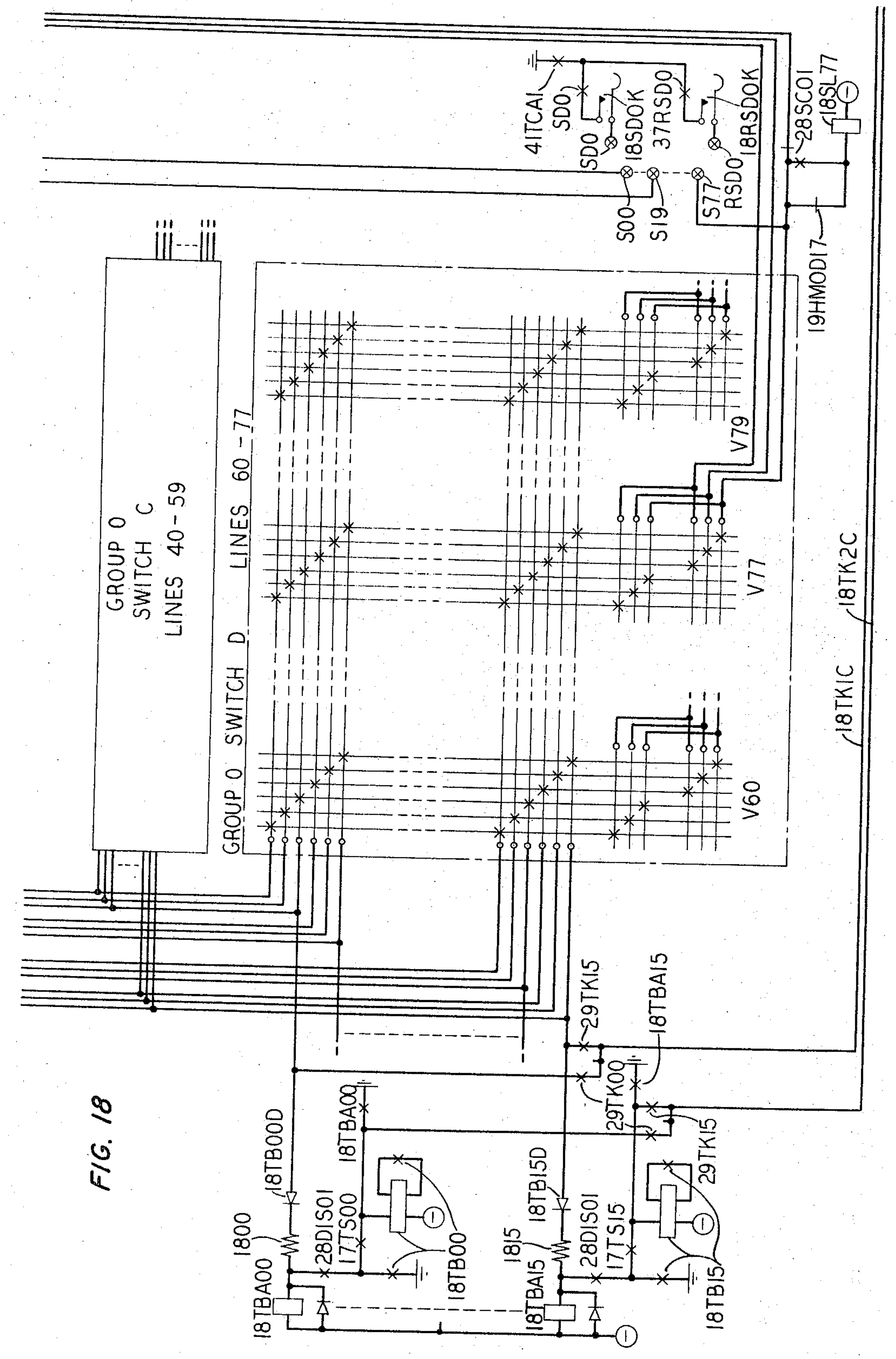
Figure 19:
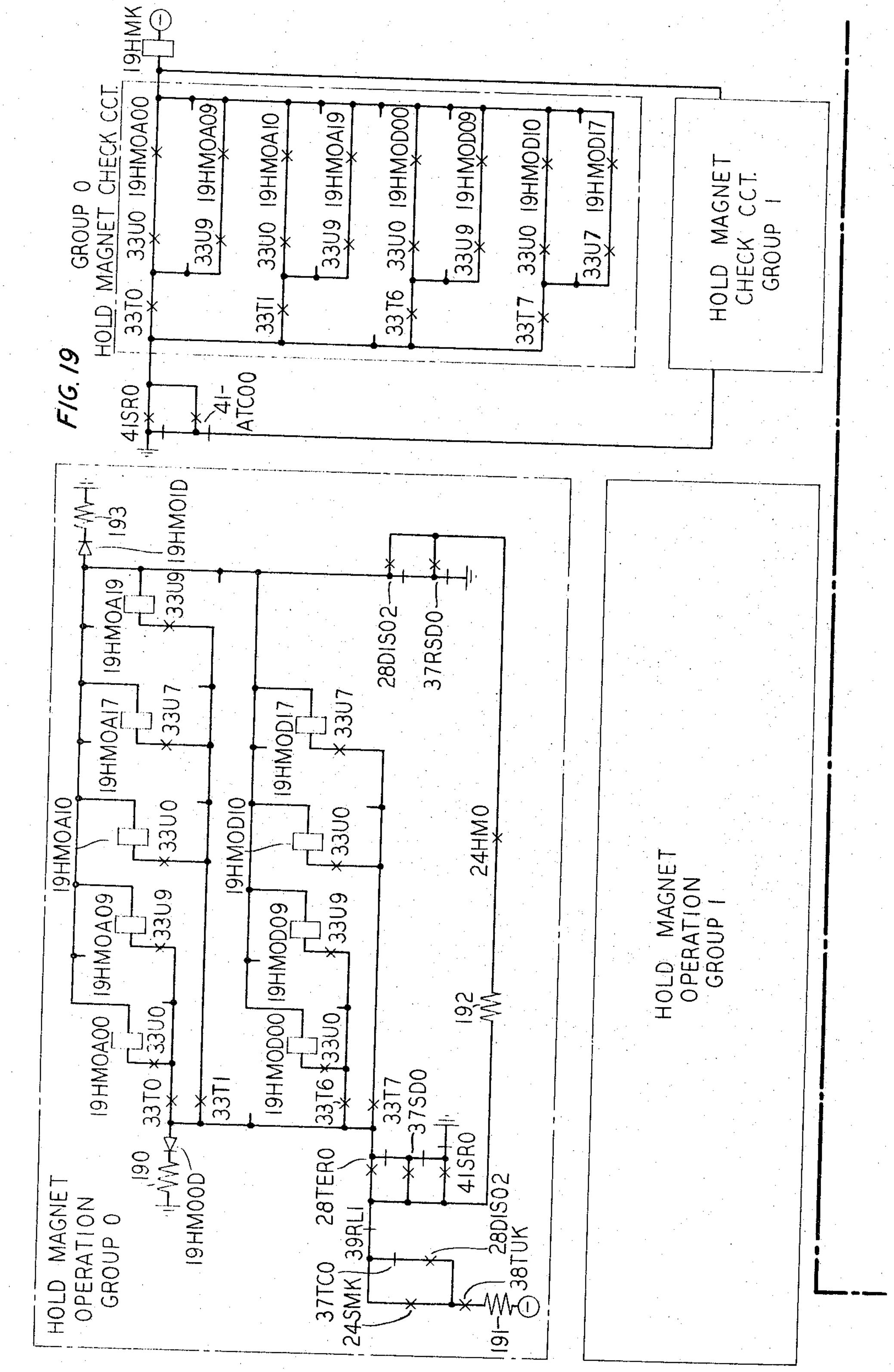
Figure 20:
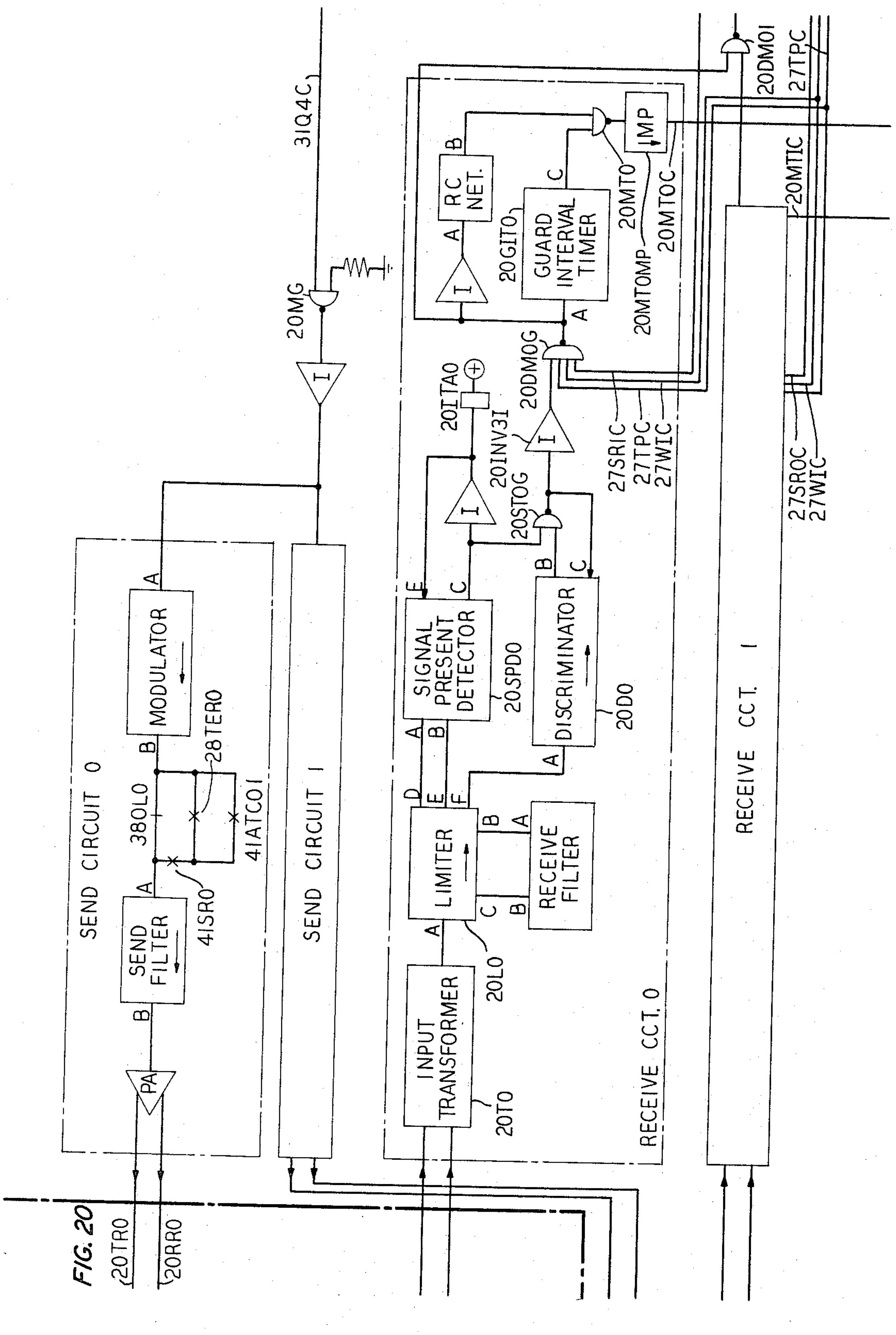
Figure 21:
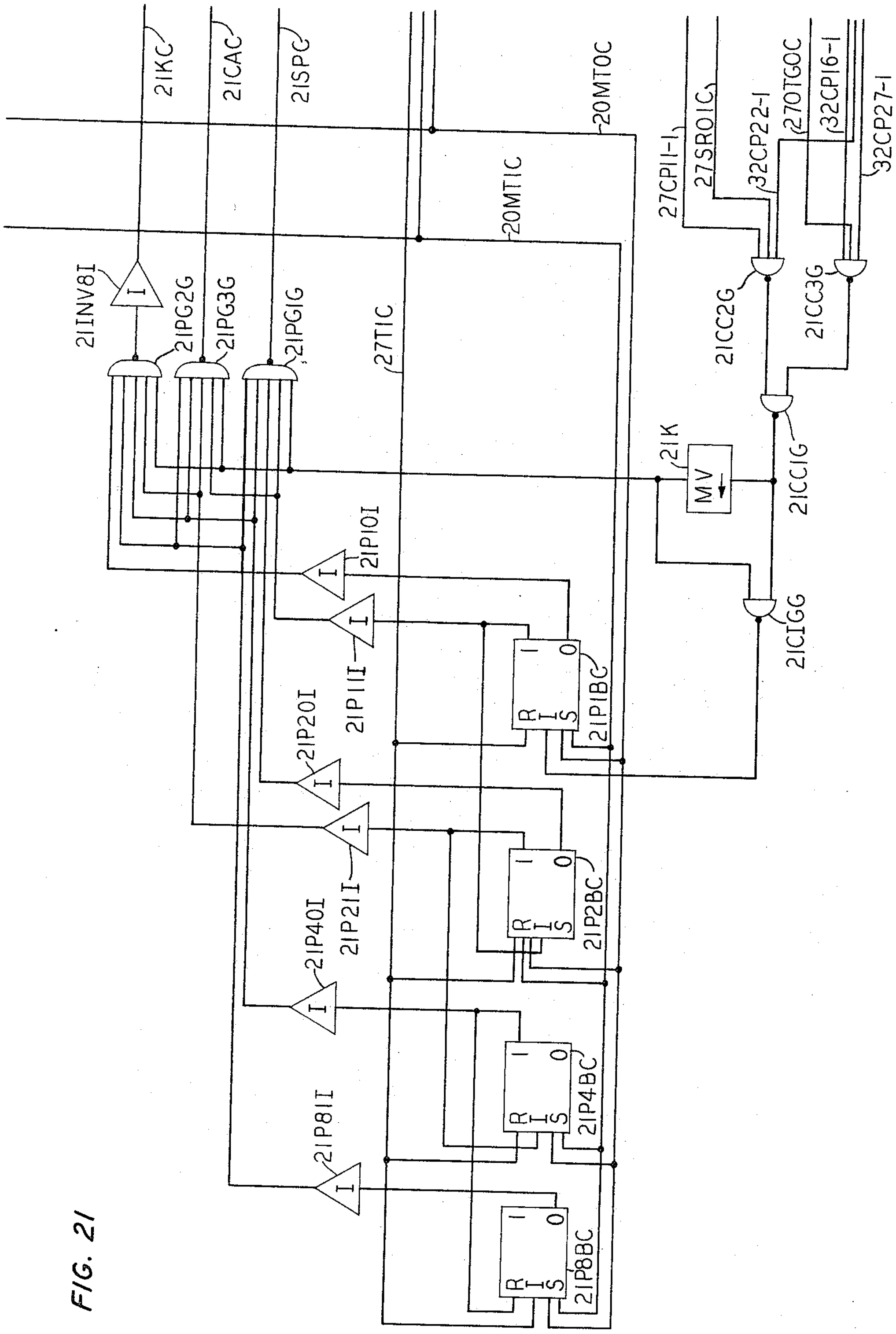
Figure 22:
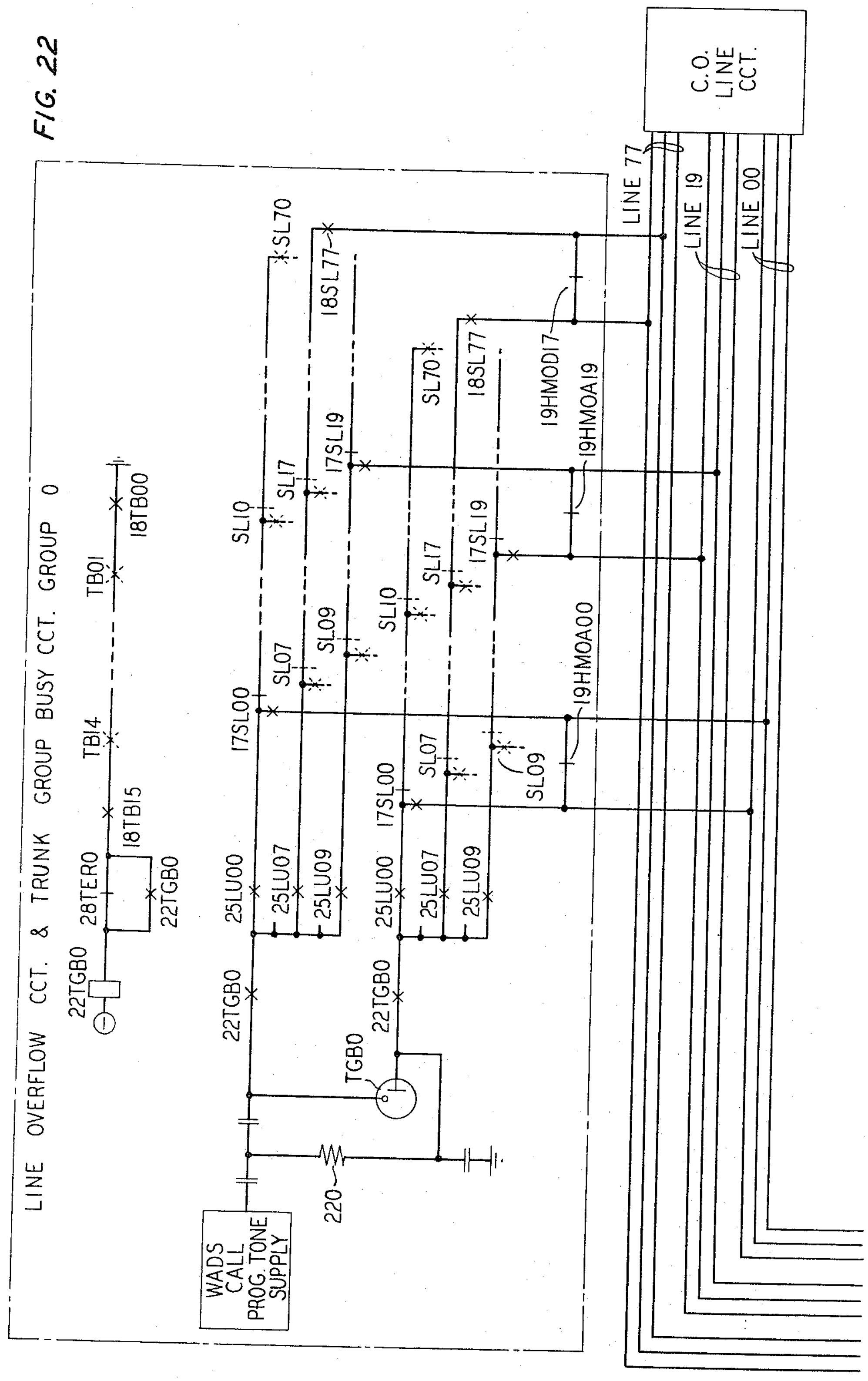
Figure 23:
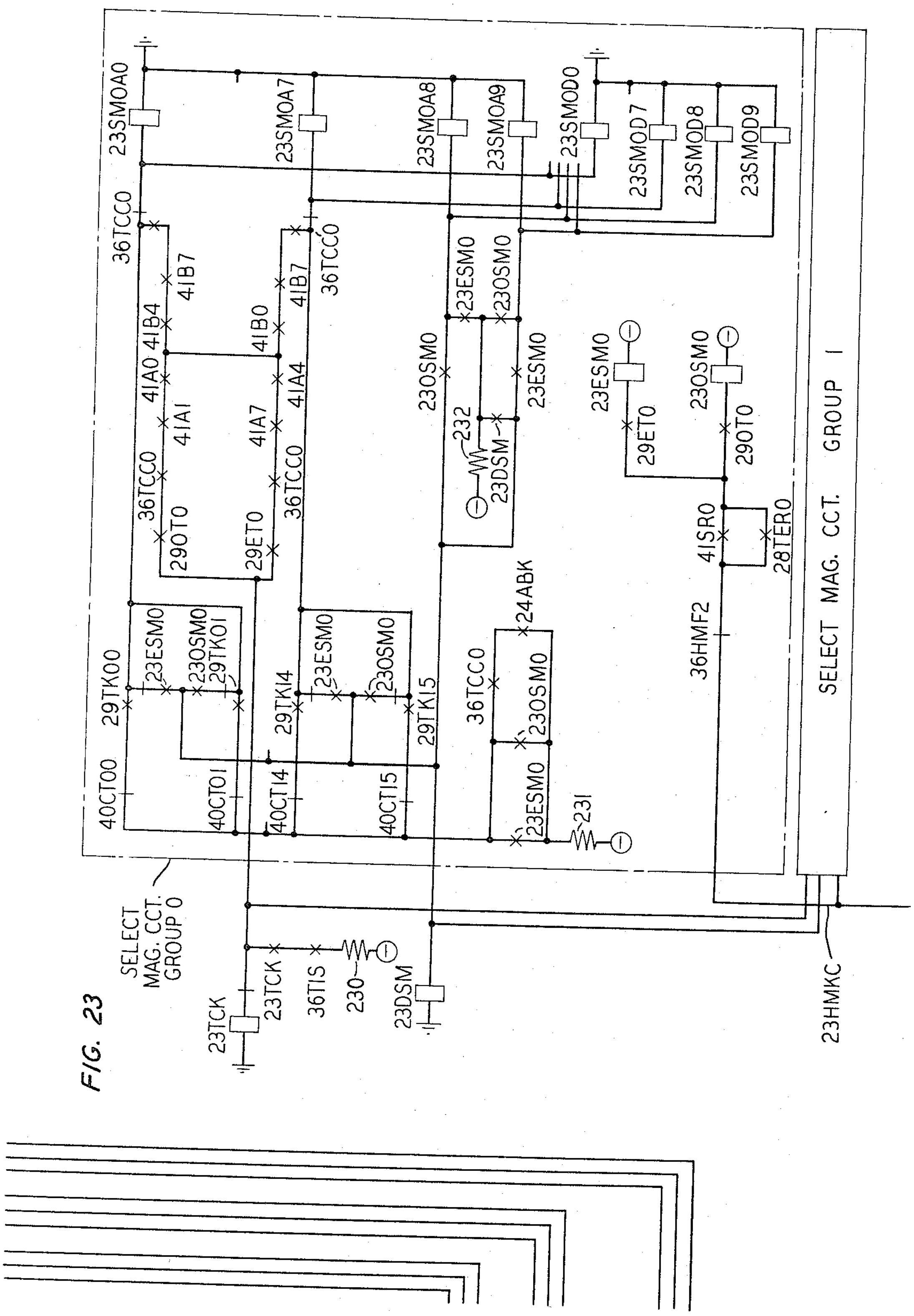
Figure 24:
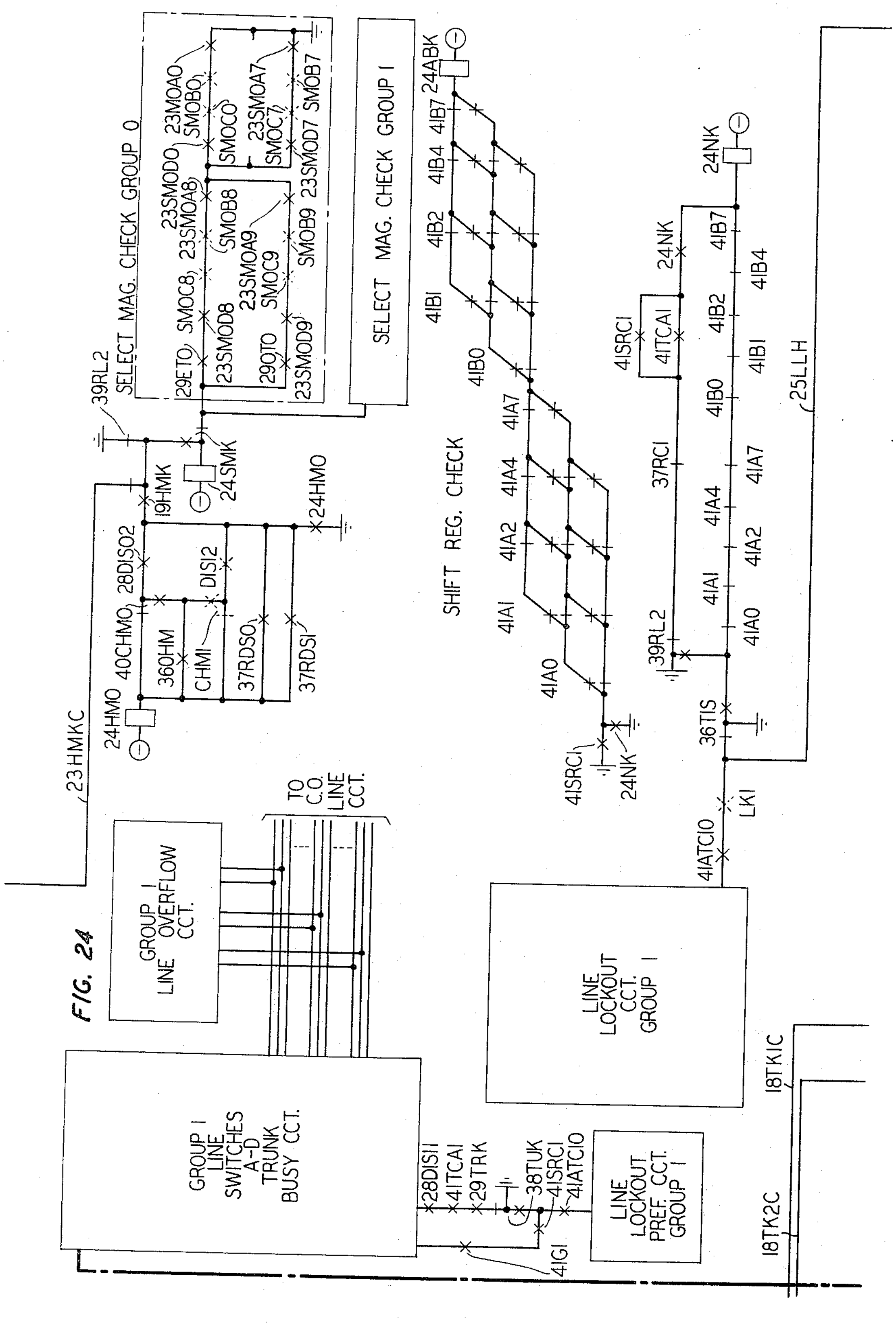
Figure 25:
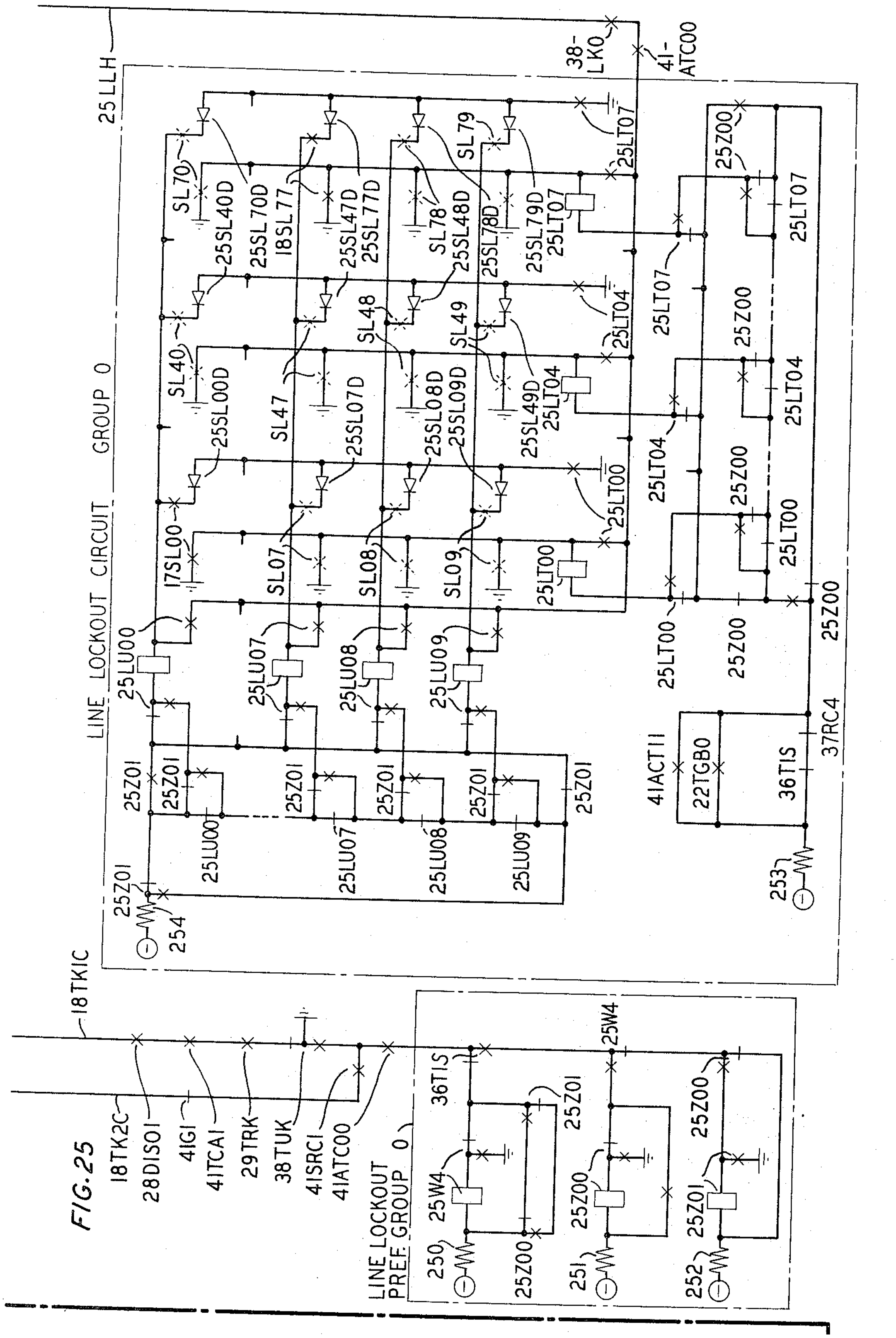
Figure 26:
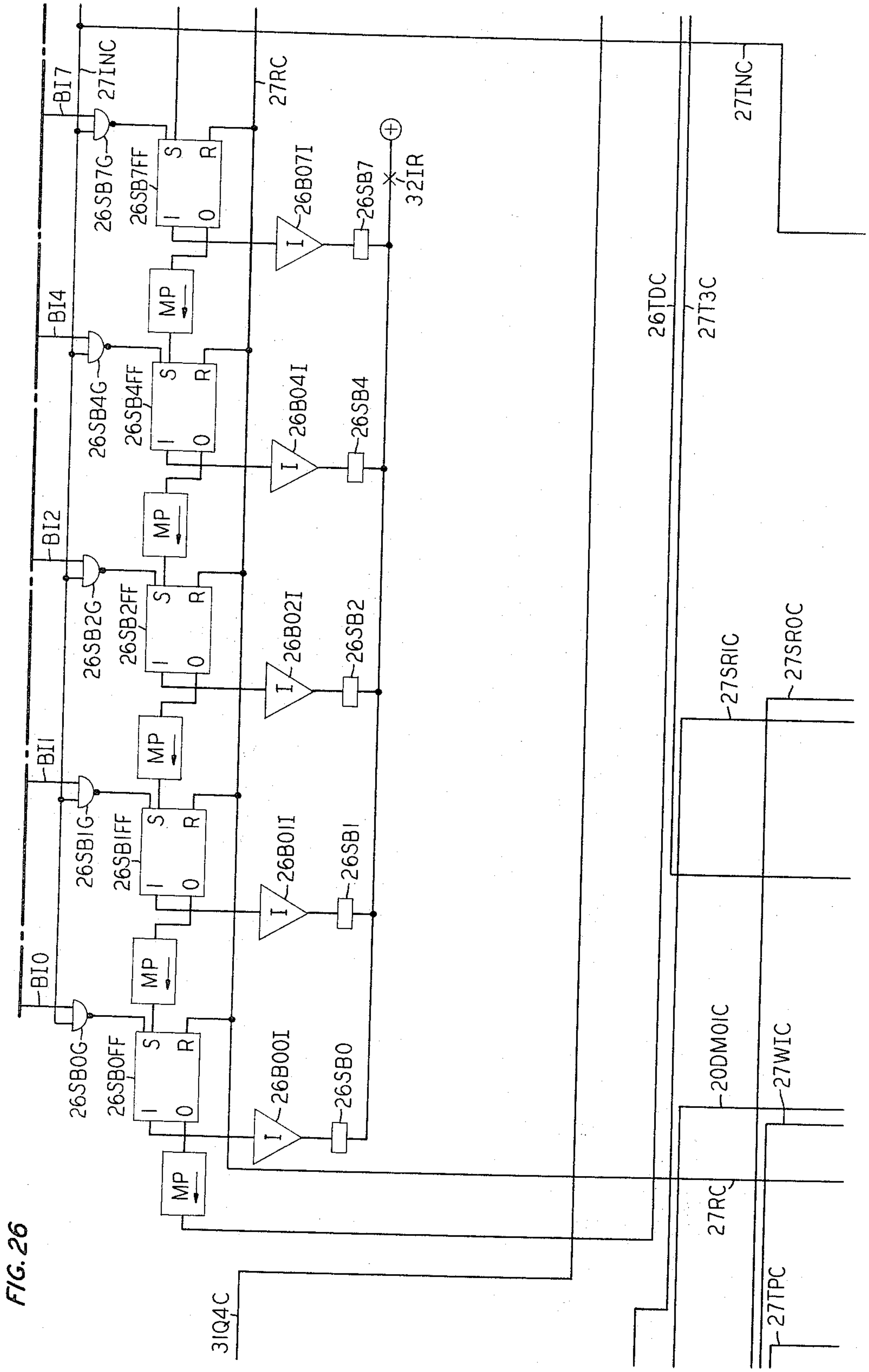
Figure 27:
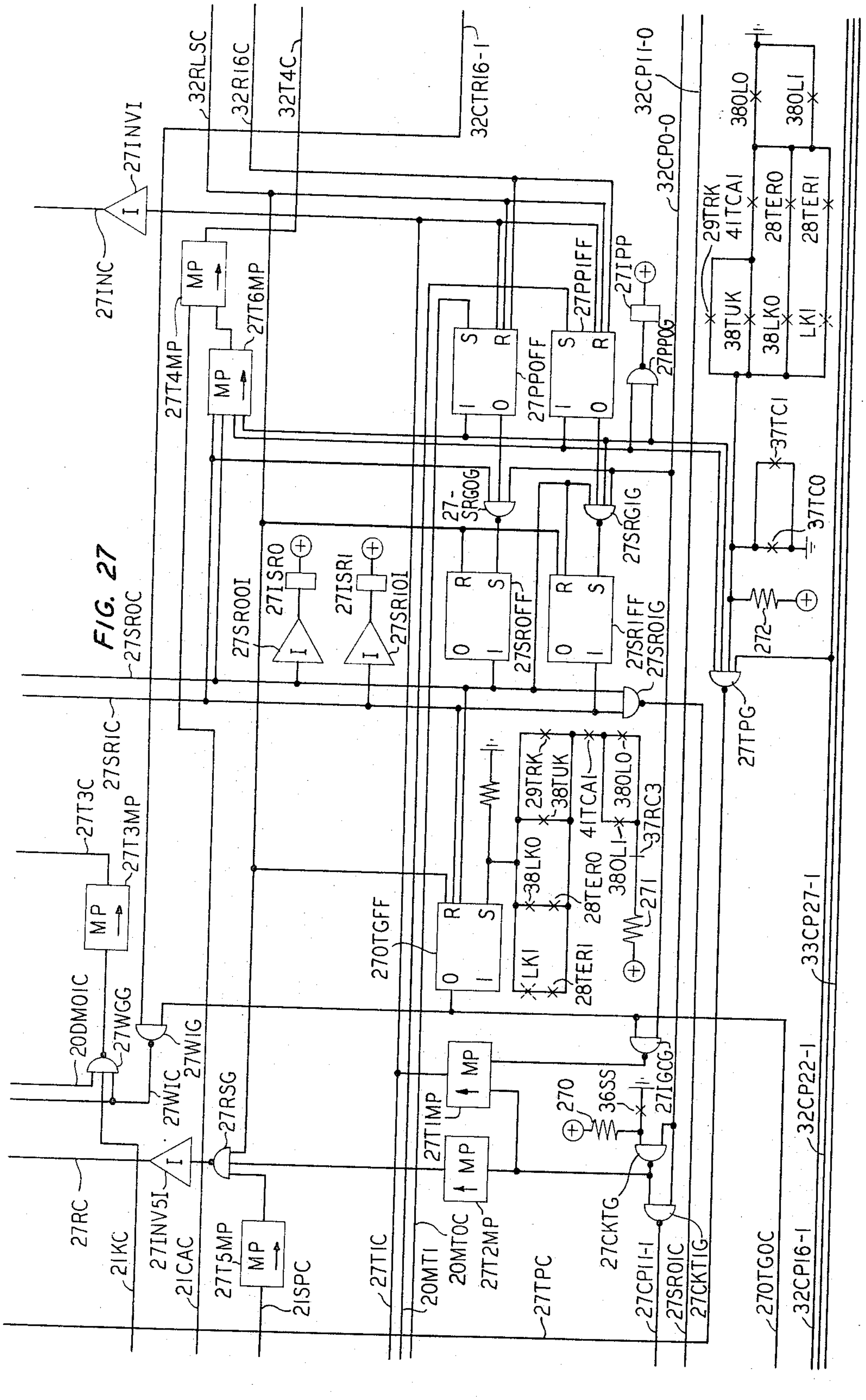
Figure 28:
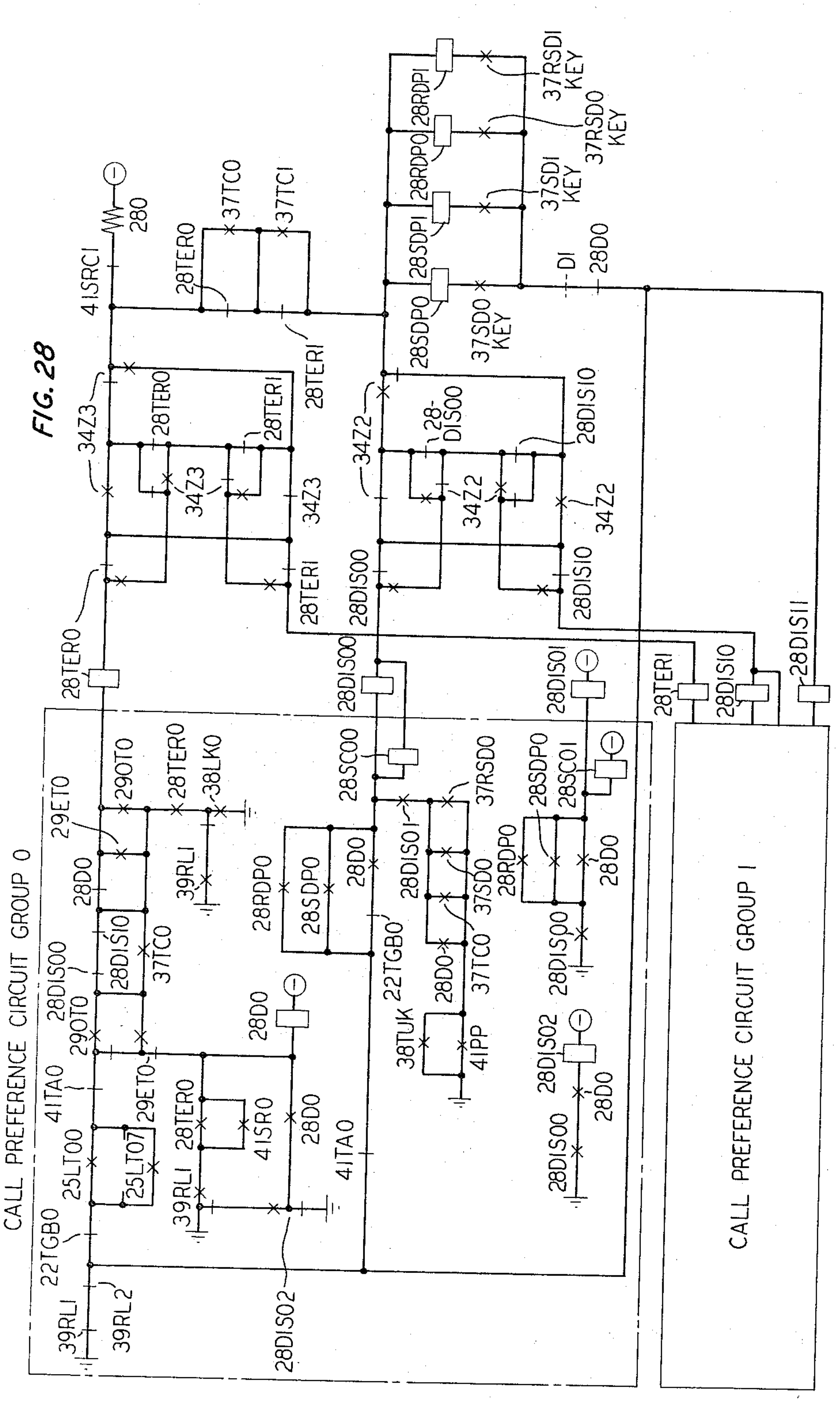
Figure 29:
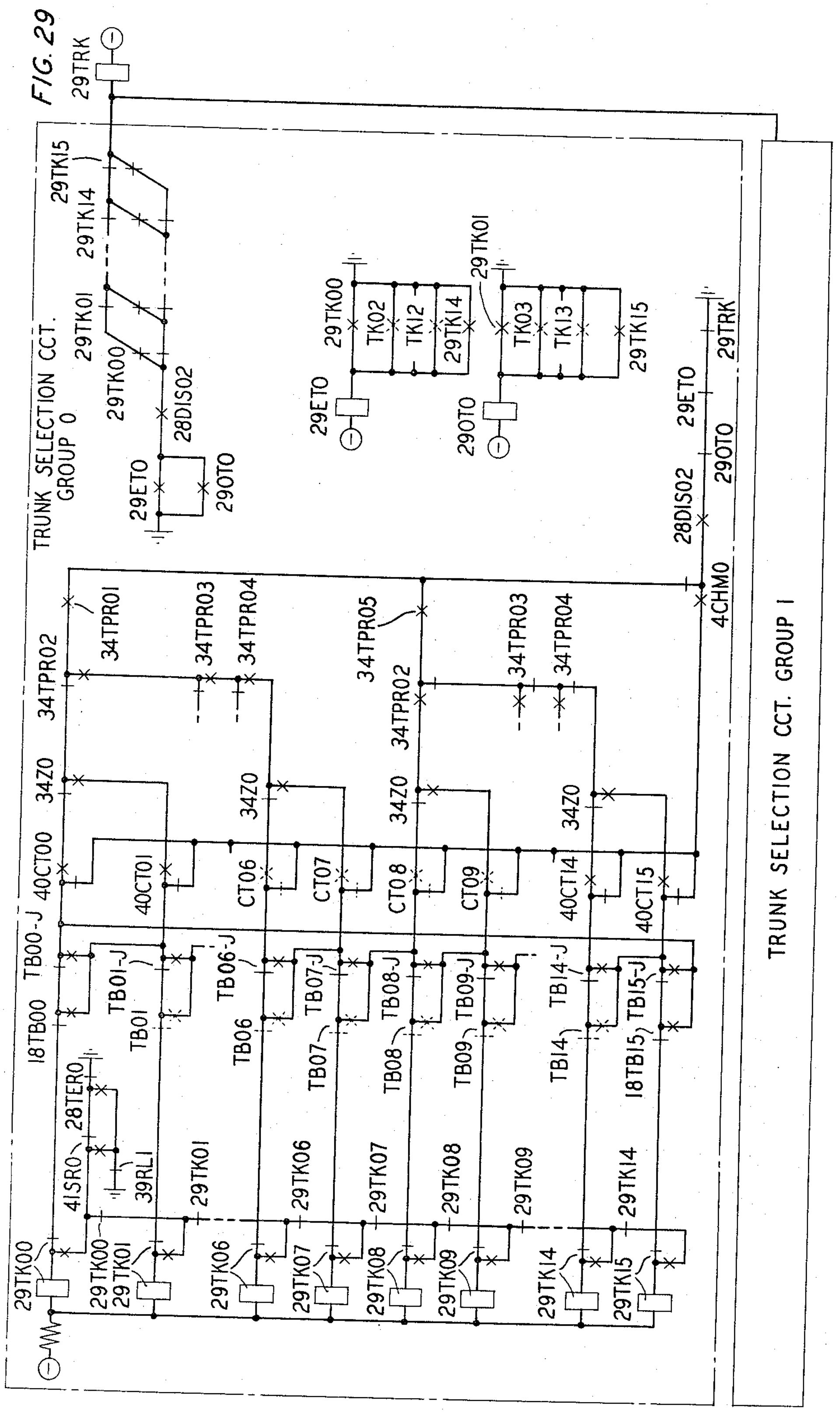
Figure 30:
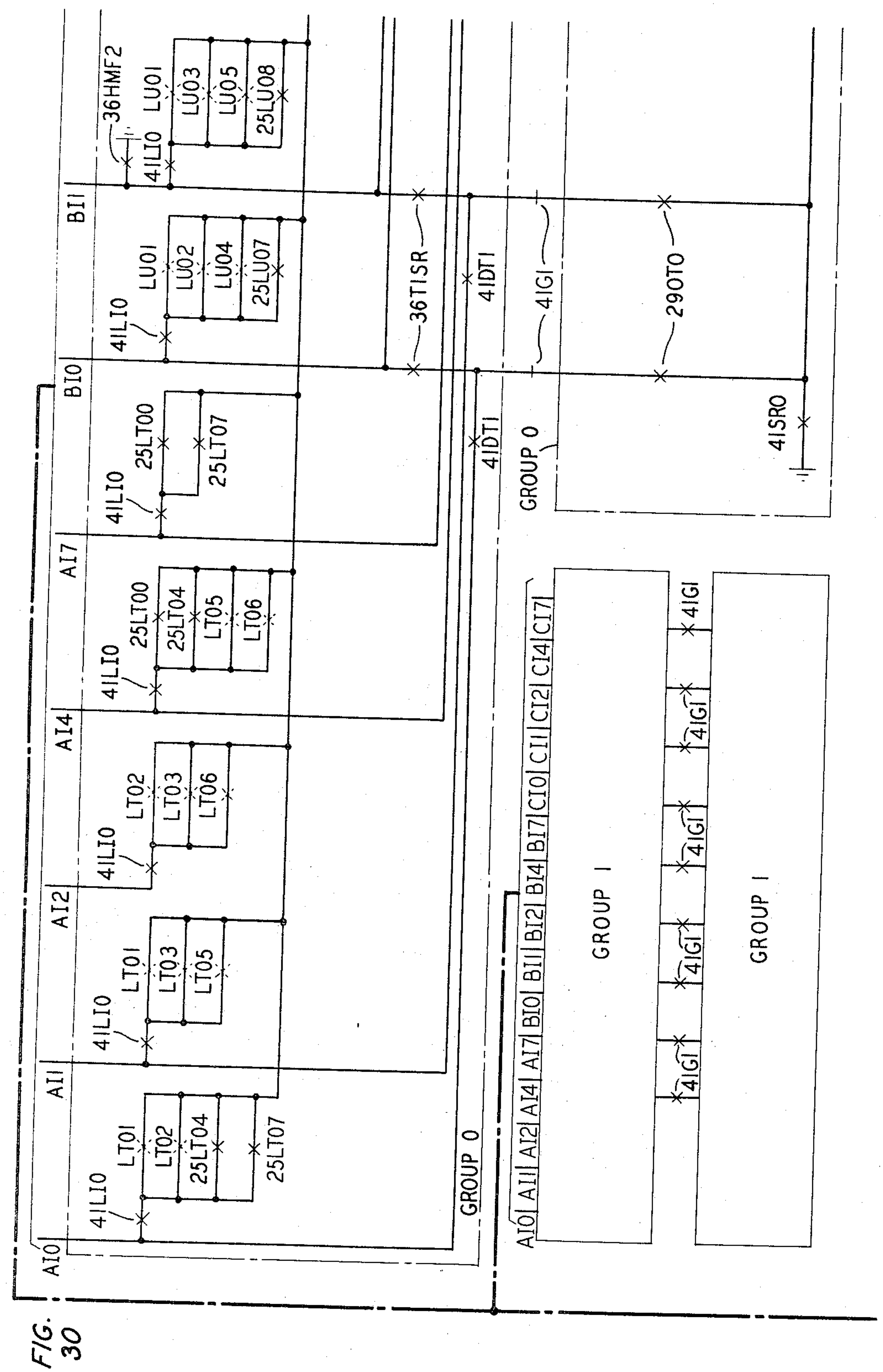
Figure 31:
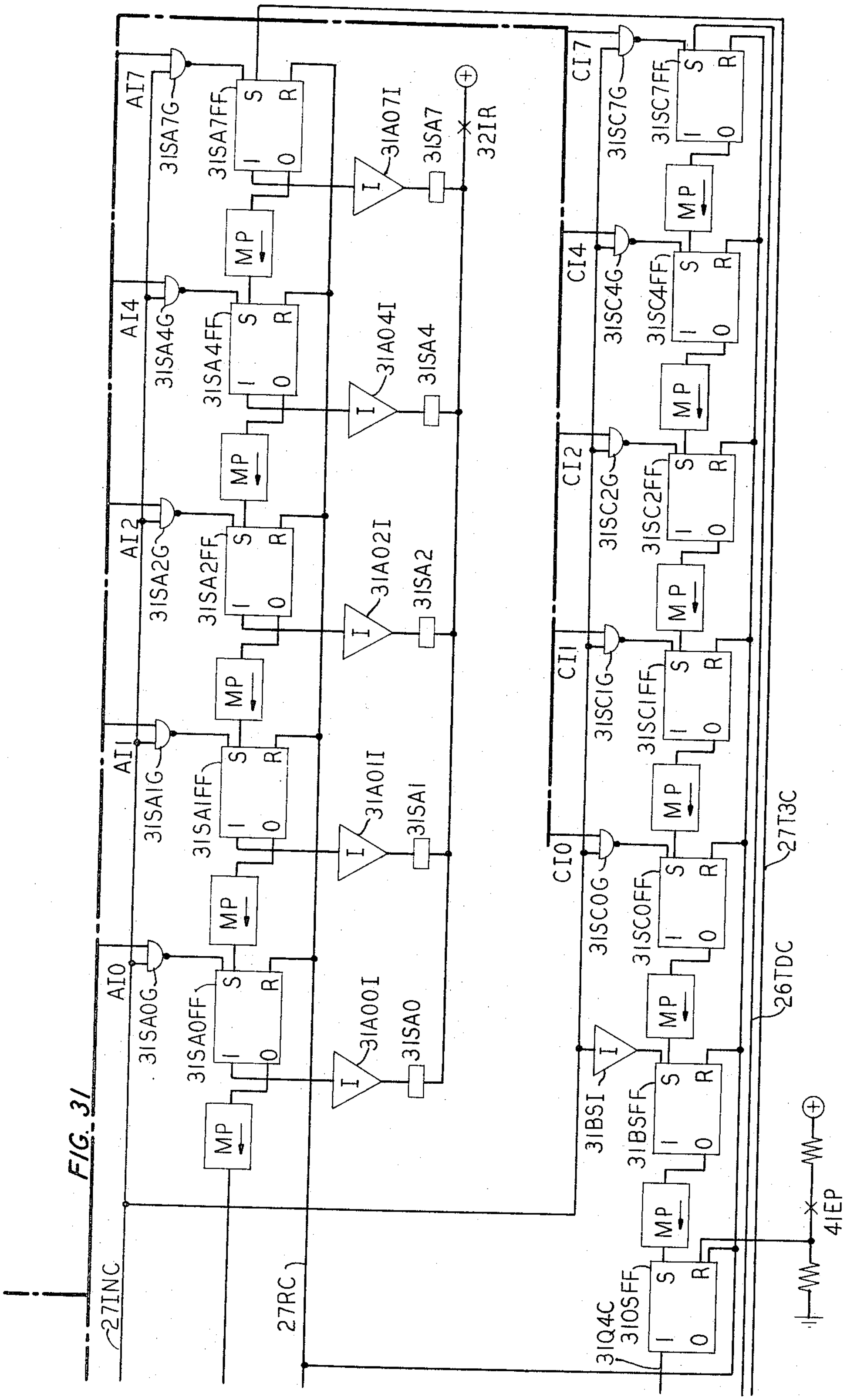
Figure 32:
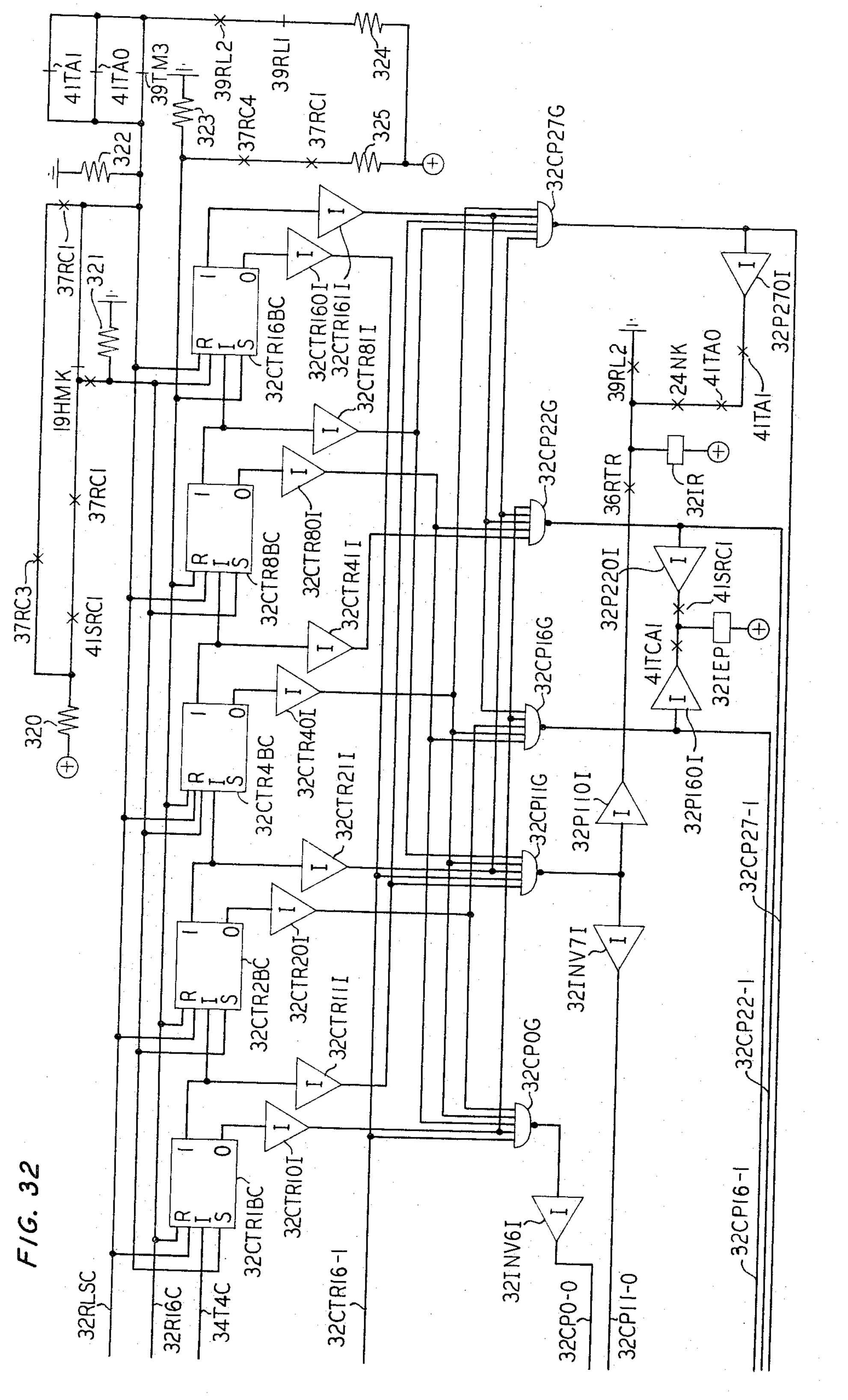
Figure 33:
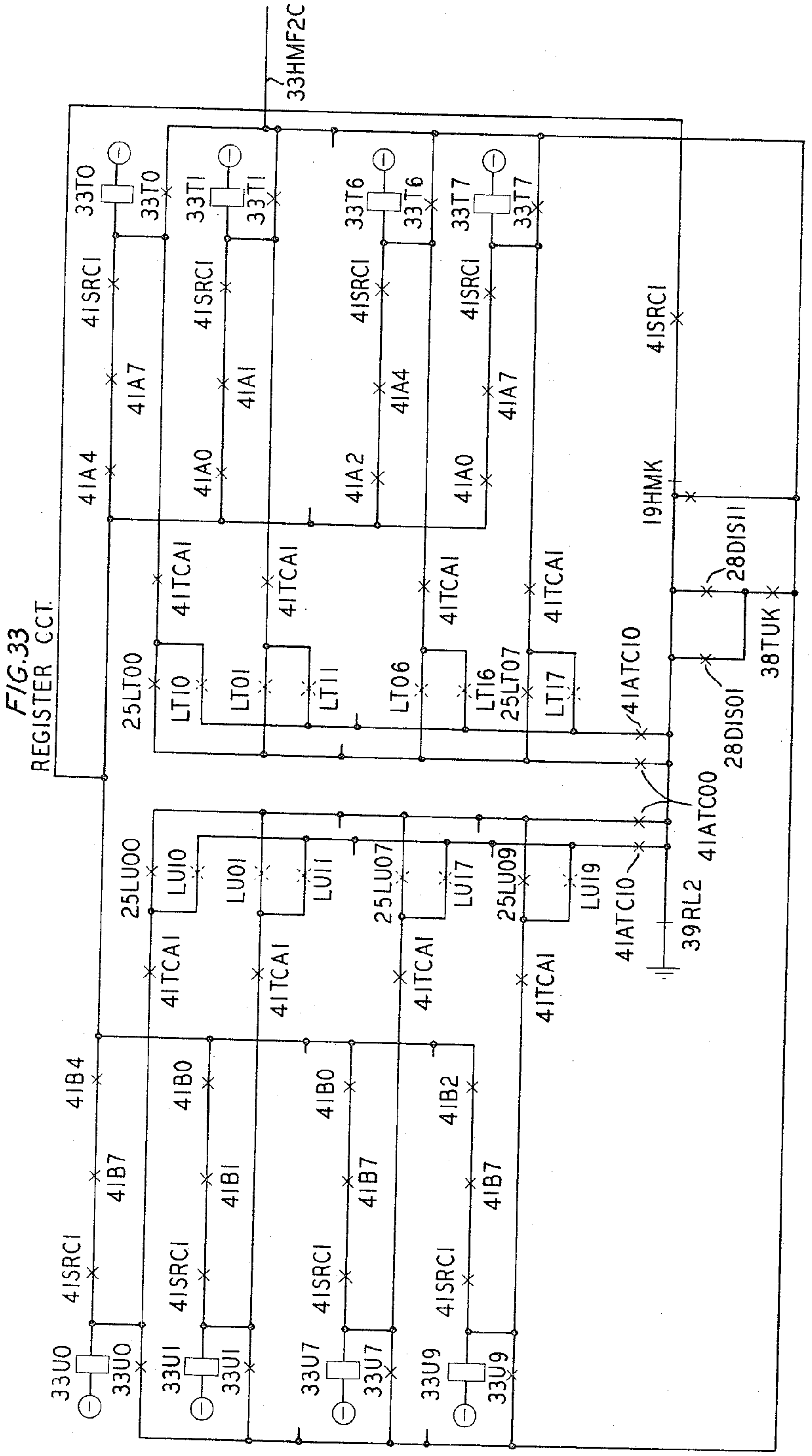
Figure 34:
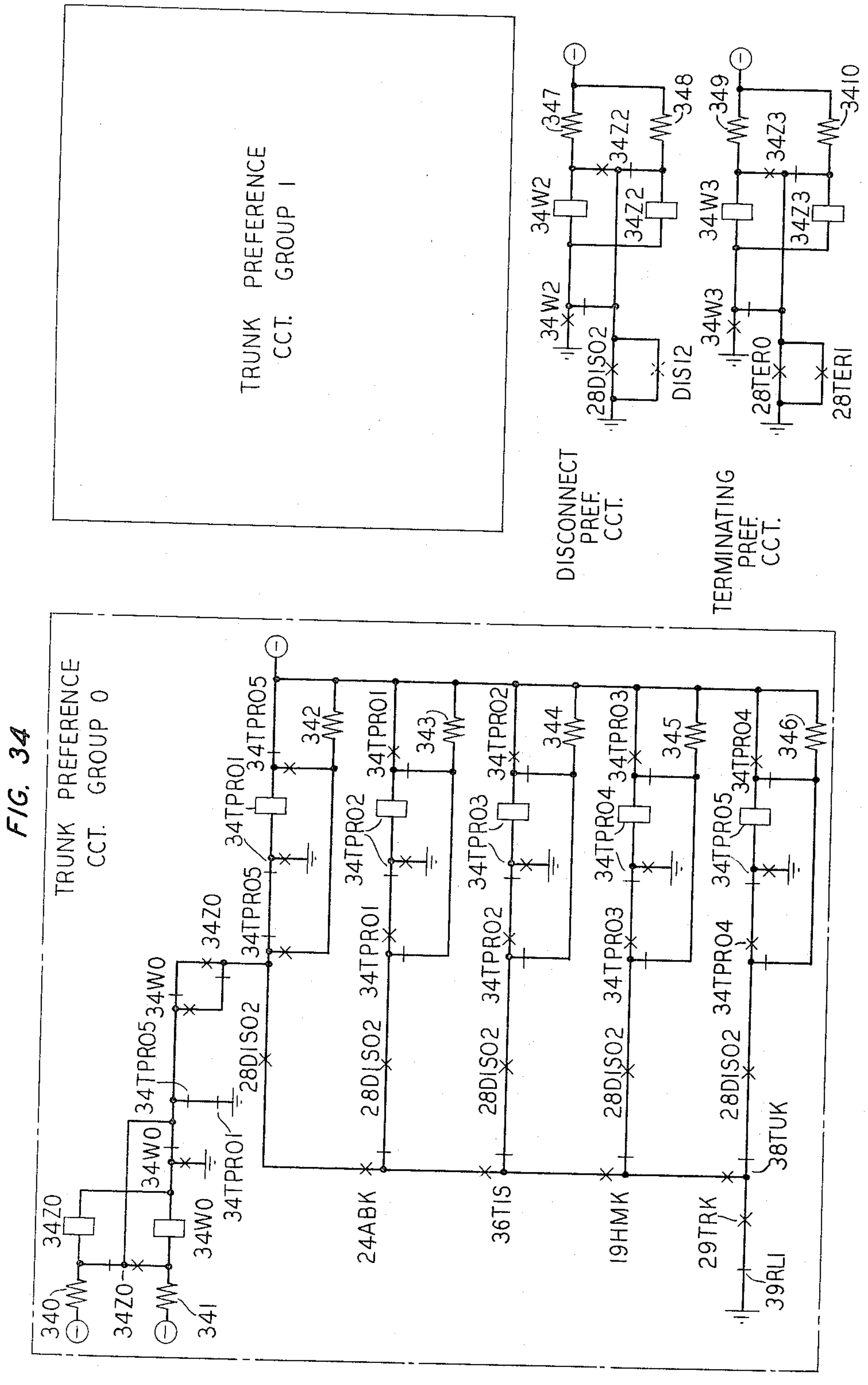
Figure 35:
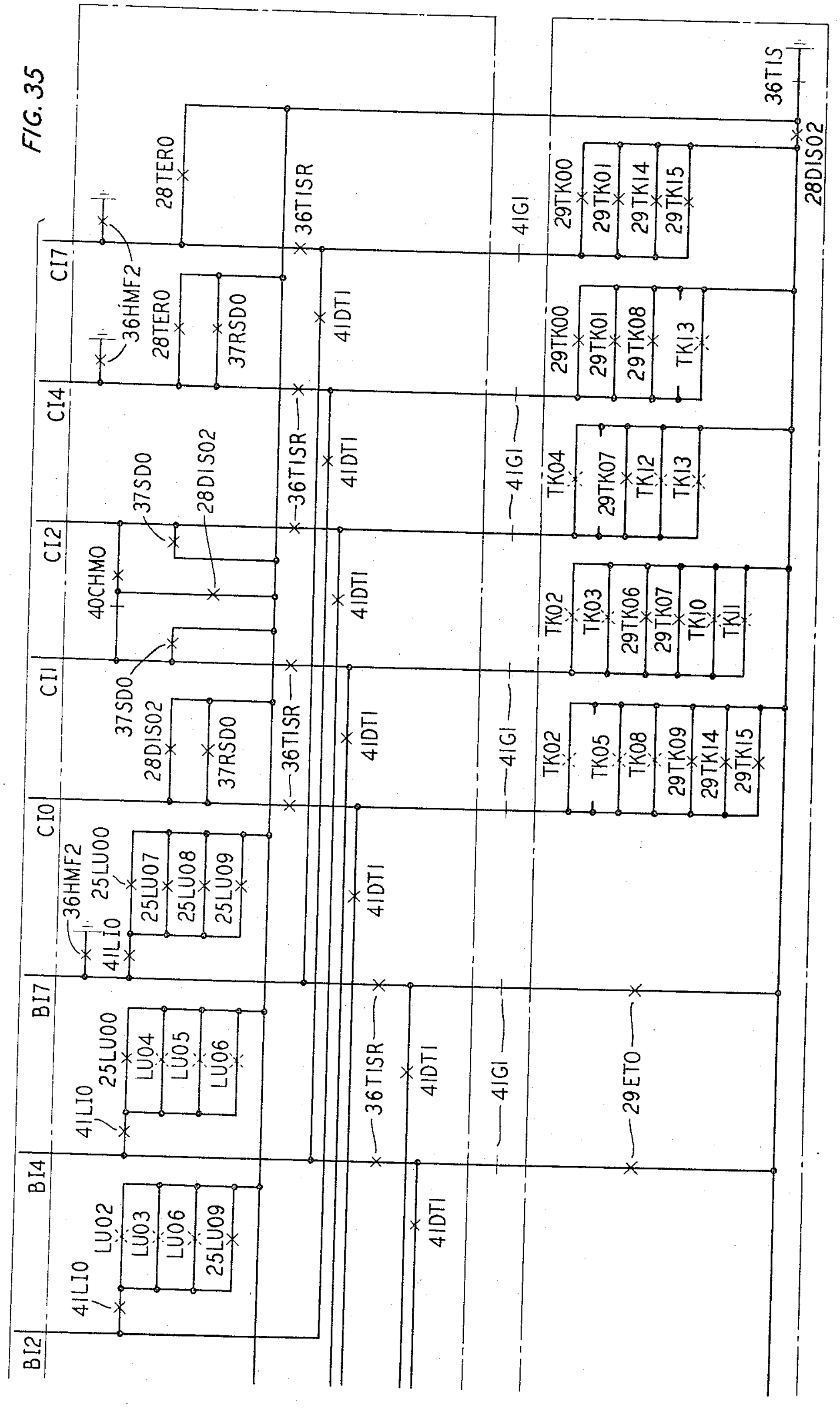
Figure 36:
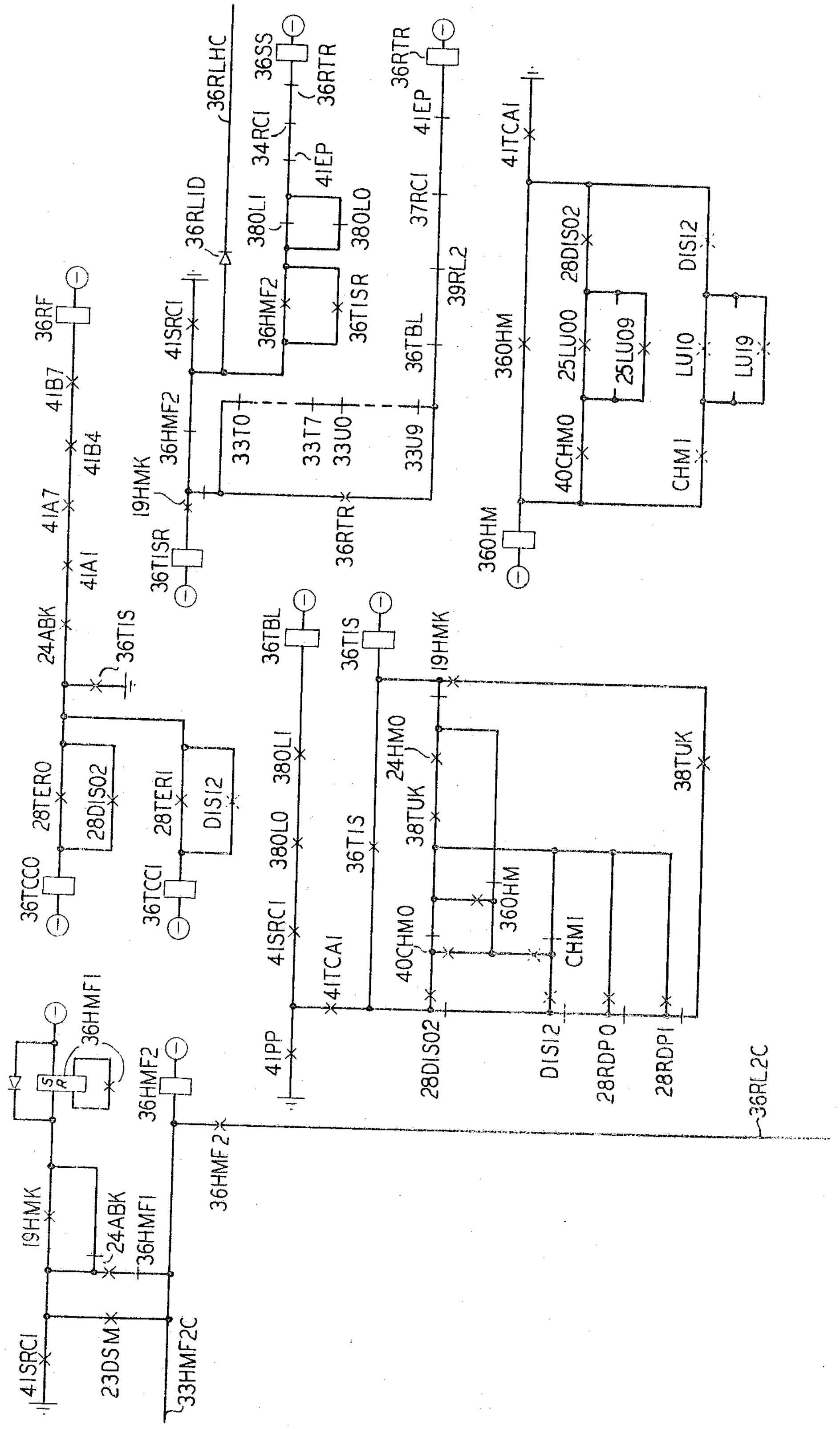
Figure 37:
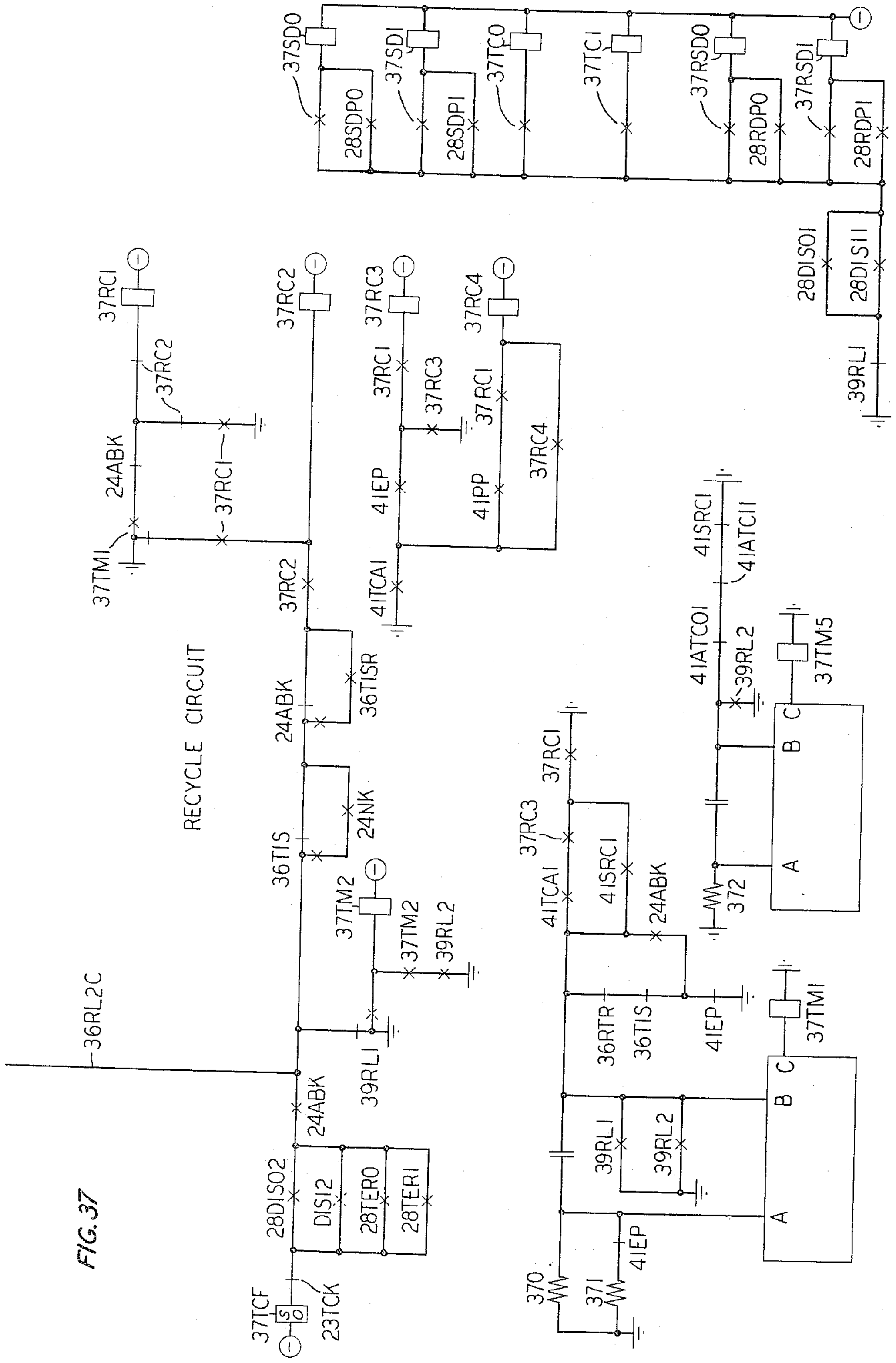
Figure 38:
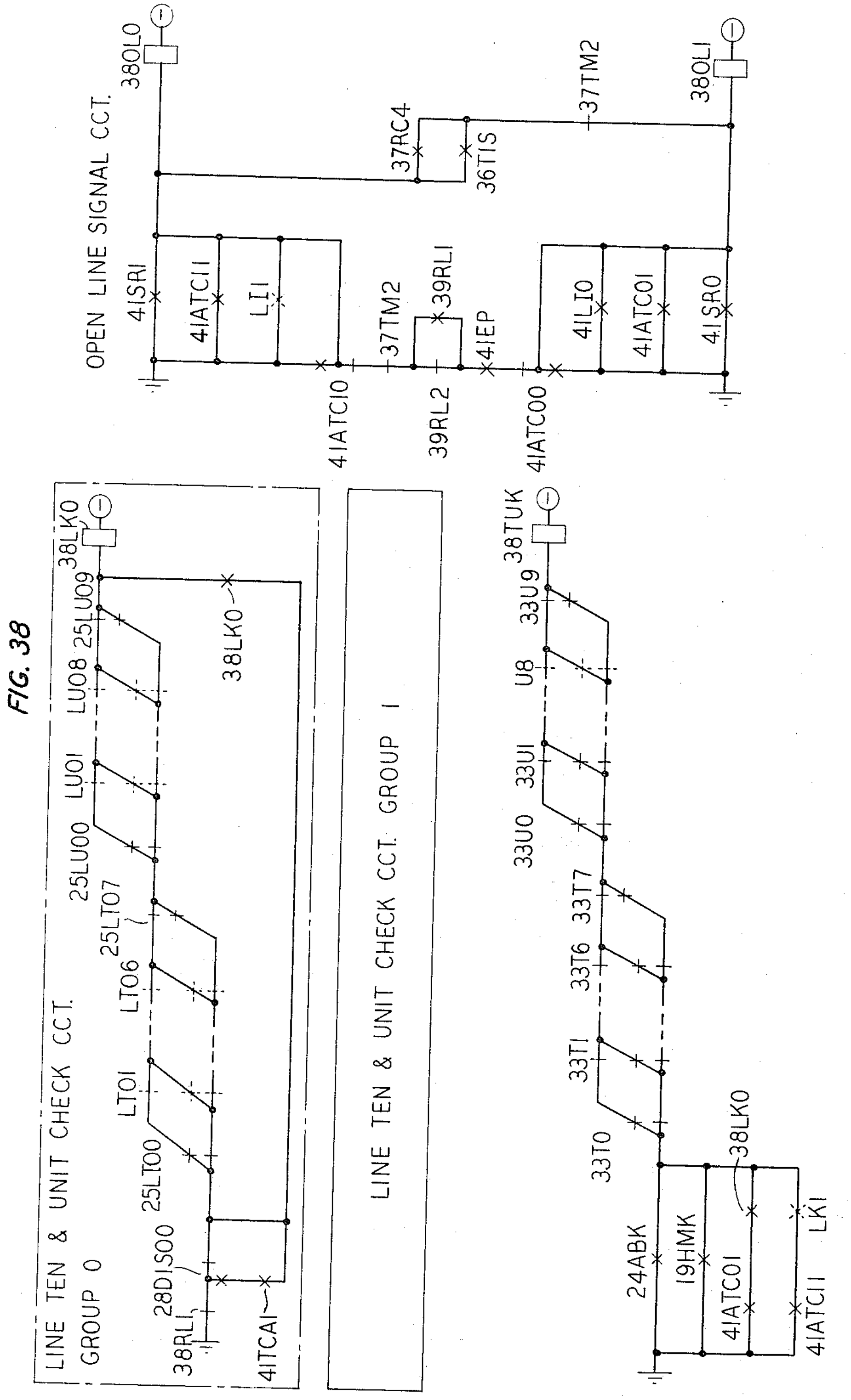
Figure 39:
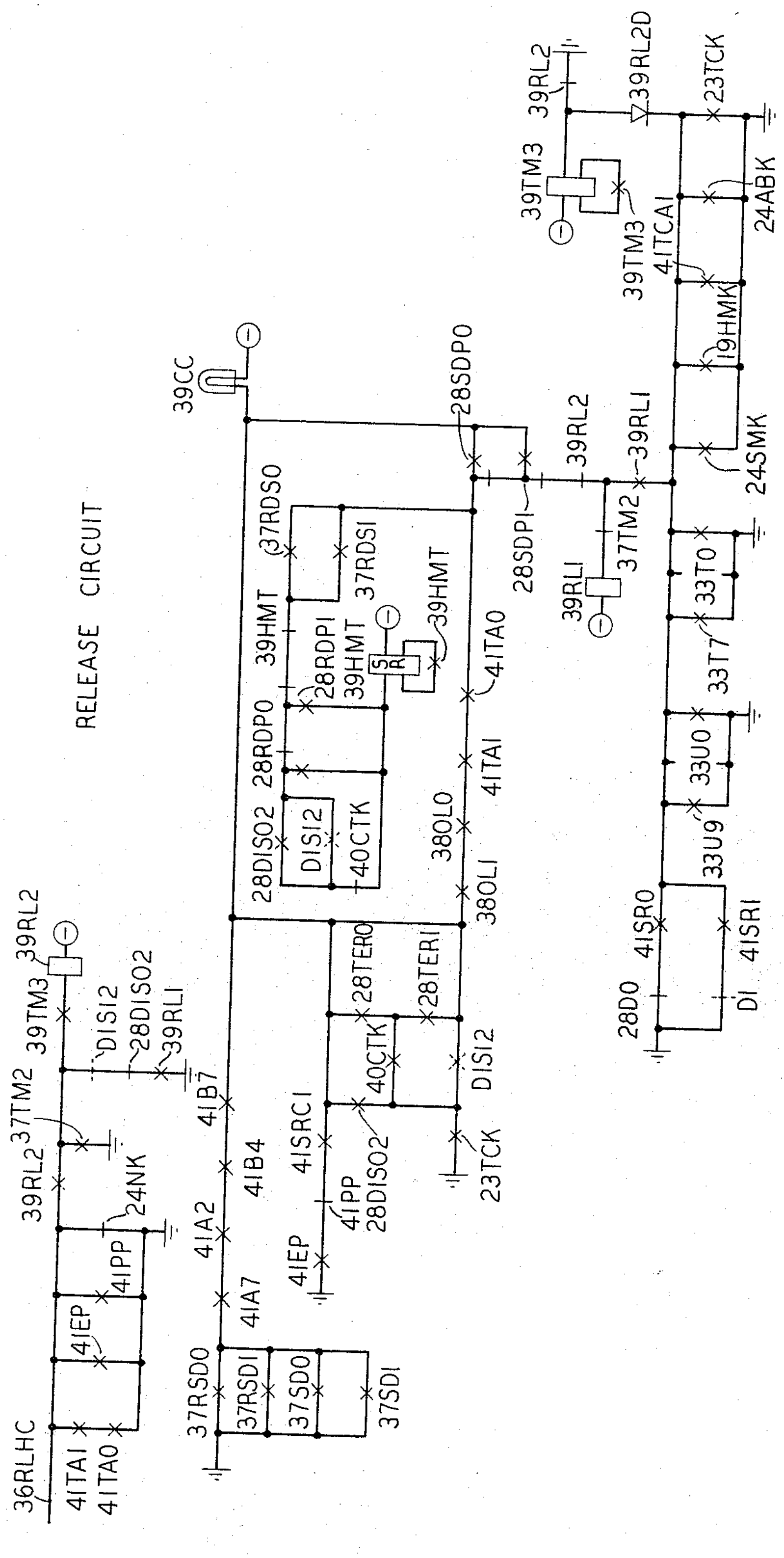
Figure 40:
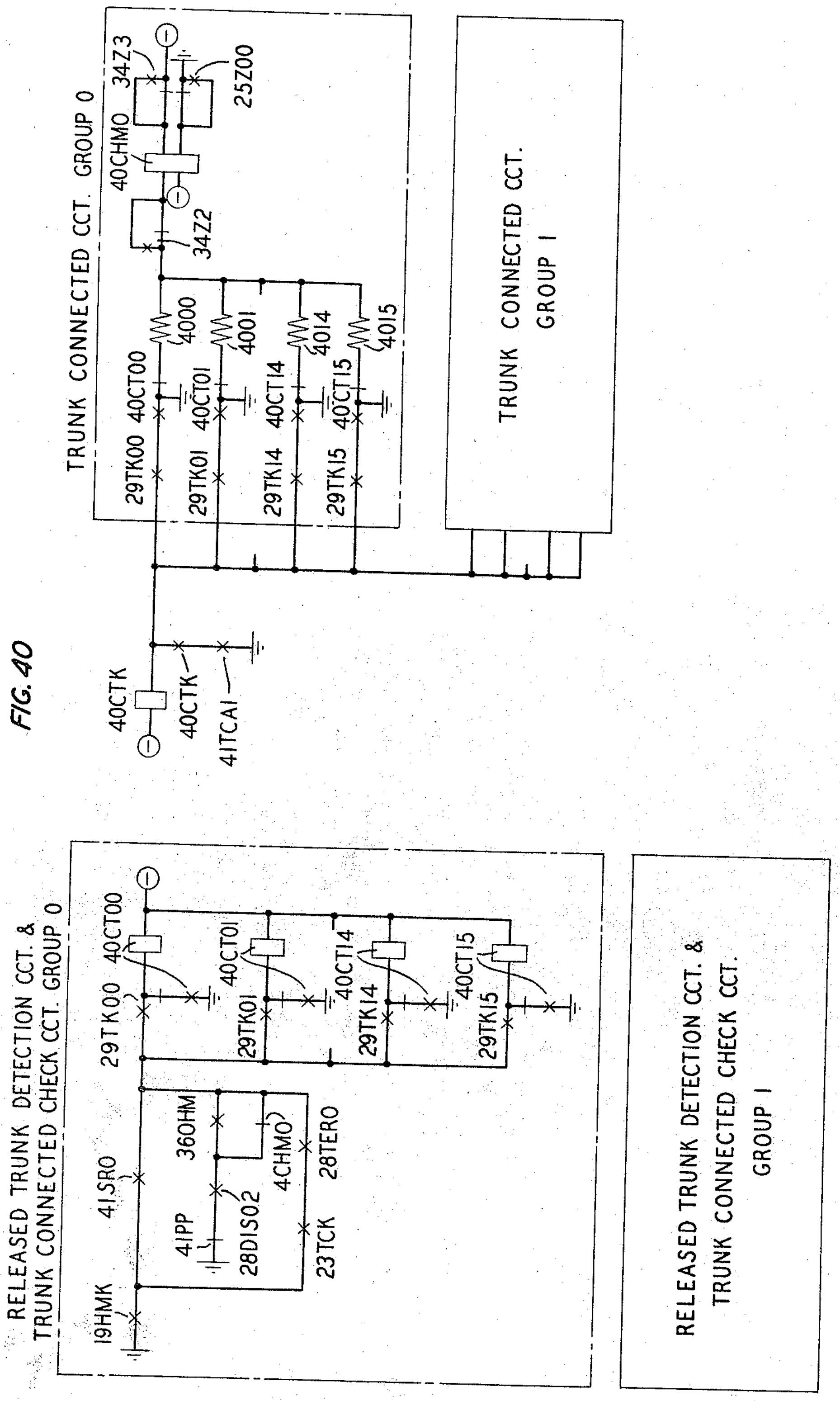
Figure 41:
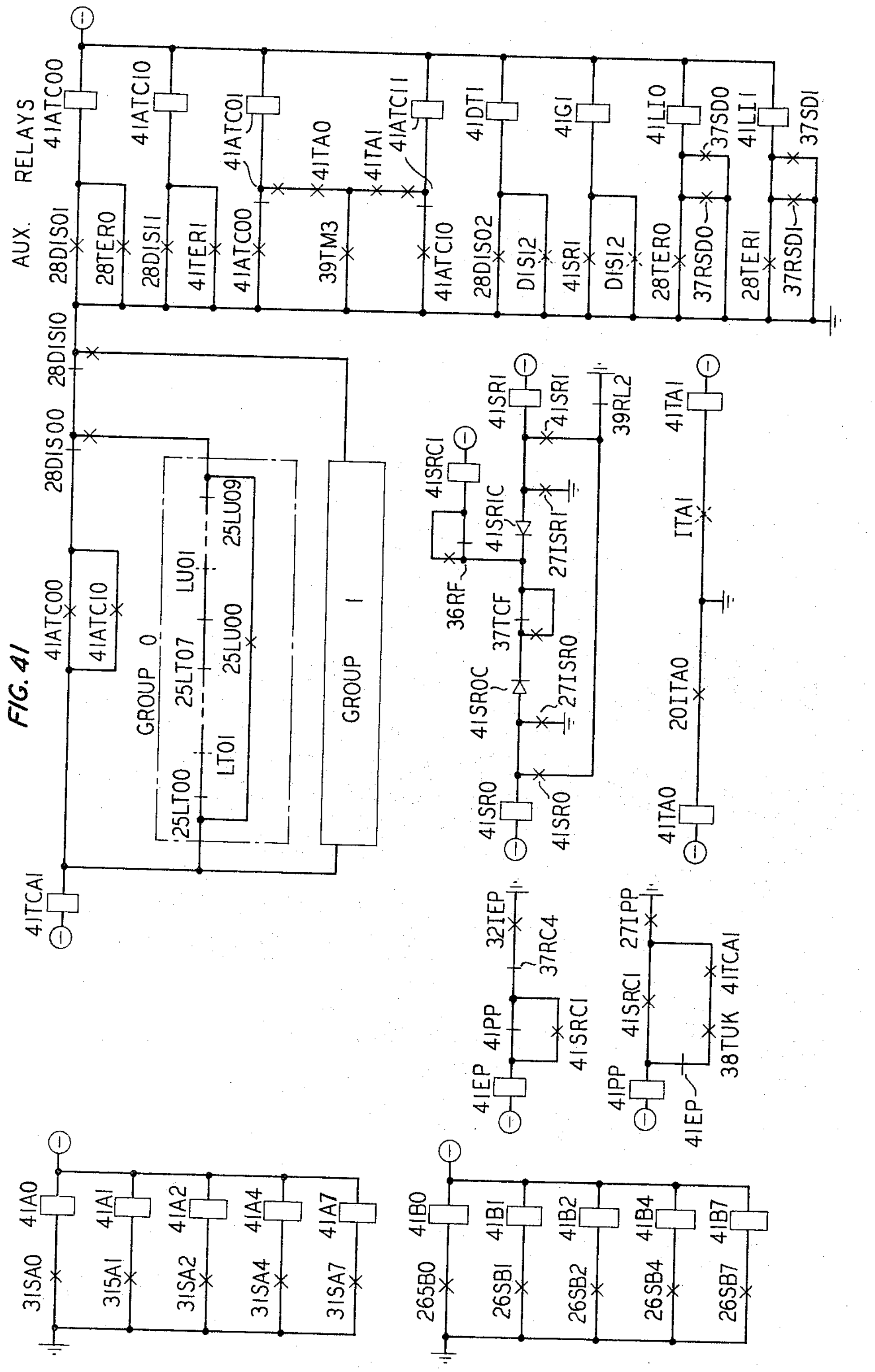
Figure 41A:
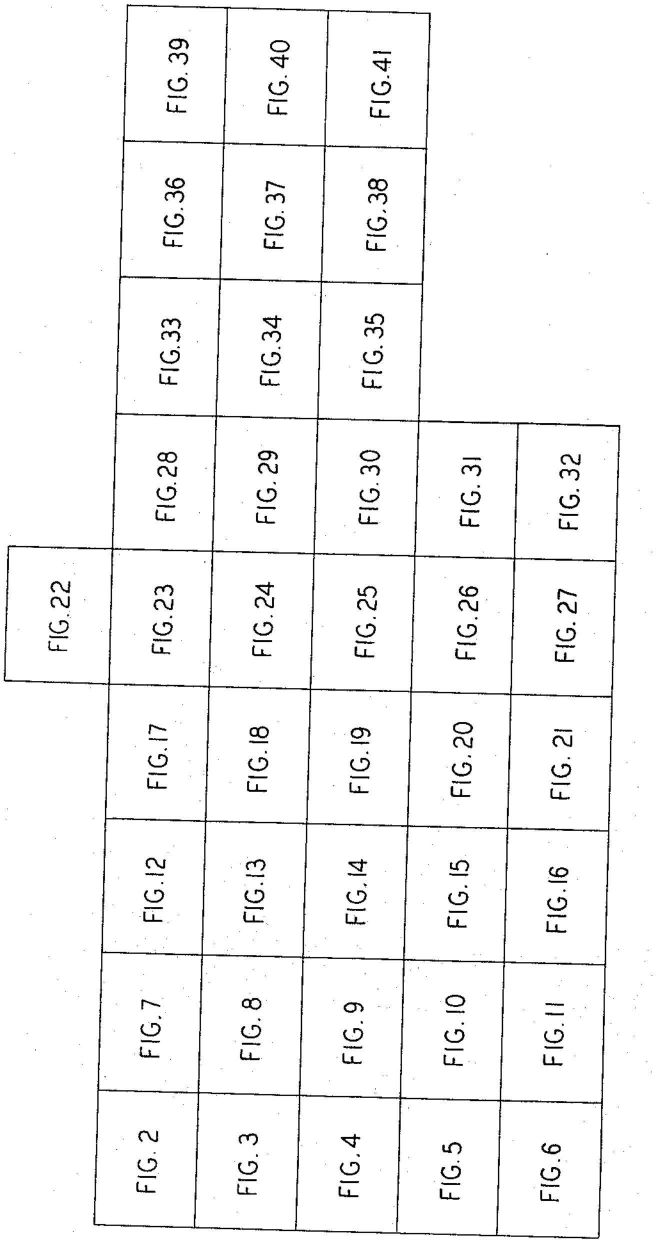
Figure 45:
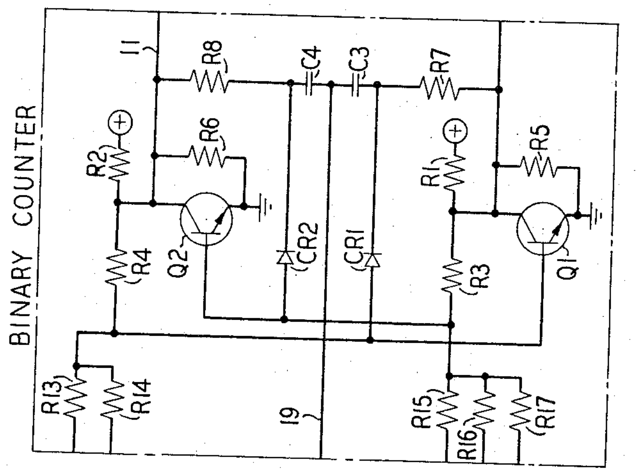
Figure 45A:
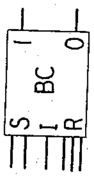
Figure 42A:
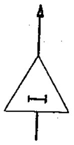
Figure 43A:
Figure 44A:
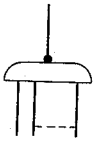
Figure 42:
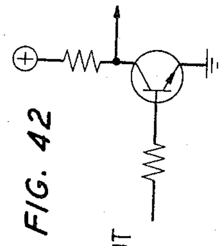
Figure 43:
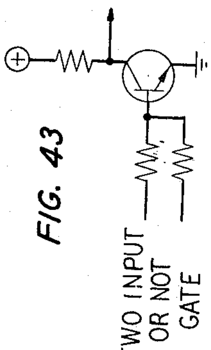
Figure 44:
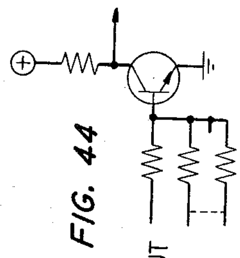
Figures 46, 46A, 47, 47A, 48, 48A, 49, 49A:
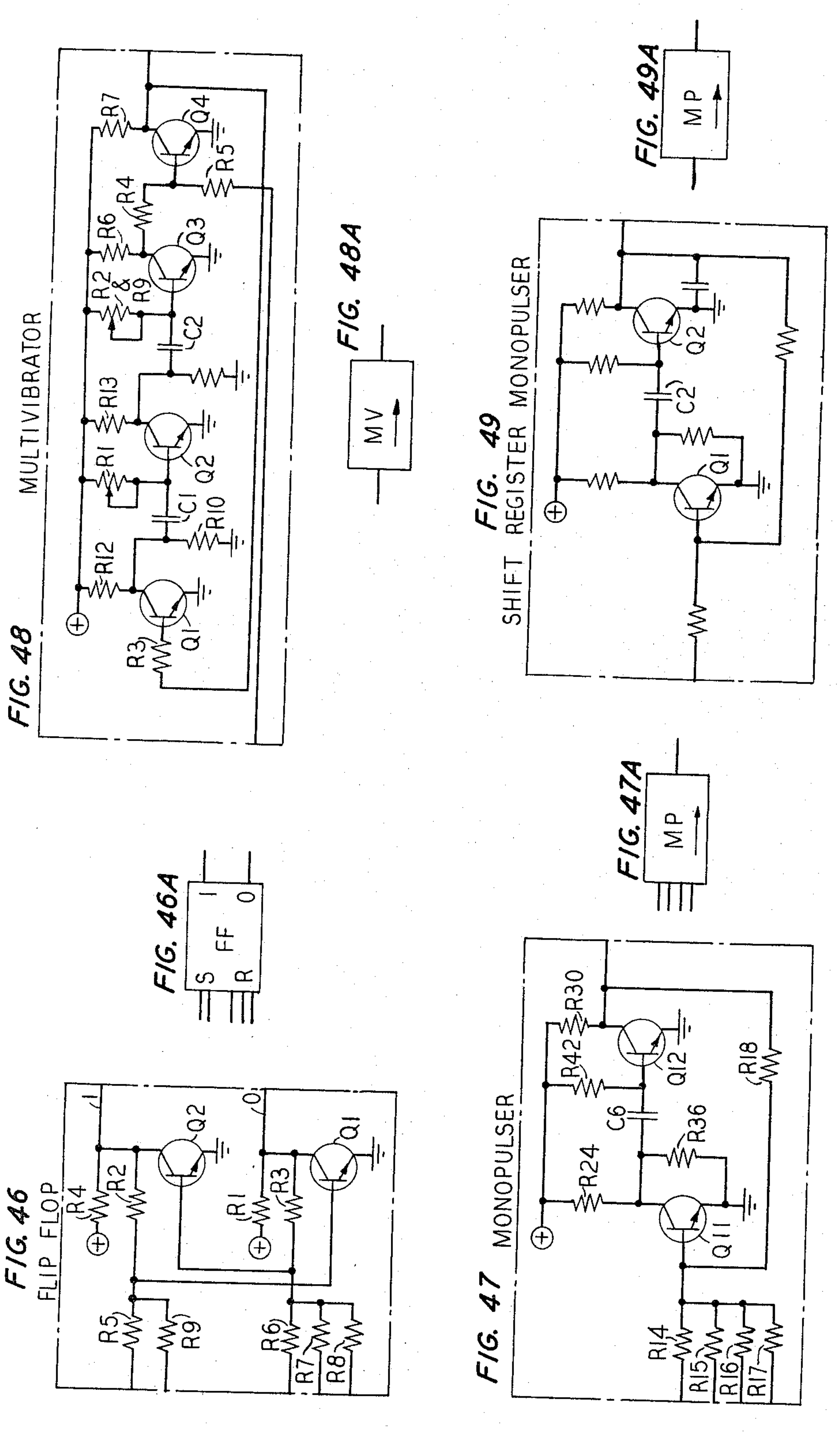
Figures 50, 50A, 50B:
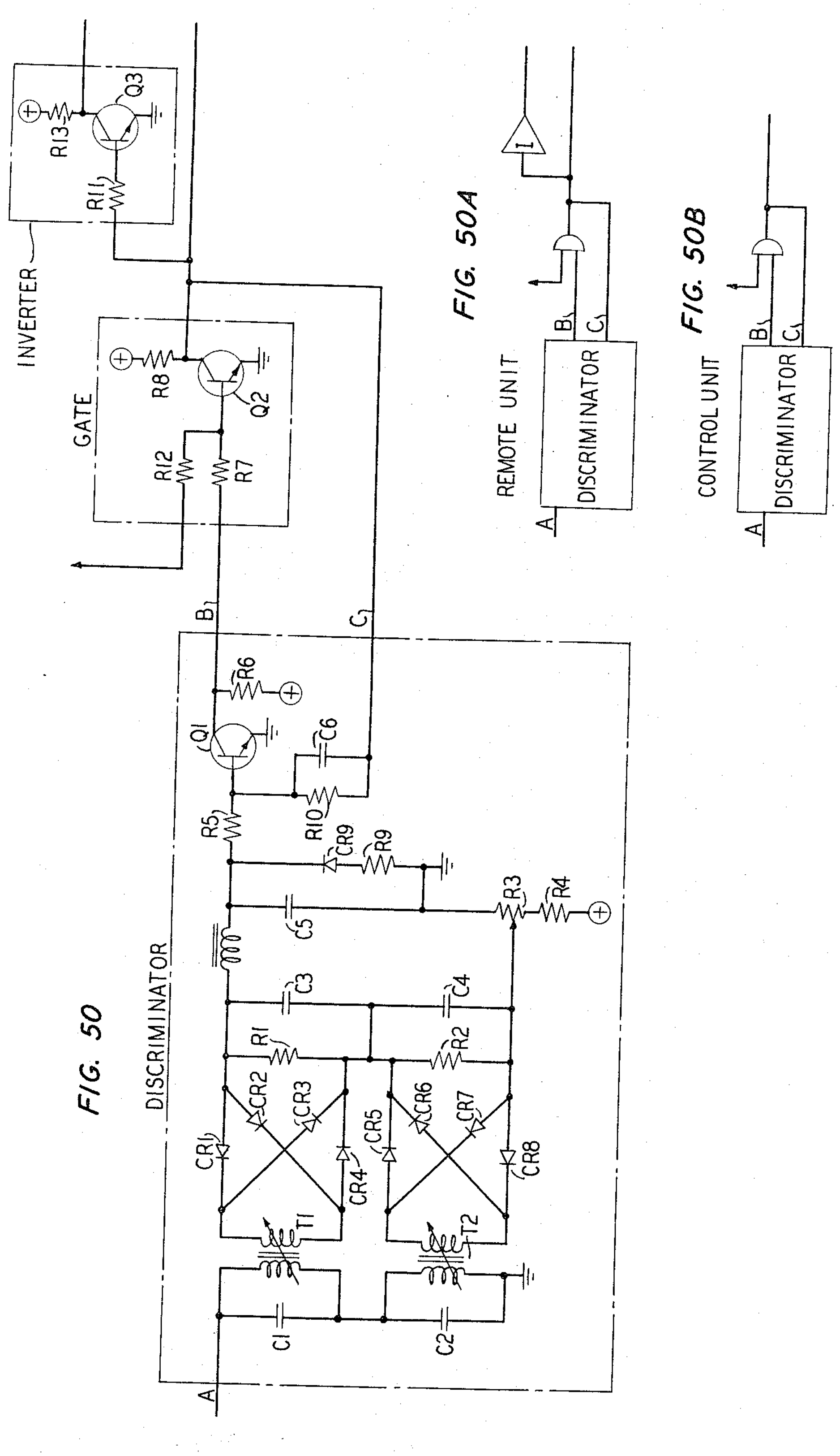
Figures 51, 51A, 52, 52A:
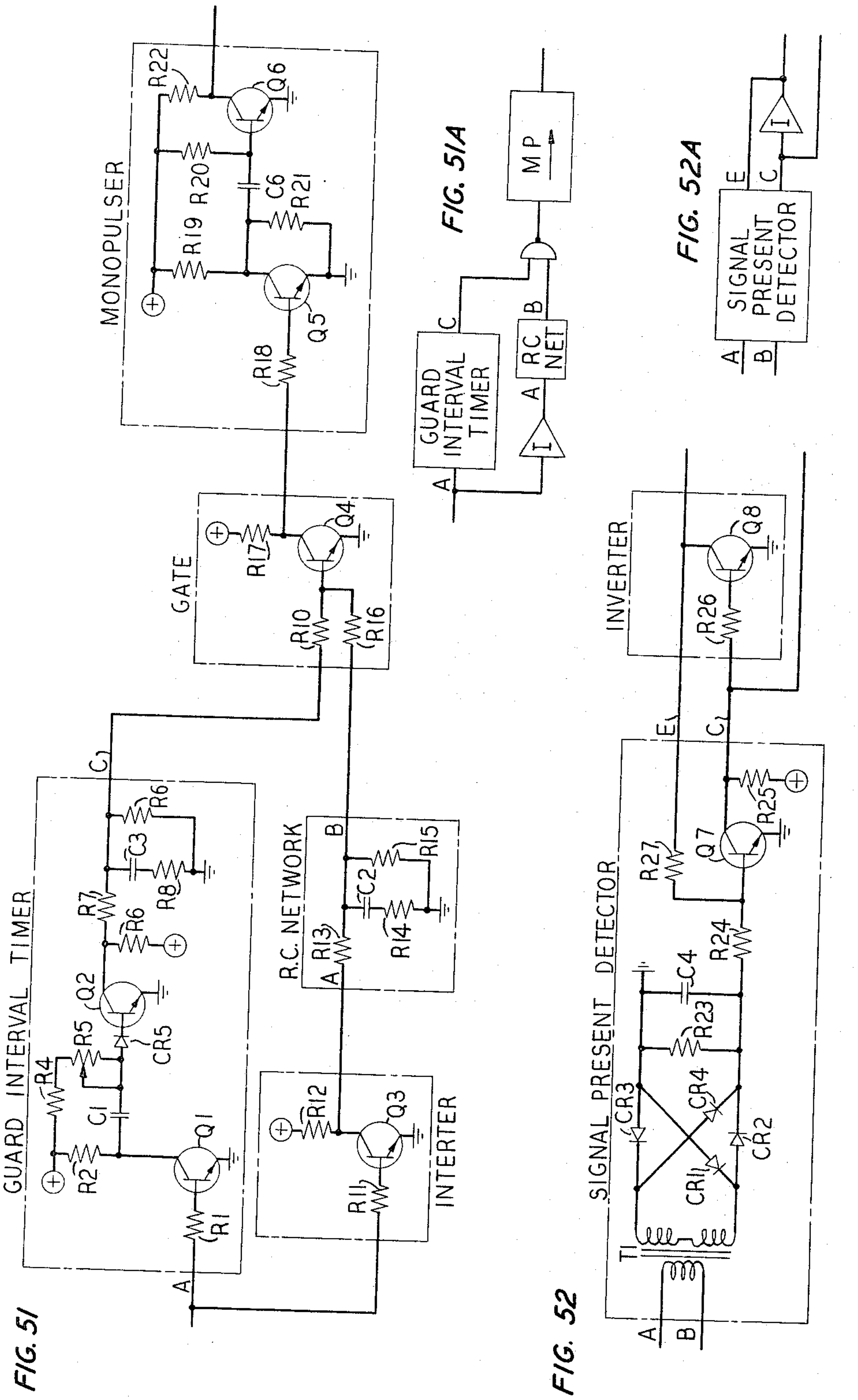
Figure 55:
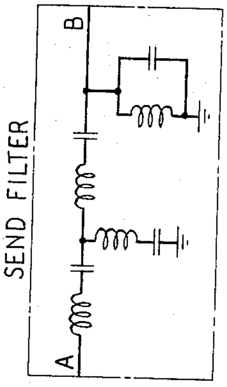
Figure 55A:
Figure 53A:
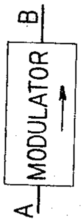
Figure 54A:
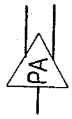
Figure 53:
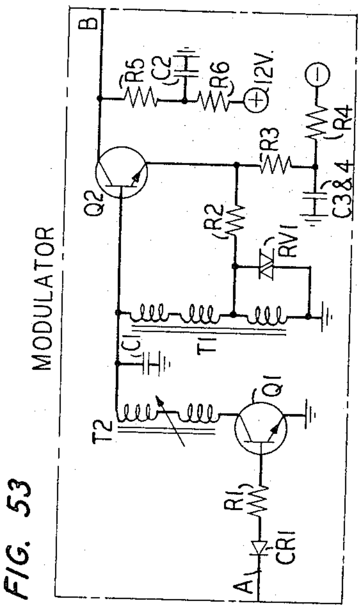
Figure 54:
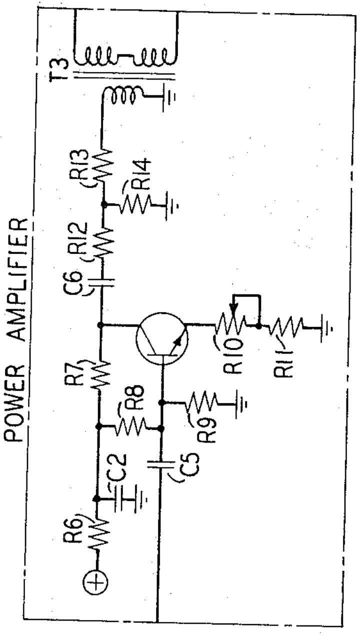
Figure 57A:
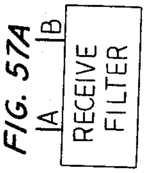
Figure 56A:
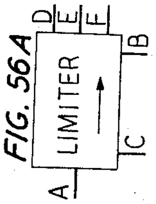
Figure 57:
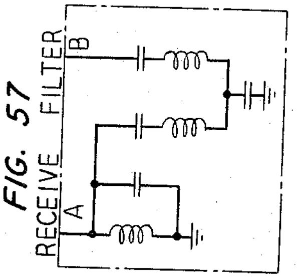
Figure 56:
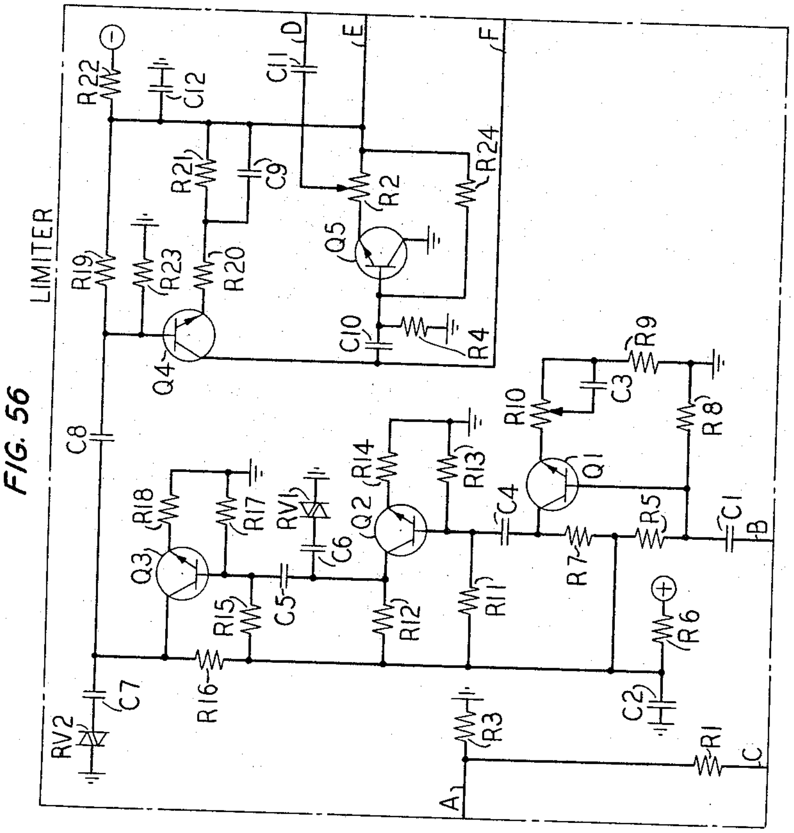

FIG. 4 includes the relay circuitry responsive to the shift register circuitry of FIGS. 5 and 10;

FIG. 5 shows a portion of the shift register circuitry utilized in storing information received from and transmitted to a central office;

FIG. 6 includes the cascaded binary cells utilized in timing control operations;

FIG. 7 includes the select magnet circuitry for the crossbar switches of FIGS. 2 and 3;

FIG. 8 shows the hold magnet circuits for the crossbar switches of FIGS. 2 and 3;

FIG. 9 includes call preference and trunk preference and control relays;

FIG. 10 shows additional shift register circuitry which operates in conjunction with that of FIG. 5;

FIG. 11 includes timing flip-flop elements utilized in the control operations of the concentrator;

FIG. 12 shows checking circuitry for use in conjunction with the line and trunk identification relays;

FIG. 13 includes identification equipment for determining the tens and units designations of a service requesting line;

FIG. 14 shows additional timing, checking and release circuitry utilized in the control functions of the concentrator;

FIG. 15 includes the receiving and transmitting equipment for use in conjunction with comparable equipment at the control units for transmitting and receiving control information;

FIG. 16 includes the binary counter circuitry responsive to the local oscillator for timing the concentrator control operations;

FIGS. 17–41 include the detailed circuitry of the control unit shown in outline form in FIGS. 1C and 1D;

FIGS. 17 and 18 show the crossbar switch circuitry for control unit 0;

FIG. 19 includes the hold magnet operating and control circuitry for the crossbar switches of FIGS. 17 and 18;

FIG. 20 discloses the transmitting and receiving equipment of the control unit for use in conjunction with the comparable equipment of FIG. 15;

FIG. 21 includes the binary counting circuitry responsive to the oscillator at the control unit for determining the timing of concentrator control functions;

FIG. 22 includes circuitry effective in response to busy conditions on lines and trunks;

FIG. 23 includes the select magnet operating and control circuitry for the crossbar switches of FIGS. 17 and 18;

FIG. 24 includes checking circuitry for the shift register and select magnets of FIG. 23;

FIG. 25 includes relay circuitry for preventing double seizure on a terminating call and also preference control circuitry;

FIG. 26 shows a portion of the shift register circuitry utilized in storing information received from and transmitted to the remote unit;

FIG. 27 includes additional timing circuitry for governing the control functions of the concentrator;

FIG. 28 includes call preference control circuitry for remote unit 0 in detail and for remote unit 1 in outline form;

FIG. 29 includes the details of the trunk selection circuitry for both remote units;

FIG. 30 includes the contacts of relays responsive to the binary cells of the shift register;

FIG. 31 includes additional shift register circuitry used in conjunction with that of FIG. 26;

FIG. 32 includes a binary counter for use in governing the timing of control functions in the control unit of the line concentrator;

FIG. 33 shows the relays used in registering the identification of a line being serviced;

FIG. 34 includes the relay circuitry for determining trunk preference for utilization in conjunction with the selection circuitry of FIG. 29;

FIG. 35 shows additional relay contact circuitry responsive to the shift register;

FIGS. 36 and 37 include additional relay circuitry for exercising control functions in the line concentrator;

FIG. 38 includes the check circuitry for the line identification;

FIG. 39 includes relay circuitry for use in releasing the control relays of the control unit;

FIG. 40 includes trunk verification and checking circuitry;

FIG. 41 includes auxiliary input relay circuitry;

FIG. 41A shows relative disposition of FIGS. 2–41;

FIGS. 42–44 disclose the detailed circuitry of the Or-Not gates;

FIG. 45 shows the details of the binary counter circuit;

FIG. 46 is a detailed rendition of the circuitry of the flip-flop package;

FIG. 47 shows the details of the monopulser described in FIGS. 2–41 in outline form;

FIG. 48 shows the details of the multivibrator circuit;

FIG. 49 shows the details of the monopulser for use in the shift register shown in outline form in FIGS. 5, 10, 26 and 31;

FIGS. 42A–49A show the symbolic representation of the circuitry set forth in FIGS. 42–49, respectively;

FIG. 50 shows the details of the discriminator circuit shown in outline form in FIGS. 15 and 20;

FIGS. 50A and 50B show the symbolic representation of the circuitry set forth in FIG. 50 and located, respectively, at the remote unit and control unit;

FIG. 51 shows the details of the guard interval timer 15GIT and 20GIT0/1;

FIG. 52 shows the details of the signal present detector shown in outline form in FIGS. 15 and 20;

FIG. 53 shows the details of the modulator circuit 15M and 20M0/1;

FIG. 54 shows the details of the power amplifier 15PA and 20PA;

FIG. 55 shows the details of the send filter utilized in conjunction with the modulators at both the remote units and the control units;

FIG. 56 shows the details of the limiters 15L and 20L0/1;

FIG. 57 shows the components of the receive filter 15FR and 20FR0/1; and FIGS. 51A–57A show the symbolic representation of the circuitry set forth in FIGS. 51–57, respectively.

The above-referred-to circuitry is jointly described in the present specification and in application Ser. No. 344,981, filed on even date herewith of Rettig-Stagg and also application Ser. No. 344,863, filed or even date herewith of A. R. Trumbull.

In describing the invention, the subject matter has been given a general treatment followed by a detailed description in accordance with the following index.

INDEX (1) General Description: (1.1) General Description of Major Components
(2) General Description of Operation:
  (2.1) Service Request Call
  (2.2) Terminating Call
  (2.3) Disconnect Call
  (2.4) Service Denial Call
(3) Detailed Description of Major Components:
  (3.1) Line and Trunk Switching—
    (3.11) Remote Unit
    (3.12) Control Unit
  (3.2) Signaling—
    (3.21) Send Circuit, Modulator
    (3.22) Send Circuit, Filter and Power Amplifier
    (3.23) Receive Circuit, Filter and Limiter
    (3.24) Receive Circuit, Discriminator (FIG. 50)
    (3.25) Signal Present Detector
    (3.26) Guard Interval Timer
  (3.3) Synchronization—
    (3.31) Shift Pulse
    (3.32) "Write" Pulse
    (3.33) Call Progress Pulse
  (3.4) Trunk Selection—
    (3.41) Trunk Preference and Selection on Normal Disconnect Call
    (3.42) Trunk Preference and Selection on Special Disconnect Call
  (3.5) Line Identification
  (3.6) Call Preference
  (3.7) Electronic Logic Circuitry—
    (3.71) Basic Or-Not Gate
    (3.72) Flip-Flop
    (3.73) Shift Register
    (3.74) Monopulser
    (3.75) Oscillator
    (3.76) Binary Cell
(4) Detailed Description of Service Request Call:
  (4.1) Line Relay and Lockout Relay Operation
  (4.2) Transfer of Information to Shift Register
  (4.3) Transmission of Line Identification to Office
  (4.4) Reception of Line Identification at Office Control Unit
  (4.5) Registration of "Early" Dial Tone Start
  (4.6) Select and Hold Magnet Operation
  (4.7) Transmission of Trunk Information to Remote Unit
  (4.8) Trunk Number Storage in Shift Register at Remote Unit
  (4.9) Trunk Number Translation and Match Check at Remote Unit
  (4.10) Release of Trunk Register at Remote Unit
  (4.11) Release of Electromechanical Circuit at Control Unit
(5) Detailed Description of Terminating Call:
  (5.1) Start Signal to Remote Unit
  (5.2) Transmission of Information Stored in Shift Register
  (5.3) Select Magnet Operation and Hold Magnet Operation at Control Unit
  (5.4) Trunk Check on Terminating Call
(6) Disconnect Call:
  (6.1) Start of Disconnect Call
  (6.2) Trunk Preference on a Normal Disconnect Call
  (6.3) Trunk Preference on a Special Disconnect Call
  (6.4) Line Identification on a Special Disconnect Call
  (6.5) Trunk Check at Control Unit
(7) Service Denial Call
(8) Release Service Denial Call
(9) Timing Operations and Checking Circuits:
  (9.1) Recycle Timing
  (9.2) Timing for Release of Relay 39RL1
  (9.3) Timing for Release of Relay 39RL2
  (9.4) Overall Timer
  (9.5) Hold Magnet Failure Relays
  (9.6) Trunk Check Failure Relay
  (9.7) Hold Magnet Timing
  (9.8) Trunk Overflow Circuit
(10) Preference Control:
  (10.1) Terminating Preference
  (10.2) Line Lockout Preference
  (10.3) Trunk Group Busy

(1) GENERAL DESCRIPTION

Referring now to FIGS. 1A through 1D which show the concentrator in outline form, it is seen that the single control unit at the office serves two remote units 0 and 1, the former being shown in outline form and the latter generally.

(1.1) *General description of major components*

A number of subscribers which may illustratively total as many as seventy-eight at each remote unit are coupled to line circuits 10 in the office. The lines are further extended to crossbar switch network 11 by means of which they are coupled to a relatively smaller number of trunks 12. The trunks in turn extend to a similar crossbar switch 150 at the central office control unit. At that location the lines are re-expanded through the switch to a number of line circuits 151 in the office equal in number to the remote substation lines.

The electromechanical portion of the remote unit 0 is shown in FIG. 1A and includes control facilities 15 for selecting the particular hold magnet (unique to a line) and select magnet facilities 16 (unique to a trunk) to extend connections therebetween. In addition, a signal input circuit 17 and signal output circuit 18 act as buffers between the electronic circuitry of FIG. 1B and the electronic circuitry of FIG. 1A. A line lockout circuit 19 includes facilities responsive to the energization of a relay in line circuit 10 to identify the relay and deliver the information to the line register 100.

The trunk register and preselection circuit 101 is adapted to receive information from the control unit indicative of a preselected trunk and the disconnect control circuit 102 is effective when directed by the control unit to disconnect a particular line from a trunk which is preselected for the next service request or terminating call.

Substantially all operations in the electromechanical circuitry are checked in checking circuit 103. A timing circuit 104 is effective when the performance time of a particular function exceeds a predetermined time interval to effect a release of the equipment and to recycle or reinstitute the same function through sequence control circuit 105.

A signal control circuit 106 at the remote unit is effective to energize the electronic circuitry in preparation for signal transmission or reception. Release control circuit 154 is operative to supervise the release of all of the control circuitry in the electromechanical equipment and ultimately the only devices remaining operated in the electromechanical portion are the hold magnets which are magnetically latching and, therefore, do not require a continuous power supply as explained herein.

A data unit 108 adapted to initiate and receive data messages is used in conjunction with each substation 107. Thus, an off-hook condition at the substation will initiate a combined data transmission path and speech transmission path through the concentrator in the manner explained herein.

All of the signal transmission to and from the control unit is effected by high speed electronic circuitry shown in outline form for remote unit 0 in FIG. 1B. The point of ingress and egress for information to the electronic circuitry is the shift register 109 which is adapted to deliver information in parallel to the electromechanical equipment as well as receive information in parallel from the electronic equipment through the buffer stores 17 and 18. Moreover, the shift register is arranged to deliver information serially to the sender circuit 110 and to receive information in serial form from the receiver circuit 111. The overall sequence of operation of the electronic circuitry is reposed in control circuit 112. The basic program of operation of the shift register in receiving and transmitting information is controlled by the clock generator 113 and the number of program repetitions is measured by counter 114.

The basic elements of the sender circuit include a modulator 115 responsive to binary conditions at the output of shift register 109 to deliver corresponding mark or space signals on a frequency shift basis through filter 116 and power amplifier 117 over control conductors 118 to a corresponding receiver for remote unit 0 at the control unit.

Transmission from the control unit to the remote unit 0 takes place over control conductors 119, transformer 120 and filter 121 where the signal is delivered to a signal present detector 122. The latter meters the time during which a signal pulse is applied to verify that the transmission is a valid signal and that it exceeds a predetermined length and is not a "hit" or transient, spurious signal. If the signal is valid the control circuit 112 as well as the clock generator 113 are activated and specific signals are delivered from filter 121 through limiter 155 to the discriminator 123 which identifies the signals as mark or space and delivers corresponding binary indicia to the shift register 109 which at this time is advanced under control of the clock generator 113.

The equipment in the control unit includes (FIG. 1C) a hold magnet control and select magnet control 124 and 125 which perform functions analogous to controls 15 and 16 of the remote unit. The line lockout circuit 126 acts in response to sleeve relays in the line circuit 153 in a manner analogous to the response of line lockout circuit 19 to the line relays of line circuit 10. The information translated in line lockout circuit 126 is delivered to register and check circuit 127. The timing circuit 128, release control circuit 129 and signal control circuit 130 perform functions similar to their counterparts at the remote unit. The preference control circuit 133 is effective to determine the trunk which is preselected for the next service request or terminating call. The trunk thus selected is stored in the preselected trunk register 134. The trunk busy control 135 ascertains the number of trunks which are in the busy condition.

The electronic logic circuitry of FIG. 1D is similar to the equipment in the remote unit with the exception that separate sender and receivers are utilized for remote unit 0 and remote unti 1 although the shift register 136 and the related control equipment is common to both remote units.

(2) GENERAL DESCRIPTION OF OPERATION

(2.1) *Service request call*

It will be assumed for purposes of illustration that a subscriber at substation 107 is initiating a service request call. When substation 107 goes off hook, a line relay (not shown—but shown in detail in FIG. 2) unique to the calling subscriber's line in line circuit 10 is operated. The line lockout circuit 19 is energized to operate a particular tens relay and units relay identifying the calling line. Thereafter the information is transferred to the line register circuit 100 and checked in the checking circuit 103.

Under the control of circuit 106 the information stored in the line register is delivered through buffer circuitry 18 to the shift register 109. The signal control circuit 106 delivers a start signal to the electronic control circuit 112 which initiates the operation of the clock generator 113 to activate the shift register 109 and the counter 114 for the purpose of delivering the line identification to the control unit.

The information from the shift register 109 is delivered through modulator 115 which converts the binary conditions in the shift register to corresponding mark and space signals and thereafter through filter 116 and power stage 117 over control conductors 118 to the receiver circuit for remote unit 0 at the central office.

When the signal present detector 114 recognizes a legitimate signal (as distinguished from a "hit" or transient), it enables the control circuit 139 which in turn energizes clock circuit 137 to govern the storage of the line identity in the shift register 136. In the interim, the control signal pair 149 extending to the remote unit 1 is disabled to prevent the transmission of a service request by that unit, and in consequence, the remote unit 1 disables the signal pair to the control unit.

When it is determined that the complete line identity has been received in shift register 136, the line information thus stored is transferred on a parallel basis through signal input buffer circuitry 131 to the line register and check circuit 127. When the line information is registered and checked in the circuitry of FIG. 1C, the hold magnet control circuit 124 is energized to operate the hold magnet unique to the line requesting service, the select magnet having been previously operated. At the remote unit, in the interim, the select magnet corresponding to the preselected trunk was operated followed by the operation of the hold magnet unique to the service requesting line.

The trunk identity of the trunk at the control unit utilized on the call is delivered to signal output circuit 132 and subsequently transferred to the shift register 136 in parallel. The information thus transferred represents the identity of the actual trunk utilized in completing the call.

At this time, a procedure is initiated for transmitting to the remote unit the identity of the trunk stored in the shift register. It should be noted that the remote unit is already aware of the identity of the preselected trunk and, in fact, has presumably connected the service requesting line to the preselected trunk by the operation of the select and hold magnets as described above. However, to verify that the trunk actually utilized in completing the connection at the remote unit is the same as the trunk actually utilized in completing the connection at the control unit, the shift register 136 is activated under control of clock circuit 137 to transmit the actual trunk identity to the remote unit through modulator 146, filter 147, amplifier 148 and conductors 119 to the receiver circuit at the remote unit. This information is stored in the shift register 109 in the manner described above and when the transmission of trunk information is completed, the electronic logic circuitry including control circuit 112 delivers a read-out signal to signal control circuit 106 which in turn effects the storage of the trunk information in signal input buffer circuit 17 in parallel. The trunk number is thereafter delivered to the trunk register circuit 101 where it is compared with the trunk number actually used in completing the connection at the remote unit.

Subsequent to the transmission of trunk information by the control unit, the signal pair to the remote unit 0 is disabled (opened). In response thereto, remote unit 0 releases trunk register 101 and in turn causes the signal pair 118 to the control unit to be opened to prepare the control unit for release.

The control unit thereafter enables or closes the signal pair 119 to the remote unit effecting the release of the solid state logic circuitry and the control relays at the remote unit. When the release is checked by release circuit 154, the signal pair 118 to the control unit is again closed causing the release of the equipment in the control circuit as governed by release control 129.

At this time all of the electronic logic circuitry is quiescent except for the continuous transmission of the spacing signal by the sender circuits. Since the hold magnets of the crossbar switches 11 and 150 are magnetically latched, a path may be traced from substation 107 and data unit 108 through line circuit 10 (from which all bridging impedances have been removed), crossbar switch 11, preselected trunk 12, crossbar switch 150 to the unique termination in the central office line circuits 151 to which substation 107 and data unit 108 would have been connected if directly connected to the office. Since the central office is unaware that the central office line circuit unique to the concentrator line is, in fact, not directly terminated at the central office, it proceeds to service the call in a conventional manner by the return of dial tone, etc.

When the digits of the called substation have been dialed and the central office extends the connection, conversation and/or data transmission takes place in the conventional manner. However, when the conversation or data transmission is completed and the substation 107 is returned to the on-hook condition, the train through the central office is released but the vertical magnets in the crossbar switches 11 and 150 unique to the calling subscriber's line remain held operated or magnetically latched. Thus, although the subscriber at substation 107 has returned to the on-hook condition, a direct connection extends through the concentrator switching network to the central office line termination unique to the substation line. Moreover, all but one of the illustrative sixteen trunks are maintained in this "cut-through" condition and, in consequence, 15 of the approximately 80 substations are always directly connected to the office. The advantages of such an arrangement include the possibility of continuing service to those substations despite a complete failure in operation of the concentrator and, moreover, the "recall" time, i.e., the time required to make a second call after the substation returns to the on-hook condition, is correspondingly diminished since the operating time of the concentrator is no longer effective.

(2.2) *Terminating call*

A terminating call is initiated in the central office line circuits 151 when the office grounds the line sleeve lead (not shown but see FIGS. 17 and 22) in the conventional manner. The line is identified in consequence of the operation of a relay in the line circuit 153 and corresponding identifying relays in the line lockout circuit 126. The information representing the line identification of the called line is stored in register 127 and the select magnets associated with the preselected trunks are operated by select magnet control 125. During the registration of the line identification, the signal pair 149 to remote unit 1 is disabled (assuming the called line is in remote unit 0). In consequence, the remote unit 1 disables the signal pair to the control unit. The receiving circuit in the control unit detects that the signal pair from the remote unit has been disabled.

After registration is completed and checked, the line identification is transferred to the shift register 136 through signal output circuit 132. At this time the electronic logic circuitry energizes the shift register 136 to transmit the line identification to the remote unit in a manner analogous to that described above for transmission of line information during a service request call.

At this time the hold magnet control circuit 124 operates and checks the hold magnet in the crossbar switch 150 unique to the line being called.

At the remote unit the information transmitted is stored in the shift register 109. The select magnets associated with the preseleced trunk arre operated by select magnet control 16. Upon completion of transmission, the line information is delivered in parallel from the shift register through the signal input circuit 17 to the line register circuit 100. Upon registration of the line information, the hold magnet control 15 energizes the appropriate hold magnet.

When the hold magnet is operated, the number of the trunk used on the call is delivered through the signal output 18 to the shift register 109 and is thereupon transmitted to the control circuit. The signaling circuitry in the control unit receives the information and thereupon opens the signal pair 118 to the remote circuit. Upon completion of transmission of the trunk identity, the remote unit opens the signal pair to the control unit.

Again, the control unit detects the opening of the signal pair from the remote unit and delivers the trunk identity to register 127 where it is stored. The trunk number thus received is compared with the trunk number used for the actual connection at the control unit and if these numbers agree, the electromechanical equipment in the control unit is partially released and the signal pair to the remote unit is again closed. The closure of the signal pair 119 is detected in the remote unit and results in the release of the equipment thereat. When appropriate release is verified, the signal pair 118 to the control circuit is closed, in turn causing the release of the equipment at the control circuit.

(2.3) *Disconnect call*

A disconnect call is initiated following each service request or terminating call. The trunk selected for disconnection is ascertained in a manner explained hereinafter in detail and the line coupled to the selected trunk is identified. The sequence of operations for a disconnect call is similar to that described above for a terminating call except that no select magnet will be operated and instead the hold magnets will be released. Moreover, the number of the trunk to be disconnected is sent to the remote unit instead of the line number.

(2.4) *Service denial call*

A service denial call is utilized, in part, for preventing trouble conditions on a substation line from holding a trunk out of service. In effect, the service denial call prevents origination or termination of calls to the service denied line.

The sequence of operations for a service denial call is similar to that described above for a terminating call but the select magnets are not operated. Thus, when the hold magnets are operated alone, no crosspoint contacts are closed and the line is cut off. The denial condition remains in effect until a release service denial call is made which too is similar in operation to a terminating call with the exception that the select magnets are not operated and the hold magnets are released.

(3) DETAILED DESCRIPTION OF MAJOR COMPONENTS

(3.1) *Line and trunk switching*

(3.11) REMOTE UNIT

Referring to FIGS. 2 and 3 at the remote unit and corresponding FIGS. 17 and 18 at the control unit, crosspoint networks of the magnetic latching type described in an article entitled "Magnetic Latching Crossbar Switches" in the Bell System Technical Journal, September 1960, at page 1351, are utilized. The magnetic latching facilities include hold magnets (vertical magnets) which remain operated until deliberately released. No additional power drain ensues once the vertical magnets have been operated. Since the delayed disconnect arrangement described generally above, wherein 15 of the 16 trunks normally will be connected to lines at all times, will be utilized, the power savings are apparent.

As shown in FIG. 2, the lines to be concentrated are coupled to the verticals of the crossbar switch whereas the trunks are connected to the switch horizontals. Thus, for switch A of FIG. 2, 20 lines, 0–19, are coupled to the verticals and 16 trunks including conductors T00 and R00 through T15 and R15 are coupled to the horizontals. Switch levels L8 and L9 are used for selecting one of the two trunks coupled to each horizontal level L0–L7 (of which only L0 and L7 are shown). In this manner, substation 0 may be connected to either trunk T00 and R00 or T01 and R01 depending on which steering level switch, L8 or L9, is closed.

(3.12) CONTROL UNIT

A substantially similar analysis may be made with respect to the switches shown in FIGS. 17 and 18. Here again, 20 lines are coupled to the verticals of four switches, A–D (of which only A and D are shown in detail). Two lines are reserved for testing purposes and are not associated with subscribers. A trunk incoming to switch A of group 0 may be connected to the appropriate line by closing the crosspoint contacts on one switching level, L0–L7, and one steering level, L8 or L9. The switches at the control unit depart from those at the remote unit in that a full complement must be provided for the lines of remote unit 1 as well as remote unit 0. Thus, the switches for remote unit 0 are shown in detail on FIGS. 17 and 18 and the switches for remote unit 1 indicated in the drawing as group 1 are shown in outline form in FIG. 24 and are duplicates of the switches shown in FIGS. 17 and 18. The vertical magnets of the crossbar switches in the control unit are also magnetically latching and may be of the type disclosed in the above-referred-to publication.

(3.2) *Signaling*

The signaling circuits at the remote and control units are equipped to complement each other and since the sending and receiving circuits for both units are similar, only one need be described. The sending and receiving circuits for the remote unit and control unit are shown in outline form in FIGS. 15 and 20 and in further detail in FIGS. 50–58. The sending circuit includes a modulator shown in FIG. 53, a send filter shown in FIG. 55, and a power amplifier shown in FIG. 54.

The receiving circuit includes a limiter shown in FIG. 56, a receiver filter of FIG. 57, a signal present detector of FIG. 52, and a guard interval timer of FIG. 51.

(3.21) SEND CIRCUIT, MODULATOR

Referring first to the send circuit, the frequency of the modulator of FIG. 53 is controlled by a transistor switch Q1 which has a potential approaching ground applied to the base thereof or an off-normal potential of approximately +6 volts. The tank circuit including inductors T1 and T2 and capacitor C1 is arranged in order that the application of a ground potential to the base of the switch will produce an oscillation frequency of substantially 2025 c.p.s. representing the spacing frequency at the control unit (F2S).

When the input to the base conductor A is changed to +6 volts, the frequency of oscillation is modified to 2225 c.p.s. representing the mark frequency at the control unit (F2M).

The output of the modulator is delivered through a normal contact of relay 380L0 in the case of the send circuit 0, in parallel with a combination of make contacts of relays 41SR0, 28TER0 and 41ATCO1 to the send filter of FIG. 55.

(3.22) SEND CIRCUIT, FILTER AND POWER AMPLIFIER

The latter filter is a bandpass filter substantially in the range of 2025 c.p.s.–2225 c.p.s. and prevents undesired signals from reaching the power amplifier stage. As seen in FIGS. 54 and 55, the output of the send filter is delivered to transistor Q3 of the power amplifier over capacitor C5. The output of the power amplifier is delivered over transformer T3 to the control pair extending to the appropriate remote unit.

The purpose of providing the contacts of relays 380L0, 41ATCO1, 28TER0 and 41SR0 intermediate the modulator and the send filter is to control the path at the output of the modulator. By interrupting this path all signal frequencies emanating from the sender may be interrupted, thereby opening the control pair to the remote unit. As indicated above and also herein in detail, this condition represents a signal to the distant unit to initiate appropriate circuit operations.

(3.23) RECEIVE CIRCUIT, FILTER AND LIMITER

The receive circuit shown in FIG. 20 is adapted to receive signals from the control pair which are delivered through the input transformer to the receive filter of FIG. 57. The latter delivers the signals to the limiter of FIG. 56. The input to the limiter circuit is at terminal A of FIG. 56. The output from the limiter is derived at terminals D, E and F. There are five transistor amplifier stages and two limiter stages.

Transistor Q1 and its associated biasing resistors R5, R7, R8 and R9 comprise the first stage of amplification along with potentiometer R10 and capacitor C3. Capacitor C3 is an alternating-current bypass path and is used with potentiometer R10 to control the gain of transistor Q1. Transistor Q2 with biasing resistors R11, R12, R13 and R14 comprise the second stage of amplification. Capacitor C6 and varistor RV1 are the first stage of limiting. The third stage of amplification consists of biasing resistors R15, R16, R17 and R18 with transistor Q3. Capacitor C7 and varistor RV2 provide the second and final stage of limiting.

Transistor Q4, biasing resistors R19, R20 and R23 and the alternating-current bypass network C9 and R21 make up the fourth stage of amplification. The collector load of transistor Q4 is a tuned circuit combination provided in the discriminator circuits of FIG. 50. The fifth transistor stage (Q5) with biasing resistors R4 and R24 and potentiometer R2 is an emitter follower stage which feeds the signal present detector of FIG. 52.

Capacitors C1, C4, C5, C8, C10 and C11 are used to couple the outputs and inputs of the amplifier stages. Resistor R6 and capacitor C2 provide an alternating-current bypass path for the positive power supply; and resistor R22 and capacitor C12 provide an alternating-current by-pass path for the negative power supply.

(3.24) RECEIVE CIRCUIT, DISCRIMINATOR (FIG. 50)

The discriminator of FIG. 50 includes two tuned tank circuits comprising capacitor C1 and transformer T1 for the 1020 c.p.s. frequency, and capacitor C2 and transformer T2 for the 1270 c.p.s. frequency. The two tank circuits in series represent the load for transistor Q4 of the limiter described in Section 3.23.

A diode bridge is across the output side of each transformer. Diodes CR1, CR2, CR3 and CR4 form a negatively polarized bridge for the tuned circuit T1 and C1. This tuned circuit recognizes the 1070 c.p.s. frequency and when it is present develops a negative potential across the load resistor R1.

Diodes CR5, CR6, CR7 and CR8 form a positively polarized bridge for the tuned circuit T2 and C2. This tuned circuit recognizes the 1270 c.p.s. frequency and develops a positive potential across the load resistor R2 when it is present. In each case the discriminating network is tuned such that the frequencies are sufficiently far apart to produce resonance for only one tuned circuit per frequency.

Capacitors C3 and C4 are smoothing capacitors to filter out the alternating-current ripple after detection. The signals obtained at terminal 1 of inductor L1 are fed through the low pass filter consisting of inductor L1 and capacitor C5 to the base of transistor Q1. Provision is made to center the position of the discriminator S-shaped curve by means of potentiometer R3.

Normally, with 1070 c.p.s. (space frequency) present, the base of transistor Q1 is negative thus holding it in the nonconducting or "off" state. This puts +12 volts through resistors R6 and R7 to the base of transistor Q2 to hold it in the conducting or "on" state. With transistor Q2 "on," the output is "near-ground" potential at the collector of transistor Q2. The input terminal to the base of transistor Q2 and resistor R11 are used to make transistor Q2 an "Or-Not gate." This lead is under control of the signal present detector (Section 3.25 infra) and will have a "near-ground" potential present when the signal present detector is activated.

When the mark frequency is detected by the discriminator, a positive potential on the base of transistor Q1 turns it "on." Ground through transistor Q1, with "near-ground" potential from the signal present detector to terminal 1, will now turn transistor Q2 "off." This places +12 volts at the collector of transistor Q2. Thus, a mark input provides an "off-ground" potential output at terminal 1, while a space input provides a "near-ground" potential output.

The purpose of resistor R10 and capacitor C6 is to provide positive feedback to transistor Q1 to give sharp transitions at the collector of transistor Q2 as transistor Q2 switches on and off.

(3.25) SIGNAL PRESENT DETECTOR

The signal present detector is responsive to the space frequency to present a "zero" condition to gate 20STOG and inverter 20STAOI. The latter operates relay 20ITA0 as an indication that the presence of a signal was detected.

The input to the signal present detector comes from the fifth stage of the limiter (FIG. 56). The potentiometer associated with this fifth stage on the limiter controls the input level. This input is coupled through transformer T1 and rectified by the diode bridge CR1, CR2, CR3 and CR4. Resistor R23 provides the load for the bridge and capacitor C4 provides a smoothing effect. The rectified signal is fed through resistor R24 to the base of transistor Q7.

With no input signal, transistor Q7 is in the "off" state. This presents +12 volts through resistors R25 and R26 to the base of transistor Q8. This "off-ground" potential will turn transistor Q8 "on." The collector load of transistor Q8 normally consists of a reed relay (e.g. relay 20ITA0) to +12 volts connected at the collector terminal. If the rectified signal at the base of transistor Q7 is sufficiently positive, transistor Q7 will turn "on." This presents "near-ground" potential to the base of transistor Q8 to turn it "off." This will remove the "near-ground" potential from the collector to release the relay. Thus, when a valid signal is present, relay 20ITA0 is released, whereas relay 20ITA0 operates when the input to the detector is removed. Resistor R27 provides positive feedback to transistor Q7 to give sharp transistors at the collectors of transistors Q7 and Q8.

(3.26) GUARD INTERVAL TIMER

The guard interval timer 20GIT0 is triggered by the change from a "zero" condition to a "one" condition, as shown in FIG. 51, and the output thereof changes from a "zero" condition to a "one" condition.

Transistors Q1 and Q2 comprises a monopulser type circuit with a timing interval of 4.06 milliseconds. There is no positive feedback from transistor Q2 to transistor Q1 thus requiring that the input pulse at the base terminal of transistor Q1 be equal to or greater than the timing interval of the monopulser. In this manner, the monopulser guards against a false trigger. Thus, a legitimate signal must be present to activate the output of the guard interval timer.

In the normal condition "near-ground" potential is present at terminal A holding transistors Q1 and Q3 in the "off" state. With transistor Q1 "off," +12 volts through resistors R4 and R5 to the base of transistor Q2, hold transistor Q2 in the conducting or ON condition. This presents "near-ground" potential through resistors R7 and R10 to the base of transistor Q4. However, with transistor Q3 in the "off" state, +12 volts through resistors R12, R13 and R16 is also presented at the base of transistor Q4. Transistor Q4 is an Or-Not gate and will be turned "on" if presented with an "off-ground" potential from either transistor Q2 or transistor Q3. Therefore, in the normal state, transistor Q4 is "on" and supplies "near-ground" potential to the base of transistor Q5 to hold transistor Q5 in the "off" state.

Transistors Q5 and Q6 comprise a monopulser type circuit with a timing interval of 20 microseconds. With transistor Q5 turned "off," +12 volts through resistor R20 holds transistor Q6 in the "on" state. This presents "near-ground" potential at the output terminal.

In the normal state, capacitor C1 holds a charge with +12 volts on one side and approximately +0.8 volt on the other side at the base of transistor Q2. If a legitimate signal of "off-ground" potential is now applied at terminal A, transistors Q1 and Q3 both change to the "on" state. When transistor Q1 starts conducting, the voltage on each side of capacitor C1 suddenly drops by approximately 12 volts. Thus, diode CR5 is back biased and removes the base current to transistor Q2 to turn transistor Q2 "off." When transistor Q2 is turned "off," +12 volts through resistors R6 and R10 is present at the base of transistor Q4, and with transistor Q3 now in the "on" state, "near-ground" potential through resistors R13 and R16 is also presented to the base of transistor Q4. At this point, to prevent false circuit operation, transistor Q4 should not change its state. This requires that the "off-ground" potential from transistor Q2 turning "off" must be present before the "off-ground" potential from transistor Q3 turning "on" is removed. To insure that this requirement is met, the delay network of capacitor C2 and resistors R14 and R15 is used to maintain an "off-ground" potential at the base of transistor Q4 until the "off-ground" potential from transistor Q2 is present. In this manner, transistor Q4 remains in the "on" state.

The potential on diode CR5 rises as capacitor C1 charges from +12 volts through resistors R4, R5, and transistor Q1 to ground. After a time interval of 4.06 milliseconds, the potential at diode CR5 is sufficiently positive to forward bias the diode and to turn transistor Q2 back to the "on" state. This replaces the "off-ground" potential provided to the base of transistor Q4 with a "near-ground" potential. The Or-Not condition of transistor Q4 is now satisfied with "near-ground" potential supplied from both transistors Q2 and Q3, and transistor Q4 now turns "off." This presents a high potential to the base of transistors Q5 to turn transistor Q5 "on." In the normal state, capacitor C6 was charged from approximately +0.8 volt at the base of transistor Q6 to +6.4 volts at the collector of transistor Q5. The 6.4 volts is determined by the voltage divider resistors R19 and R21. When transistor Q5 turns "on," its collector drops to a "near-ground" potential. Capacitor C6 couples this drop in voltage to the base of transistor Q6 to turn transistor Q6 "off." Capacitor C6 now charges from +12 volts through resistor R20, capacitor C6 and transmitter Q5 to ground causing the base voltage of transistor Q6 to rise until it is sufficiently positive to turn transistor Q6 back "on." The time interval to return transistor Q6 to the "on" state is nominally 20 microseconds. Thus, a legitimate input signal at terminal A results in a 20-microsecond positive output pulse which is delayed by 4.06 milliseconds.

To prevent the possibility of giving an indication when a false "off-ground" potential is removed from terminal A, the delay network of capacitor C3, resistors R8 and R9 is provided. As the false "off-ground" potential is replaced by "near-ground" potential at terminal A, transistors Q1 and Q3 turn "off." When transistor Q1 turns "off," transistor Q2 will turn "on" (since 4.06 milliseconds have not yet elapsed and transistor Q2 was "off"). To prevent transistor Q4 from turning "off," the "off-ground" potential supplied from transistor stage Q3 must be applied to the base of transistor Q4 before the "off-ground" potential from transistor stage Q3 is removed.

A delay circuit in the guard interval timer including capacitor C3 and resistors R8 and R9 insures that the gate 20GITOI presents a "zero" condition to gate 20MTOG prior to the time that the guard interval timer delivers a "one" condition to the same gate. At the conclusion of the predetermined interval (4.06 milliseconds), the guard interval timer converts back to a "zero" condition since transistor Q2 is again energized over resistors R4 and R5. At this time, gate 20MTOG has a "zero" condition applied to both input leads and therefore delivers a "one" condition to monopulser 20MT0. The latter in turn is arranged to provide a 20 microsecond pulse over conductor 20MTOC to the electronic logic circuitry. As explained above in general terms and hereinafter in detail, this pulse enables the remote unit to be synchronized with the control unit.

(3.3) *Synchronization*

In order to synchronize the remote unit and control unit, a multivibrator is provided at each of the units and is shown in outline form for the control unit at FIG. 21 as oscillator 21K and for the remote unit as oscillator 16K. The multivibrator is shown in detail at FIG. 48.

Referring to the operation of the equipment at the control unit, the oscillator 21K delivers pulses at a 3200 p.p.s. rate to the binary cells 21P1BC, 21P2BC, 21P4BC and 21P8BC. The latter divides the 3200 p.p.s. rate by 16 to give the desired 200 p.p.s. rate with a pulse period of 5 milliseconds. The binary cells permit the selection of up to 16 pulses during each pulse period. In the present arrangement, of the 16 pulse positions available, only three are utilized.

(3.31) SHIFT PULSE

When the oscillator 21K is energized to deliver its 3200 p.p.s. output to the binary counter cells, the four-stage counter acts as a frequency divider to provide a 200 p.p.s. output. In consequence, every 5 milliseconds a pulse sequence is produced from gates 21PG1G, 21PG2G and 21PG3G. A shifter pulse is provided whenever gate 21PG1G is energized. As seen from FIG. 21, this condition obtains when binary cell 21P1BC is in the "one" condition, binary cell 21P2BC is in the "zero" condition, binary cell 21P4BC is in the "one" condition and binary cell 21P8BC is in the "zero" condition. At this time, gate 21PG1G will be energized and deliver a pulse over conductor 21SPC, monopulser 27T5MP, gate 27RSG, inverter 27INV5I, and conductor 27RC to the reset inputs of the shift register to advance the information stored in the register.

(3.32) "WRITE" PULSE

Gate 21PG2G may similarly be shown to be energized when the binary cells 21P1BC–21P8BC are respectively in the condition 0110. When gate 21PG2G is enabled, a pulse is delivered over inverter 21INV8I, conductor 21KC, gate 27WGG, monopulser 27T3MP, conductor 27T3C to the input of the first shift register stage 31SA7FF to write a "one" in the first shift register stage.

(3.33) CALL PROGRESS PULSE

Similarly, whenever gate 21PG3G is enabled by virtue of the binary number 1110 in the cells 21P1BC–21P8BC, respectively, a pulse is delivered over conductor 21CAC. This signal extends to monopulser 27T4MP and in turn to the input to the call progress counter 32CTR1BC–32CTR16BC of FIG. 32.

Thus, every 5 milliseconds a pulse sequence is produced from the gates 21PG1G–21PG3G as long as oscillator 21K is operated.

The operation of the corresponding gates 16PG1G–16PG3G in response to the remote unit oscillator 16K is similar to that described above for the control unit. In order to synchronize the distant units with each other, the guard interval timer 20GIT0 (see section 3.26 supra) is arranged to establish a predetermined state in the binary cells equivalent to the state which would have been achieved after 4.06 milliseconds. Thus, if the remote unit initiates transmission to the control unit, the guard interval timer at the control unit will respond to the start pulse and generate a 4.06 millisecond interval. During this interval, oscillator 21K is not yet energized but oscillator 16K is already operating and triggering the gates 16PG1G–16PG3G in the appropriate sequence. After the predetermined interval of 4.06 milliseconds, the guard interval timer 20GIT0 delivers an output through monopulser 20MTOMP and conductor 20MTOC to set cells 21P1BC–21P8BC in accordance with the digits 1011, respectively. During this interval, the corresponding binary counter 16P1BC–16P8BC has been set to the same condition by its local oscillator 16K. At this time, oscillator 21K is energized, as explained herein, and begins to cycle the counter at the prescribed rate. Since the binary cells 16P1BC–16P8BC at the remote unit and 21P1BC–21P8BC at the control unit are in the same condition when oscillator 21K is first energized, synchronism is established between the remote unit and the control unit.

(3.4) *Trunk selection*

As explained above in general outline, 15 trunks remain connected through to the office when the concentrator control equipment is idle. As a result, after each service request call or terminating call, all (16) trunks will be connected through and it is essential to disconnect one of the trunks in order to process the next call.

The logic circuitry has been arranged to store the identification of a trunk which is disconnected on a disconnect call for use as the preselected trunk on the next service request or terminating call, thereby enabling the appropriate hold magnets to be operated when the line information is provided.

There are two types of trunk selection functions. The first applies to a situation in which 15 trunks are connected to the office and a service request call or terminating call has been made, thereby necessitating a disconnect call since all of the trunks are now connected through. This is referred to herein as a "normal disconnect" call.

Special provisions have been made to cover the situation where, for some reason, less than 15 trunks are connected to the office. Under these conditions, preference will be accorded to those trunks which are not connected through to the office and the procedure is termed a "special disconnect" call.

(3.41) TRUNK PREFERENCE AND SELECTION ON NORMAL DISCONNECT CALL

The trunk preferred for disconnection is determined by a combination of relays 34TPR01–34TPR05 and relays 34Z0 and 34W0. After a trunk has been selected, one or more of these relays is actuated to change the preference of the trunk selected for the next call. In this manner a particular trunk is preferred once during sixteen successive calls.

The trunk preference circuit is arranged to operate relay 34TPR01 when battery is supplied to the circuit.

Thus, a path may be traced from negative battery, resistance 341, winding of relay 34W0, contacts of relay 34W0, contacts of relays 34TPR05 and 34TPR01 to ground. Relay 34Z0 does not operate at this time in view of the ground condition at both sides of the relay winding.

Operation of relay 34W0 closes an operating path for relay 34TPR01 over the normally closed contacts of relay 34Z0. This path may be traced from negative battery, contacts of relay 34TPR05, winding of relay 34TPR01, contacts of relays 34TPR01, 34TPR05, 34Z0, 34W0, 34TPR05 and 34TPR01 to ground.

Operation of relay 34TPR01 completes a locking path for that relay over its own contacts and removes the shunt path from the winding of relay 34Z0. The latter relay now operates over a path from negative battery, resistance 340, winding of relay 34Z0, contacts of relay 34W0 to ground.

Operation of relay 28DISO2, as described hereinafter in consequence of a disconnect call, will cause the preferred trunk relay 29TK– to operate provided that the associated trunk busy relay 18TB– is normal and, moreover, that the trunk busy jack is normal. If either is operated, relay 29TK– representing the first idle trunk will be operated. Thus, assuming that relay 29TK15 is the preselected trunk, a path may be traced for the operation of that relay from negative battery, resistance 290, winding of relay 29TK15, contacts of relay 29TK15, contacts of relays 18TB15, jack TB15–J, contacts of relays 40CT15, 40CHM0, 28DISO2, 290T0, 29ET0 and 29TRK to ground.

The operation of relay 29TK15 will complete a path to the shift register which may be traced in FIG. 35 from ground, contacts of relays 36TIS, 28DISO2, 29TK15, 41G1, 36TISR, conductor CI7 to the corresponding shift register stage 31SC7FF. A similar path may be traced over the contacts of relay 29TK15 and conductor CI0. In addition, a circuit is completed for the operation of relay 290T0 over an obvious path.

The operation of relay 29TK15 interrupts the operating path for that relay and provides a holding path over transfer contacts of relay 29TK15 and the contacts of all lower numbered relays, contacts of relays 41SR0, 28TER0 to ground.

Operation of relay 290T0 completes a path extending to the shift register over conductors BI0 and BI1 and removes ground from the operating path of relay 29TK15. Relay 29TRK operates at this time over a path including ground, contacts of relays 290T0, 28DISO2, 29TK00, 29TK01–29TK14, 29TK15, winding of relay 29TRK to negative battery.

Operation of the latter relay completes a path to the solid state logic circuitry to initiate transmission of the trunk information as explained herein in detail. In addition, a ground condition is applied to relay 34TPRO5 over a path from ground, contacts of relays 39RL1, 29TRK, 38TUK, 28DISO2, 34TPRO4, 34TPRO5 (assuming relay 34TPRO4 is operated), winding of relay 34TPRO5, contacts of relay 34TPRO4, resistance 346 to negative battery. Relay 18TBA15 is operated at this time over a path from negative battery, winding of relay 18TBA15, resistance 1815, diode 18TB15D, contacts of relay 29TK15, conductor 18TK1C, contacts of relays 28DISO1, 41TCA1, 29TRK, 38TUK to ground.

The following chart shows sixteen successive calls:

| Call | 34TPR-Relays Operated From Previous Call | Preferred Trunk | After Trunk Selection The Following Relays— | | Condition of 34Z0/1 Relay |
|---|---|---|---|---|---|
| | | | Operate | Release | |
| | | GRP0/1 | | | |
| 1 | ---------- | 00 | 02/12 | ---------- | Released. |
| 2 | 01/11, 02/12 | 02 | 03/13 | ---------- | Do. |
| 3 | 01/11, 02/12, 03/13 | 04 | 04/14 | ---------- | Do. |
| 4 | 01/11, 02/12, 03/13, 04/14 | 06 | 05/15 | 01/11 | Do. |
| 5 | 02/12, 03/13, 04/14, 05/15 | 08 | ---------- | 02/12 | Do. |
| 6 | 03/13, 04/14, 05/15 | 10 | ---------- | 03/13 | Do. |
| 7 | 04/14, 05/15 | 12 | ---------- | 04/14 | Do. |
| 8 | 05/15 | 14 | 01/55 | 05/15 | Do. |
| 9 | 01/11 | 01 | 02/12 | ---------- | Operated. |
| 10 | 01/11, 02/12 | 03 | 03/13 | ---------- | Do. |
| 11 | 01/11, 02/12, 03/13 | 05 | 04/14 | ---------- | Do. |
| 12 | 01/11, 02/12, 03/13, 04/14 | 07 | 05/15 | 01/11 | Do. |
| 13 | 02/12, 03/13, 04/14, 05/15 | 09 | ---------- | 02/12 | Do. |
| 14 | 03/13, 04/14, 05/15 | 11 | ---------- | 03/13 | Do. |
| 15 | 04/14, 05/15 | 13 | ---------- | 04/14 | Do. |
| 16 | 05/15 | 15 | 01/11 | 05/15 | Do. |

(3.42) TRUNK PREFERENCE AND SELECTION ON SPECIAL DISCONNECT CALL

A special disconnect call is initiated when it is found that more than one trunk in a group has a released relay 40CT– associated therewith which has resulted in the operation of relay 40CHM0. As seen in FIG. 40, the latter relay is operated when the contacts of more than one relay 40CT– are opened. Relay 40CHM0 is biased over its lower winding and the contacts of relay 25Z00. Assuming that one relay 40CT– is released, the current in the upper winding and lower winding is approximately equal and the relay is in the released condition. When two or more relays 40CT– are released (indicating the disconnection of the corresponding trunks) the current in the upper winding of the relay predominates and causes operation of relay 40CHM0. The latter relay will remain operated until all but one of the relays 40CT– are operated.

It will be noted that when the current is equal in both windings, relay 40CHM0 remains in the existing condition. Therefore, when one trunk is released, relay 40CHM0 remains released. Once operated however, relay 40CHM0 remains operated until all trunks are released and the current in the lower winding predominates.

Operation of relay 40CHM0 extends a path (in FIG. 29) from ground, contacts of relays 29TRK, 29ET0, 290T0, 28DISO2, 40CHM0 and over the contacts of relays 40CT– having corresponding trunks in the disconnect condition.

Thus, a path is completed for the operation of the lowest numbered relay 29TK– having a relay 40CT– in the released condition. Assuming that relay 29TK00 is available, a path may be traced from negative battery, resistance 290, winding of relay 29TK00, contacts of relays 18TB00 (jack TB00–J), contacts of relays 40CT00, 40CHM0, 28DISO2, 29OT0, 29ET0, 29TRK to ground. As in the case of the normal disconnect call adverted to in Section 3.41 supra, a path will be extended over selected leads to the shift register. Moreover, the operation of relay 29ET0 will close an operating path for the trunk check relay 29TRK. Also, as indicated above, the latter relay will complete a path to initiate the transmission of trunk information and operate relay 18TBA00.

(3.5) *Line identification*

The line identification at the remote unit is determined by the line relay individual to the line at the remote unit, relay 2L– in the case of remote unit 0, whereas the identification at the control unit is determined by the sleeve relay thereat, i.e., relay 17SL– individual to the line.

In consequence, on a call originating at the remote unit (a service request call) a line identification is obtained in response to the operation of the line relay unique to the line. For example, for relay 2L00 the lockout chains in FIG. 13 indicate the operation of a specific tens relay 13LT0 and a specific units relay 13LU0.

Thus a path may be traced for the operation of relay 13LT0 from ground, contacts of relays 14TM4, 9TK0, 14OL, 13LW, 13LT0, 2L00, additional contacts of relay 2L00, winding of relay 13LT0, contacts of relays 4IC, 12SQ2, resistance 133 to negative battery. Moreover, a path may be traced for the operation of relay 13LU0 from ground, contacts of relays 14TM4, 9TK0, 14OL, 13LW, 13LT0, 2L00, diode 13L00D, winding of relay 13LU0, contacts of relays 13LU0, 13LU9, 13LZ, 13LU8–13LU0, additional contacts of relay 13LZ, contacts of relays 13LT0, 4IC, 12SQ2, resistance 133 to negative battery. The first group of relays including relays 13LT– identifies one of eight groups of ten lines and the second group of relays designated 13LU– indicates one of ten groups of eight lines. As will be explained herein, the preference of the lockout circuits for line identification is reversed after each service request call to prevent a faulted line from denying service to the remaining lines.

A similar analysis may be made with respect to relays 25LT– and 25LU– at the control unit.

The line identification in each instance is transferred to the shift register over the conductors AI0–AI7 and BI0–BI7 of FIGS. 30 and 35 for the control unit identification equipment and over similarly designated conductors in FIGS. 4, 5 and 10 for the identification equipment at the remote unit.

(3.6) *Call preference*

When a call is initiated, the call preference circuit shown in FIG. 28 prevents other types of calls or a call in the other group from starting. Here again, two lockout chains are provided which reverse preference between the groups after each call.

As will be seen herein, the call preference circuit also prevents a terminating call or a disconnect call from being initiated if all the trunks are busy. Moreover, a terminating call cannot start if a trunk has not been preselected.

Assuming that remote unit 0 has initiated a call, relay 41SR0 will be operated in the manner described herein. The contacts of relay 41SRC1 are connected in the call preference circuit of FIG. 28. As shown therein, the terminating preference relay 28TER0 and disconnect preference relay 28DIS0 are arranged in order to prevent the initiation of other types of calls during the processing of a particular call. Thus, the operation of relay 28TER0 interrupts the battery supply to the service denial relays 28SDP0 and 28SDP1 as well as the release service denial relays 28RDP0 and 28RDP1. In addition, the contacts of relay 28TER0 prevent the operation of relay 28DIS00 by opening the battery supply.

Correspondingly, the initial operation of relay 28DIS00 interrupts the operating path for relay 28TER0 at the contacts of relay 28DIS00.

(3.7) *Electronic logic circuitry*

The electronic circuitry utilized in our concentrator is adapted to provide temporary storage of line and trunk information for transmission between the signaling circuit, as described herein, and the electromechanical equipment. In addition, it controls the flow of information between the remote unit and the control unit and determines when all of the information has been transmitted. The individual circuits will now be considered in detail.

(3.71) BASIC OR-NOT GATE

Referring to FIG. 42, an Or-Not gate is shown. As seen in FIG. 42, a positive "off-ground" input to the base electrode of the transistor will cause collector current to flow and will change the potential at the output conductor connected to the collector electrode from a potential approaching the positive battery connected to the collector electrode to a potential approaching ground.

Conversely, a ground potential applied to the base electrode would cause the transistor to be nonconducting.

Reference to FIGS. 43 and 44 indicates that a positive potential applied to either of the two inputs of FIG. 43 or the plural inputs of FIG. 44 will cause the respective transistor to conduct and provide a ground potential at the collector electrode thereof.

Since these gates are turned on if one or more inputs are off ground or high, and since the output potential is substantially at ground, the gate circuits perform a logical OR function and, moreover, they also invert. For this reason they have been denominated Or-Not gates.

(3.72) FLIP-FLOP

A typical flip-flop circuit is shown in FIG. 46 and includes transistors Q1 and Q2 connected in the conventional arrangement with feedback between the collector and base electrodes of the transistors. Outputs are obtained at the conductors labeled "1" and "0." It being understood that a "one" condition is represented by an "off-ground" potential and a "zero" condition by a ground or "near-ground" potential. Application of an "off-ground" potential to the terminals connected to resistor R5 or R9 applies a positive voltage to the base electrode of transistor Q1 and turns that transistor on. In this condition there is no drive to the base of transistor Q2 and it therefore is in a nonconducting state. The condition in which transistor Q2 is nonconducting and transistor Q1 is conducting, represents the set state of the flip-flop. The "0" output conductor is "near-ground" and the "1" output conductor is "off-ground." Under these conditions the removal of the input pulse will have no effect since transistor Q1 remains conducting over load resistor R4 and coupling resistor R2.

If at this time an "off-ground" potential is applied to resistor R6, R7 or R8, transistor Q2 is driven into conduction and the collector potential drops to "near-ground" thereby lowering the base potential of transistor Q1 to "near-ground" and diverting current from the base electrode of transistor Q1. In the interim, additional base drive current is supplied to the base electrode of transistor Q2 over resistances R1 and R3. This supply will maintain transistor Q1 in the conducting condition after the input pulse is removed. In consequence, transistor Q1 is in the nonconducting condition and transistor Q2 in the conducting condition representing the reset state of the flip-flop with an "off-ground" potential at the "0" output and substantially a ground potential at the "1" output.

(3.73) SHIFT REGISTER

Each stage of the shift register includes a flip-flop circuit and a monopulser which is used to transmit the information which is stored in a cell to the next succeeding cell. Information is stored in a shift register stage by providing a pulse input, for example to resistor R9 of FIG. 46, which as disclosed in Section 3.72 above sets the flip-flop to a "one" condition. As will be seen herein, the insertion of the "one" condition may be in a serial manner from the preceding stage or by a parallel insertion through a gate associated with the flip-flop.

To reset a flip-flop in the shift register, an "off-ground" potential may be applied to resistors R6–R8 as described above. For shifting information between register stages, a shift register monopulser in accordance with FIG. 49 is utilized.

It will be assumed for purposes of illustration that a "one" condition is to be transferred from a shift register stage to a succeeding stage. Assuming that the flip-flop is already in the set or "one" condition, transistor Q1 will be in the ON condition and transistor Q2 of FIG. 46 will be in the OFF condition. The input to the monopulser of FIG. 49 which is taken from transistor Q1 will be "near-ground."

When a reset pulse is applied momentarily to resistors R6–R8, the flip-flop is reset in the manner described above. The collector potential of transistor Q1 rises to an "off-ground" potential in FIG. 46 and turns on transistor Q1 of FIG. 49. This triggers the monopulser of FIG. 49 which proceeds to generate an output pulse at the collector electrode of transistor Q2. As capacitor C2 charges, current is delivered to the base electrode of transistor Q2 and when sufficient current flows, transistor Q2 turns ON. Since the output of transistor Q2 is coupled to the input of the following shift register stage, the flip-flop in the following stage is set, representing a transfer of information between the first and second stages of the shift register.

(3.74) MONOPULSER

A monopulser circuit used in the solid state logic circuitry is disclosed in detail in FIG. 47. Although monopulsers of different duration are utilized, the overall format is the same. When a ground potential or no potential is applied to all of the inputs to transistor Q11 of FIG. 47, that transistor is in the OFF or nonconducting condition. Transistor Q12 is energized from positive battery over resistor R42 and the potential at the output terminal connected to the collector electrode of transistor Q12 is substantially at ground. The potential across capacitor C6 at this time is substantially the difference in potential between the collector electrode of transistor Q11 and the base electrode of transistor Q12. Since transistor Q11 is in the OFF condition, the collector potential thereof is determined by a voltage divider action of resistors R24 and R36.

An "off-ground" or positive pulse input to any of the resistors R14–R17 causes transistor Q11 to conduct whereupon its collector potential drops substantially to ground. As a result, a negative pulse is applied at the base of transistor Q12 to drive that transistor to the OFF condition whereupon the collector potential rises above ground. A feedback is provided between the collector electrode of transistor Q12 and the base electrode of transistor Q11 over resistance R18. As a result, the input pulse may be removed without affecting the monopulser operation. The output potential at the collector of transistor Q12 remains "off-ground" until transistor Q12 is again conducting. The duration of the OFF period is determined by resistance R42 and capacitor C6. Transistor Q12 is energized when the voltage across capacitor C6 rises above the potential of the base electrode of transistor Q12. When transistor Q12 is energized, the potential at the output terminal connected to the collector electrode thereof goes toward ground. Moreover, as the collector electrode moves toward ground, the base current to transistor Q11 through resistance R18 is reduced and, as a result, transistor Q11 turns off. Thereupon, the collector potential of transistor Q11 begins to rise. However, the rise is controlled by an R-C network including resistors R24 and R36 and capacitor C6. This time duration constitutes the recycle time of the monopulser.

(3.75) OSCILLATOR

The oscillator shown in outline form in FIG. 16 (16K) and in FIG. 21 (21K) is shown in detail in FIG. 48. As indicated above, the purpose of the oscillator is to generate a frequency of 3200 p.p.s. which in conjunction with a four-stage binary counter provides a 200 p.p.s. clock rate.

Basically, the circuit includes a multivibrator which uses an amplifier and an inverter in the feedback path. Transistors Q1 and Q2 are the active elements of the multivibrator. Transistor Q4 is an output amplifier and transistor Q3 is an inverter for completing the feedback path. The input to this circuit is at resistance R5 and the output is connected to the collector of transistor Q4. A ground condition turns the circuit on and an "off-ground" condition turns the circuit off.

Assuming that, initially, resistance R5 has an "off-ground" potential applied thereto, the following conditions exist: transistor Q1 is off and transistors Q2–Q4 are on.

When a ground potential is applied to the input, transistor Q4 turns off since both inputs to transistor Q4 are "near-ground." When transistor Q4 turns off, a positive pulse at its collector electrode is delivered over resistance R3 to turn on transistor Q1. The latter experiences a negative pulse at the collector electrode which is supplied over capacitor C1 to turn off transistor Q2. Transistor Q2 remains off until capacitor C1 has discharged sufficiently to allow the voltage at the base of transistor Q2 to go positive. The discharge path for capacitor C1 is throuugh transistor Q1 and resistance R1.

Since transistor Q3 was initially in the ON condition, transistor Q2 in turning off has no effect on transistor Q3. However, the voltage at the collector of transistor Q2 does not rise immediately due to capacitor C2. The time required for the voltage to rise to the "off" state value is the recycle time.

When transistor Q2 turns on after the discharge of capacitor C1, transistor Q3 is turned off and remains off throughout the discharge period of capacitor C2. This time for discharge is determined by capacitor C2 and resistors R2 and R9. When transistor Q3 turns off, transistor Q4 is turned on and the output at the collector electrode thereof is once more "near-ground" potential. This potential is transferred over resistance R3 to turn off transistor Q1. Capacitor C1 is now prepared to time again when transistor Q1 is turned on. Transistor Q1 turns on when transistor Q3 turns on as controlled by capacitor C2. Under these conditions, a full cycle is completed and subsequent operations continue in the same manner as long as a "near-ground" condition is applied to the terminal coupled to resistor R5.

(3.76) BINARY CELL

The binary counters of FIGS. 21 and 32 at the control unit and FIGS. 6 and 16 at the remote unit include as a basic element a binary cell shown in detail in FIG. 45. The cell is equipped with an output amplifier (see FIG. 42) which is arranged to prevent undesirable "loading" of the cell in driving the succeeding stages.

The cell includes transistors Q1 and Q2. Set inputs are applied to resistors R13 and R14 and rest inputs to resistors R15–R17.

Essentially, the cell is a flip-flop circuit with the inclusion of a pulse steering network which provides a memory for steering the negative-going transient of the input pulse to the base of the "on" transistor of the flip-flop.

The steering network includes capacitors C3 and C4 and diodes CR1 and CR2. The input to the steering network is between capacitors C3 and C4.

It will be assumed that the flip-flop including transistors Q1 and Q2 is in the stable condition with transistor Q1 conducting and transistor Q2 nonconducting. The application of a pulse to conductor 19 of FIG. 45 will result in a reversal of conduction in both transistors. The positive portion of the input pulse has no effect since diodes CR1 and CR2 will both oppose positive current flow to the bases of the respective transistors. During the negative-going portion of the input pulse (when the input level drops, this voltage change is reflected as a drop below ground potential through capacitors C3 and C4. Since transistor Q2 is not conducting, the negative pulse will have no effect thereon. However, transistor Q1 in receiving a negative pulse at the base electrode thereof will experience a current diversion from the base of transistor Q1 which therefore becomes nonconductive. The collector potential of transistor Q1 rises and current is steered through resistance R3 to the base of transistor Q2. A regenerative action occurs which causes transistor Q2 to turn on and transistor Q to turn off thereby accomplishing the desired change in state of the flip-flop. Capacitors C3 and C4 are arranged with a sufficiently small capacitance to insure that the negative potential causing the state change is applied for a duration limited to that needed for switching.

In connecting these stages in cascade, the drive to a succeeding stage is taken directly from a collector of one of the transistors in the flip-flop and not from the amplifier. This output lead is shown as conductor 11 in FIG. 45 and corresponds to the "one" condition output of the binary cell. The amplifiers are utilized to supply outputs to all other circuits comprising the load on the binary cell.

(4) DETAILED DESCRIPTION OF SERVICE REQUEST CALL

(4.1) *Line relay and lockout relay operation*

It will be assumed for illustrative purposes that a call is being initiated by subscriber 0 of remote unit 0. As shown in FIG. 2, when subscriber 0 removes his receiver from the switchhook, a circuit is completed from ground, contacts of hold magnet 8HMA00, tip conductor T00, substation 0, ring conductor R00, contacts of hold magnet 8HMA00, contacts of relay 9DIS0, winding of line relay 2L00 to negative battery. The operation of the line relay unique to the customer's line results in the operation of a particular tens relay 13LT0 and a particular units relay 13LU0 which collectively uniquely identify the calling line. The over-all manner of operation is discussed in Section 3.5 supra.

Thereafter, relay 13LK operates to verify that one, and only one, tens relay and units relay were operated. This path may be traced from ground, contacts of relay 4TA, winding of relay 13LK, normally closed contacts of relays 13LU9–13LU1, contacts of relay 13LU0, normally closed contacts of relays 13LT7–13LT1 (the latter not shown), contacts of relays 13LT0, 14SO1, 12SQ2, resistance 133 to negative battery.

The operation of relay 13LK results in the establishment of a locking path for relay 13LT0 which may be traced over the contacts of relay 13LT0, diode 13LK1D, contacts of relay 13LK to ground. Moreover, a locking path may be traced for relay 13LU0 over the contacts of relay 13LU0, diode 13LK1D, diode 13LKD, contacts of relay 13LK to ground.

Relay 13LW is operated over a path from negative battery, resistance 132, winding of relay 13LW, contacts of relay 13LW, diode 13LKD, contacts of relay 13LK to ground. Moreover, the operation of relay 13LK applies a ground signal to gate 11SRG to initiate the operation of the logic circuitry.

Previously, selected relays 9TK– have been operated to designate the preselected trunk.

(4.2) *Transfer of information to shift register*

The operation of relays 13LT0 and 13LU0, as described, apply a ground potential to selected gates to the shift register. For example, the operation of relay 13LT0 results in the application of a ground potential on conductors AI4 and AI7 (FIG. 4) coupled to gates 5SA4G and 5SA7G, respectively. This procedure is, in effect, the transmission of information from the electromechanical circuitry through the interface to the electronic logic circuitry. The operation of relay 13LK which applied a ground potential to gate 11SRG results in the energization of that gate (if flip-flop 11INCFF is in the reset condition). The energization of gate 11SRG results in the setting of flip-flop 11SRFF whereupon the "1" output of the flip-flop changes to a "one" condition as described in Section 3.72 supra. This signal at the '1' output energizes gate 11SRPI and results in the operation of relay 11SRP. With counter 6CTR–BC in the reset condition, the output of gate 6CPOG is a "one" condition. This output is inverted in gate 62I to a "zero" condition which is applied over conductor 6CPOC to gate 11I1G. The other input to the gate from the "0" output of flip-flop 11SRFF causes a "one" condition output from gate 11I1G. Monopulser 11T1 is triggered and results in the generation of a 200 microsecond "one" condition pulse. This pulse is applied over conductor 11T1C to the four cells 16P–BC of the clock pulse generator causing them to be reset.

The inverted output of monopulser 11T1 is applied over gate 115I and conductor 11INC to all of the input gates to the shift register. Thus, at gates 5SA4G and 5SA7G, an output is produced which sets flip-flops 5SA4FF and 5SA7FF respectively. In a similar manner, flip-flops 10SB4FF and 10SB7FF are set in view of the application of ground potential from the contacts of relay 13LU0.

Thus, information representing the identification of the calling line has been transferred into the shift register at the remote unit. It will be noted that flip-flop 10BSFF is also set at this time over conductor 11INC. The energization of flip-flop 10BSFF represents the insertion of the preliminary or "start" pulse of the shift register which precedes the line identification transmission.

When flip-flop 11SRFF was set, a "zero" condition at the "0" output thereof was transmitted over conductor 11SROC to gate 16CC2G to energize that gate as well as gates 16CC1G and to energize oscillator 16K. This oscillator produces 3200 p.p.s. as described in Section 3.75 and in Section 3.3 supra. Moreover, gate 16CIG is enabled from the output of gate 16CC1G and the oscillator 16K. The output of the oscillator is inverted gate 16CIG and coupled to the input of binary cell 16P1BC. As indicated in Section 3.76, these cells change state when the inputs at terminal I change from a "one" to a "zero" condition. Since the gate 16CIG inverts the output of oscillator 16K, cell 16P1BC changes state when the oscillator changes from a "zero" condition to a "one" condition. Moreover, when oscillator 16K changes from a "zero" condition to a "one" condition, gates 16PG1G, 16PG2G and 16PG3G are disabled. When the oscillator changes from a "one" condition to a "zero" condition, the same gates are enabled permitting the binary cells 16P1BC–16P8BC to be monitored when they are in a stable condition.

The input to gate 16PG1G is such that conductor 16SPC will have a "one" condition thereon when gates 16P1BC and 16P4BC are set and when gates 16P2BC and 16P8BC are reset.

Similarly, gate 16PG2G provides a "1" output to inverter 166I when cells 16P2BC and 16P4BC are set and cells 16P1BC and 16P8BC are reset.

Moreover, it may be seen that gate 16PG3G provides a "1" output to conductor 16CAC when cells 16P1BC, 16P2BC and 16P4BC are set and cell 16P8BC is reset.

It may be shown from the binary conditions assumed by the cells that these outputs represent respectively the fifth, sixth and seventh outputs of oscillator 16K. Since, as indicater above, the oscillator operates at a 3200 p.p.s. rate and the binary cells provide a frequency division to 200 p.p.s., the period is 5 milliseconds. During each 5 milliseconds, gates 16PG1G–16PG3G provide a pulse sequence in that order. The pulses in the sequence are substantially 156 microseconds and are separated by an interval of equal amount. The output from the gate 16PG1G causes a shift register advance, from gate 16PG2G gates information into the shift register, and from gate 16PG3G advances the binary counter 6CTR-BC.

(4.3) *Transmission of line identification to office*

As explained above, the information representing calling line 00 has now been stored in the shift register and the clock circuit of FIG. 16 is operating. The first output from gate 16PG1G energizes monopulser 11T5 to produce a 10 microsecond "one" condition pulse. This causes gate 11RSG to produce a "0" output which is inverted by gate 114I and supplied over conductor 11RC to the reset input of all of the shift register stages.

Since flip-flops 10SB4FF, 10SB7FF, 5SA4FF, 5SA7FF and 10BSFF were all shown to have been storing a "one" condition, they are in consequence of the reset pulse shifted to the "zero" state while the remaining stages are unaffected. Each flip-flop which is reset, produces a transition from a "zero" condition to a "one" condition at the "0" output terminal. (See Section 3.73 supra.) This causes the associated monopulsers to produce a "1" output for a period of 26 microseconds. (See Section 3.74 supra.) This output from the monopulser is applied to the next succeeding flip-flop set input terminal. The flip-flop is not set at this time, however, since the input still remains over conductor 11RC. However, since the latter is only 10 microseconds in duration and the monopulser output is 26 microseconds, eventually the input to the reset terminal of each flip-flop is removed and the monopulser output causes the appropriate flip-flops to be reset. Thus, after the termination of the reset input, flip-flops 5SA4FF, 5SA2FF, 10SB4FF and 10SB2FF are set as well as flip-flop 100SFF. The output of flip-flop 100SFF is applied over conductor 10Q4C to the modulator gate 15MG and is inverted by gate 157I and presented to the sender circuit for remote unit 0. The application of the input to the modulator 15M results in the transmission of a signal over contacts 14OL and the send filter 15SF as well as power amplifier 15PA to the central office representing a start signal. For an explanation of the operation of the sender circuit, reference may be made to Section 3.8 supra.

It will suffice at this time to indicate that the signal is transmitted over conductors 15TSOC and 15RSOC to the receiver circuit 0 for remote unit 0 at the control unit.

This 5 millisecond mark frequency start pulse is interpreted in the control unit after passage through input transformer 20T0, limiter 20L0 and signal present detector 20SPD0.

(4.4) *Reception of line identification at office control unit*

Since the mark frequency start pulse is a valid signal, the output of the signal present detector (Section 3.25 supra) does not change. In addition, the discriminator 20D0 detects the shift from the normal space frequency to the mark frequency and the output thereof changes from a "one" condition to a "zero" condition. This causes the output of gate 20STOG to change from a "zero" condition to a "one" condition and the output of inverter 20INV3I to change from a "one" condition to a "zero" condition. When the "one" condition signal from gate 20STOG is applied to guard interval timer 20GIT0 through gate 20DMOG, the output changes from a "zero" condition to a "one" condition. As shown above (Section 3.26), the timer measures a 4.06 millisection interval and the output thereof changes from a "one" condition to a "zero" condition. Gate 20MTOG is energized and in turn energizes monopulser 20MTOMP to generate a 4.5 microsecond signal which is delivered over conductor 20MTOC and conductor 20MT0 to set flip-flop 27PPOFF. When the latter flip-flop is set, the output of gate 27PPOG shifts from a "one" condition to a "zero" condition to operate relay 27IPP and the output of gate 27SRGOG changes from a "zero" condition to a "one" condition to set flip-flop 27SR0FF.

It will be noted that the setting of flip-flop 27SR0FF indicates a service request call in remote unit 0. Had the call originated in remote unit 1, flip-flop 27SR1FF would have been set.

Gate 27SR01G enables flip-flop 27SR0FF which also effects the operation of relay 27ISR0. The latter in turn causes the operation of relay 41SR0 over an obvious path. Moreover, relay 41SRC1 operates over a path including ground, contacts of relay 27ISR0, diode 41SROC, contacts of relays 37TCF, 36RF, winding of relay 41SRC1 to negative battery. The setting of flip-flop 27SR0FF results in the disabling of gate 20DMIG (not shown) over conductor 27SROC thereby denying service to remote unit 1.

The operation of relay 41SR0, as described above, completes an operating path for relay 38OL1 which may be traced from ground, contacts of relay 41SR0, winding of relay 38OL1 to negative battery. In addition, a locking path for relay 41SR0 is completed over the contacts of relay 39RL2 and the normally open contacts of relay 41SR0.

The operation of relay 380L1 removes signal tone to the remote unit not being served.

The operation of relay 41SRC1, as described above, completes an operating path for relay 36HMF1. This path may be traced from ground, contacts of relays 41SRC1, 24ABK, winding of relay 36HM1 to negative battery. In addition, the operation of relay 41SRC1 removes battery from the call preference circuit relays of FIG. 28 at the contacts of relay 41SRC1. Relay 41PP is operated over the contacts of relays 41SRC1 and 27IPP. In addition, relay 36RTR operates if all of the relays 33T– and 33U– are normal.

The operation of relay 41SR0, as described above, completes an operating path for relay 23ESM0 or 23OSM0 through relay 29ET0 if the preselected trunk is even-numbered or relay 29OT0 if the trunk is odd-numbered. Moreover, relay 23ESM0 is operated in response to relay 29ET0 and relay 23OSM0 is operated in response to relay 29OT0.

Assuming for illustrative purposes the trunk 0 is the preselected trunk, relay 23ESM0 will be operated over a path from negative battery, winding of relay 23ESM0, contacts of relays 29ET0, 41SR0, 36HMF2, conductor 23HMKC, contacts of relays 19HMK, 39RL2 to ground. In consequence of the operation of relay 23ESM0, an operating path is closed to select level 8 as well as the level associated with the preselected relay for trunk 00, i.e., select level 0.

It will be noted that battery is connected through a resistance lamp 231 to each of the select levels to prevent any select level with a false ground from operating. If a select level fails to operate, the operating path to relay 24SMK will not be closed. As a result, the hold magnets of FIG. 24 will be prevented from operating.

When the correct select magnets (which are in the assumed illustration, 23SMOA0 and 23SMOA8 and corresponding magnets in switches B–D) are operated, a path is completed for the operation of relay 24SMK. Thereafter, a path may be traced for the operation of relay 24SMK from negative battery, winding of relay 24SMK, contacts of relays 24SMK, 29ET0, 23SM–, 23SMOA0 to ground.

When the guard interval timer 20GIT0 operates, as described above, to generate a 4.06 microsecond pulse, the flip-flop 27PP0FF is set and the output from the flip-flop is delivered to gate 27TPG to inhibit that gate and deliver preference to the service request call over any call originated in the control circuit.

The control circuit obtains preference by changing the input to gate 27TPG from a "one" condition to a "zero" condition thereby changing the output of the gate from a "zero" condition to a "one" condition and inhibiting gates 20DMOG and 20DM1G (not shown) over conductor 27TPC. Inhibition of the gates resets the guard interval timer 20GIT0 to prevent their subsequent enablement thereby inhibiting flip-flop 27PP0FF.

Preference between the two remote units is controlled by flip-flop 27SR0FF and gate 27SRGOG. When the "1" output of flip-flop 27SR0FF changes from a "zero" to a "one" condition, its application to the reset input of flip-flop 27SR1FF and to gate 27SRG1G to hold the output in the "zero" condition. This arrangement would give preference to remote unit 0 in the event of simultaneous seizure by both remote circuits. The "1" output of flip-flop 27SR1FF is connected to gate 20DNO6 to disable the gate when remote unit 1 initiates a call prior to remote unit 0.

When flip-flop 27SR0FF changed from a "zero" condition to a "one" condition, flip-flop 27OTGFF is held in the reset state.

The setting of flip-flop 27PP0FF, as described above, changes the input to monopulser 27T6MP from a "zero" condition to a "one" condition thereby generating a 10 microsecond pulse which is applied to the input of monopulser 27T4MP. The latter also generates a 10 microsecond pulse which is applied to the input to binary cell 32CTR1BC. At the conclusion of the 10 microsecond interval, the output from monopulser T4 shifts to a "zero" condition and causes the setting of cell 32CTR1BC.

The output from flip-flop 27SR0FF is applied to gate 27SROIG which latter changes from a "one" to a "zero" condition providing an output over conductor 27SRO1C to gate 21CC2G. The latter energizes gate 27CC1G and enables oscillator 21K. In addition, gate 21CIGG is also enabled. The output of gate 21CIGG is delivered to the first binary cell 21P1BC. These cells, as described for the remote unit, change state when their respective inputs at terminal I change from a "one" to a "zero" condition (see Section 3.75 supra). The gates 21PG1G, 21PG2G and 21PG3G are enabled in a manner similar to that described above for the remote unit, and gates 16PG1G–16PG3G. Here again, the gates are enabled in response to the fifth, sixth and seventh pulses from oscillator 21K.

When monopulser 20MTOMP produced a 4.5 microsecond pulse to set flip-flop 27PP0FF, as described above, it also advances the counting circuit of FIG. 21 to a state corresponding to the elapsed time measured by guard interval timer 20GIT0. Since the latter produces an output after 4.06 milliseconds, the counting circuit is set to a condition corresponding to the thirteenth pulse from oscillator 21K. Under these conditions, cells 21P1BC, 21P4BC and 21P8BC are set and cell 21P2BC is reset. In consequence, at the time oscillator 21K is energized, the binary cells are already set to a count of 13.

Since the oscillator 16K at the remote unit is also in this condition, control unit counter is in synchronism with the incoming signal and the two distant counters operate with a phase displacement determined by the transmission delay of the signals on the signaling channel.

It will be recalled that the control unit was energized in response to the reception of a 5 millisecond start pulse. This pulse was delivered through the receiver circuit 0 and over gate 20DMO1G and conductor 20DMO1C to the input to gate 27WGG. The latter gate is energized under control of gate 21PG2G and in turn controls of the operation of monopulser 27T3MP to deliver information to the shift register over conductor 27T3C to flip-flop 31SA7FF. In this manner the mark pulse is stored in the shift register.

It will be recalled that at the remote unit, the shift register had stored information in flip-flops 10SB4FF, 10SB7FF, 5SA4FF and 5SA7FF.

The shift register at the remote unit is advanced under control of oscillator 16K and the information stored therein is transmitted to the receiving circuit 0 at the remote unit where it is stored in corresponding stages of the shift register of the control unit in response to the operation of oscillator 21K. In this manner both shift registers are advanced, the shift register at the remote unit being cleared of the line identification information and the shift register at the control unit being loaded with the line identification information, it being understood that the advance of the shift register at the control unit is similar in operation to that explained for the shift register at the remote unit.

In short, the above enumerated procedure has resulted in the transmission of the identification of the calling line (assumed to be line 00) to the electronic logic circuitry at the control unit.

(4.5) *Registration of "early" dial tone start*

Referring now to the remote unit, it is seen that the operation of relay 6SEP, in consequence of the setting of flip-flop 6P11FF as described above, results in the operation of relay 4EP and relay 9SR. Relay 4EP is operated over an obvious path and relay 9SR operates over the contacts of relay 4EP and 4IC. The operation of relay 4EP resets flip-flop 100SFF over a path including positive battery, resistance 103, contacts of relay 4EP and diode 10EP1D. The last flip-flop 100SFF was set since the last bit of line information in the assumed example was a mark.

Operation of relay 9SR results in the operation of relay 13LS over a path including negative battery, winding of relay 13LS, contacts of relays 9SR, 13LK to ground. In addition, a path is completed to relay 12TRK which operates only if one of the trunk relays 9TK0–9TK7 and one of the relays 9TK8 or 9TK9 is operated. Since the selected trunk is assumed to be trunk 0, relay 9TK0 is operated. In consequence, a path may be traced for the operation of relay 12TRK from negative battery, winding of relay 12TRK, contacts of relay 9SR, contacts of relays 9TK9, 9TK8, 9TK7–9TK1, 9TK0, 14RL1, 14RL2 to ground. The previous operation of relays 9TK0 and 9TK8 is in accordance with the preselection trunk 0 as explained above.

The operation of relay 12TRK completes a path through the contacts of relays 9TK0 and 9TK8 to operate relay 9TS00 associated with the preselected trunk. Thus, relay 9TS00 is operated over a path from negative battery, winding of relay 9TS00, contacts of relays 9TK0, 9TK8, 12TRK, 12SQ1 to ground. The operation of relay 9TS00 completes a bridge through resistor 21 on the selected trunk This path may be traced from conductor T00 of FIG. 2, contacts of relay 9TS00, 9SR, resistance 21, additional contacts of relay 9TS00 to conductor R00. The purpose of this impedance bridge is to initiate transmission of the off-hook signal over the trunk conductor in order that an originating register in the central office may be summoned when the crosspoints in the control circuitry are closed thereby minimizing dial tone delay. The trunk path through the switches is opened at the contacts of relay 92S00 to prevent surges of current through the crosspoints when they close.

The operation of relay 13LS, as described above, results in the gating of line information to the register circuit (of FIG. 9) and operates the appropriate tens and units relays of the register in accordance with the operated relays representing the service requesting line. Thus, relay 9T0 is operated over a path including negative battery, winding of relay 9T0, contacts of relays 13LS and 13LT0 to ground. Similarly, relay 9U0 is operated from negative battery, winding of relay 9U0, contacts of relays 13LS, 13LU0 to ground.

When the appropriate register relays have been operated, the register check relay 12LRK is operated over a path including negative battery, winding of relay 12LRK, contacts of relays 9SR, 9T7–9T1, 9T0, 9U8–9U1 and 9U0 to ground. The operation of relay 12LRK provides a locking path for the register relays of FIG. 9.

(4.6) *Select and hold magnet operation*

At this time, the select magnets of FIG. 7 are operated through the contacts of the selected trunk relay (assumed to be relay 9TK0 and 9TK8) and the trunk check relay 12TRK. As indicated above, two select magnets, one of which is a steering level select magnet, are operated for each connection on each of the switches A–D. Thus, a path may be traced for the operation of relays 7SMA0 and 7SMA8 over a path from negative battery, resistance 71, contacts of relays 12TRK, 9TK0, winding of relay 7SMA0 to ground. An additional path may be traced over the contacts of relay 9TK8, winding of relay 7SMA8 to ground. The select magnet check relay 7SMK is operated from negative battery, resistance 72, contacts of relays 9TK8, 7SMD8, 7SMC8, 7SMB8 (not shown), 7SMA8, 7SMA0, 7SMB0, 7SMC0, 7SMD0, 9TK0, winding of relay 7SMK to ground.

Relay 7OH is operated from negative battery, winding of relay 7OH, contacts of relays 7RH, 7SMK, 8XPK1, 9SR, 12LRK to ground. As a result of the operation of relay 7OH, the operating path for the appropriate hold magnet 8HMA00 is completed from negative battery, resistance 81, contacts of relay 7OH, winding of relay 8HMA00, contacts of relays 9U0, 9T0, 7RH to ground. As indicated above in the general description, the hold magnets are of the magnetic latching type and remain operated until a pulse of reverse polarity is applied as described hereinafter. The hold magnet check relay 8HMK is operated from negative battery, winding of relay 8HMK, contacts of relays 7OH, 9T0, 9P0, 8HMA00 to ground. When the check relay 8HMK operates, a path is completed for the operation of relay 2XPK which may be traced from ground, winding of relay 2XPK, contacts of relays 7OH, 8HMK, 9TS00, sleeve conductor of the line through the crosspoint contacts, sleeve conductor of the trunk, winding of relay 2L00 to negative battery. The operation of relay 2XPK is followed by the operation of relay 8XPK1 over an obvious path. At this time, the crosspoint contacts in the remote unit linking substation 0 to trunk 0 have been closed and checked. Relay 12SQ1 operates over a path from negative battery, winding of relay 12SQ1, contacts of relays 4IC, 9SR, 8XPK1, 8HMK to ground. The operation of relay 12SQ1 results in the release of relay 9TS00 by the opening of the contacts of relay 12SQ1 in series therewith. The latter in turn causes the release of relays 2XPK, 8XPK1, and relay 2L00. The operation of relay 12SQ1 is a progress mark in the electromechanical circuit which indicates that the call has progressed through the stage of hold magnet operation.

In the interim, at the control unit the operation of relay 38TUK, described above, completes an operating path for the hold magnet associated with relays 33T0 and 33U0 which were operated in the manner described above in Section 4.3. Thus, a path may be traced for the operation of hold magnet 19HMOA00 from ground, contacts of relays 37RSD0, 28D1SO2, winding of hold magnet 19HMOA00, contacts of relays 33U0, 33T0, 28TER0, 37SD0, 41SR0, 39RL1, 24SMK, 38TUK, resistance 191 to negative battery.

As usual, the operation of the hold magnet is checked by the hold magnet check relay 19HMK over a path from negative battery, winding of relay 19HMK, contacts of relays 19HMOA00, 33U0, 33T0, 41SR0 to ground. The operation of the hold magnet check relay will result in the release of relay 23ESM0. The latter in turn causes the select magnets to release and close an operating path for relay 36TISR from negative battery, winding of relays 36TISR, 19HMK, 36HMF2, 41SRC1 to ground. In addition, a locking path is completed for relays 33U0 and 33T0 over the contacts of relay 19HMK in FIG. 33. Relay 40CT00 is operated in conjunction with the preselected trunk relay 29TK00 from negative battery, winding of relay 40CT00, contacts of relays 29TK00, 41SR0, 19HMK to ground. At this time, relay 40CTK is operated from negative battery, winding of relay 40CTK, contacts of relays 29TK00, 40CT00 to ground. Relay 36RTR releases at the contacts of relay 19HMK and in turn causes the release of relay 32IR as shown in FIG. 32. The release of relay 32IR releases relays 31SA4, 31SA7, 26SB4 and 26SB7 which were operated in the manner described above in Section 4.3. In consequence, the associated relays 41A4, 41A7, 41B4 and 41B7 are released, in turn releasing relay 24ABK.

The operation of relay 40CT00, described above, completes the connection of the line to the transmission facilities as shown by the closing of the contacts of relay 40CT00 in FIG. 17. The closure of the crosspoints in the remote unit were described above. In consequence, a complete connection extends to the calling subscriber. When an offhook condition is received from the subscriber, relay 17TS00 is operated in series with the preselected trunk. The central office proceeds with a dial tone call which may be, for example, in the manner described in Patent 2,585,904 of A. J. Busch of Feb. 19, 1952, relating to No. 5 crossbar telephone switching systems. When a ground is placed on the sleeve lead in the conventional manner, as described for example in the above-referred-to patent to A. J. Busch, relay 18TBA00 will be operated over a path from negative battery winding of relay 18TBA00, resistance 1800, diode 18TB00D, sleeve conductor of switch A through the selected crosspoints to the ground condition applied in the central office over line 00 of FIG. 22. The operation of relay 18TBA00 in this manner closes a path for the operation of relay 18TB00 over an obvious path. In addition, the winding of relay 17TS00 is short-circuited and relay 17TS00 is released.

At this juncture it may be recognized that a complete path extends to the calling subscriber and he may thereupon proceed to dial information representing the called line number into an originating register (not shown) in the central office.

Nevertheless, at this time a check is undertaken to verify that the line is connected to the correct trunk as explained in the following section.

(4.7) *Transmission of trunk information to remote unit*

When relay 36TISR operates, as described above, paths are completed for the transmission of the trunk information to the electronic logic circuitry of the control unit. Thus, a ground condition is connected through the contacts of the operated relay 41SR0, contacts of relays 29TK00, 41G1, 36TISR, conductor CI7 to the input gate of flip-flop 31SC7FF. A similar path may be traced for conductor CI4 and flip-flop 31SC4FF. Thus, trunk number is stored in the flip-flops 31SC–FF. The trunk steering level number is stored in flip-flops 26SB–FF. Specifically, the closure of the contacts of relay 29ET0 results in an input condition over conductors BI4 and BI7 to gates 26SB46 and 26SB76. As usual, the shift register stores this information in response to an input from monopulser 27T1MP over inverter 27INV1I and conductor 27INC. The operation of relay 36TISR also completes an operating path for relay 36SS from negative battery, contacts of relays 36RTR, 34RC1, 41EP, 38OLO, 36TISR, 41SRC1 to ground. The operation of relay 36SS results in the initiation of the transmission of trunk information to the remote unit as a result of the closure of the contacts of relay 36SS in FIG. 27 at the input to gate 27CKTG and the subsequent energization of oscillator 21K in the manner described above. The energization of gate 27CKTG results in the activation of monopulsers 27T1MP and 27T2MP. Moreover, the output from gate 27CKT1G is now a ground condition. Monopulser 27T2MP generates a 150 microsecond pulse which through gate 27RSG, inverter 27INV5I and conductor 27RC is applied to the reset inputs of the shift register. Monopulser 27T1MP generates a 200 microsecond pulse which gates information into the register as described above.

In the interim, gates 21CC2G and 22CC1G are enabled to generate a sequence of pulses in conjunction with oscillator 21K and gates 21PG–G that advance the shift register in the manner described above at Section 3.73. When the counter 32CTR–BC advances to a count of 22, gate 32CP22G is enabled and over conductor 32CP22–1 disables gate 21CC2G arresting oscillator 21K. In addition, relay 32IEP is operated over the contacts of relay 41SRC1 and inverter 32P22OI. The latter is an indication that the trunk identification has been transmitted to the remote unit.

(4.8) *Trunk number storage in shift register at remote unit*

It will be recalled that the trunk number is already known at the remote unit and, in fact, that a connection already extends over the preselected trunk to the control unit. Nevertheless, the remote unit receives the information representing the trunk identification as transmitted from the shift register at the control unit for checking purposes.

Thus, when the preliminary pulse is transmitted from the control unit, the guard interval timer 15GIT is operated, as described in Section 3.26, and flip-flop 11PPFF (the preliminary pulse flip-flop) is operated in a manner corresponding to its counterpart at the control unit. When flip-flop 11PPFF is set, the "1" output thereof goes from a "zero" condition to a "one" condition. Relay 11ST is operated, as a result, over inverter 11PPOI. In addition, monopulser 11T6 is energized and in turn energizes monopulser 11T4. Monopulser 11T6 remains disabled while flip-flop 11PPFF is set as described in Section 3.74. Monopulser 11T4, however, generates an output pulse when triggered by gate 16PG3G. Binary counter 6CTR1BC responds to monopulser 11T4 to change from the set condition to the reset condition and cell 6CTR2BC in turn changes from the reset condition to the set condition. This condition of the counter corresponds to the reception of the twelfth pulse from gate 16PG3G. As a result, gate 6CP11G is disabled and the output thereof is in the "zero" condition which enables gate 16CC2G over conductor 6CP11C and, in consequence, energizing oscillator 16K over gates, 16CC2G and 16CC1G. The information from the control unit is stored in the shift register at the remote unit in a manner analogous to that described for the storage of the information representing the line identification at the control unit.

When control 6CTR–BC reaches a count of 22, gate 6CP22G is enabled and over conductor 6CP22C disables gate 16CC2G as well as gate 16CC1G and oscillator 16K. In addition, relay 6SR0 is energized over inverter 6P22OI and the contacts of relay 4IC. The latter is an indication that all of the trunk information is received in the electronic logic circuitry and is awaiting transfer to the electromechanical equipment.

(4.9) *Trunk number translation and match check at remote unit*

When relay 6SR0 operates, in the manner described above, relay 4R0 is operated over an obvious path and relays 5SA4 and 5SA7 as well as relays 10SB4 and 10SB7 are operated over the contacts of relays 4R0, 12SQ2, 4IC and resistance 101 to positive battery. Relays 4A4 and 4A7, 4B4 and 4B7, are also operated over obvious paths.

Relay 14TKA is operated over the contacts of relays 12SQ2, 9SR, 14S01, winding of relay 14TKA to negative battery.

Relay 9TNK operates over a path which may be traced from negative battery, winding of relay 9TNK, contacts of relays 14TKA, 4A4, 4A7, 14TKA, 9TK8, 9TK0, 14TKA, 4B7, 4B4 to ground.

The operation of relay 9TNK is a verification that the number of the trunk received is the same as the number of the trunk utilized for the connection. Relay 12ABK operates as a check that two, and only two, of each of the relays 4A– and 4B– are operated. Thereafter, relay 12SQ3 is operated from negative battery, winding of relay 12SQ3, contacts of relays 4IC and 12ABK to ground. Operation of the latter relay is a call progress indication of the successful reception of trunk information.

(4.10) *Release of trunk register at remote unit*

When the control circuitry completes the transmission of the trunk information, as described in Section 4.7, it causes the signal pair to the remote unit to be opened at the contacts of relay 380L0 in the manner described. Since both valid signaling frequencies (mark and space) are missing, the output of the signal present detector 15SPD is changed from a "zero" condition to a "one" condition (see Section 3.25). In consequence, the output of inverter 15STAI changes from a "one" condition to a "zero" condition to operate relay 15STA. When the latter relay operates, relay 4TA is operated over an obvious path and completes a path for the operation of relay 14RL1. After the operation of relay 14RL1, relay 14RL2 is operated.

When relay 14RL1 operates, the locking path for relays 9TK0 and 9TK8 are opened at the contacts of relay 14RL1. The release of relays 9TK0 and 9TK8 results in the release of relays 12TRK, 70H, 8HMK and 7SMK. In addition, select magnets 7SMA0 and 7SMA8 are released at the contacts of the respective trunk relays 9TK0 and 9TK8.

Operation of relay 14RL2 results in the operation of relay 140L over a path from ground, contacts of relays 9SR, 4TA, additional contacts of relay 9SR, contacts of relay 14RL2, winding of relay 140L to ground.

Operation of relay 140L results in opening the signaling pair to the control unit at the contacts of relay 140L in sender circuit 0 of FIG. 15. As will be shown herein, the control unit responds by enabling the control pair to the remote unit thereby activating signal present detector 15SPD to release relay 15STA, in turn releasing relay 4TA. Release of relay 4TA results in the release of relay 14RL1.

When relay 14RL2 has operated and relay 14RL1 has released, as described, relay 14RLS is operated over the contacts of relays 14RL1 and 14RL2. Thereupon, a reset pulse is transmitted from positive battery, resistance 63, contacts of relay 14RLS, and conductor 6RLSC to reset flip-flops 11PPFF, 11SRFF, 6P11FF, as well as cells 6CTR–BC and the shift register.

When flip-flop 11PPFF resets, the output of inverter 11PPOI changes from a "zero" condition to a "one" condition and releases relay 11ST. In the interim, the resetting of the flip-flops and the shift register result in the release of the associated relays 5SA– and 10SB– as well as the corresponding relays 4A– and 4B–.

The resetting of the counter cells 6CTR–BC changes the output of gate 6CP22G from a "one" condition to a "zero" condition in turn causing the output of inverter 6P22OI to change from a "zero" condition to a "one" condition thereby releasing relay 6SR0 which in turn releases relay 4R0. When flip-flop 6P11FF is reset, the output of gate 6P11OI changes from a "zero" condition to a "one" condition to release relay 6SEP which in turn releases relay 4EP. The latter relay in releasing causes relay 9SR to release and, in consequence, relays 12SQ1–12SQ3 release as well as relay 14TKA. Release of relay 12SQ1 causes the release of relay 12LRK and removes the locking ground from relays 9T0 and 9U0 which thereupon release. The release of all the control relays in turn causes the release of relay 14RL2 which effects the release of relays 14RLS and 14OL. As usual, when relay 14OL releases, the signal pair to the control unit is again closed which serves as a signal to the control unit to complete its own release.

(4.11) *Release of electromechanical circuit at control unit*

When the remote unit opens the signal pair to the control unit at the contacts of relay 14OL, as described in the preceding section, relay 20ITA0 is operated by signal present detector 20SPD0. Subsequently, relay 41TA0 is operated over an obvious path. Relay 39RL1 operates from ground, contacts of relays 41EP, 41PP, 41SRC1, 38OL1, 38OL0, 41TA1, 41TA0, 28SDP0, 28SDP1, 39RL2, 37TM2, winding of relay 39RL2 to negative battery. Operation of relay 39RL1 releases relay 29TK00 corresponding to the selected trunk. The latter in turn causes the release of relay 29ET0. In addition, the operating path for relay 38LK0 is interrupted. Battery is removed from the hold magnet operating circuit at the contacts of relay 39RL2 as well as the call preference circuit. A locking path is completed for relay 39RL1 which checks for the release of relays 33T0, 33U0, 24SMK, 19HMK and 24ABK.

An operating path is completed for relay 28D0 from negative battery, winding of relay 28D0, contacts of relays 41SR0, 39RL1 to ground. Moreover, relay 39RL2 is operated over the contacts of relay 39TM3, contacts of relays 28DISO2 and 39RL1 to ground. Relay 37TM2 is operated over the contacts of relay 39RL1. The operation of relay 39RL2 opens the operating path of relay 39RL1 and relay 39TM3. Relay 24NK is operated over the contacts of relay 39RL2 and the contacts of previously operated relays 41A– and 41B–. In addition, the locking paths for relays 24SMK and 33T0 and 33U0 are opened at the contacts of relay 39RL2. When relays 33T0, 33U0, 19HMK, 24SMK have released and relays 39RL2 and 28D0 have operated, relay 39RL1 releases. If relay 39RL1 did not release before relay 37TM2, the operation of (slow-to-operate) relay 37TM2 opens the operating path of relay 39RL1 and operates an alarm circuit (not shown). The release of relay 39RL1 opens the operating path of relays 37TM2 and 38OL0. The release of relay 38OL0 again closes the signal pair to the remote unit which, as described in the preceding section, will cause the remote unit to close a signal pair to the control unit.

In response to the closure of the signal pair to the control unit, the signal present detector 20SPD0 again releases relay 20ITA0. When the latter relay releases, relay 41TA0 is released which in turn applies a reset signal in FIG. 32 from positive battery, resistance 324, contacts of relays 41TA0, 39RL1, 39RL2 and conductor 32RLSC to reset cells 32CTR–BC, as well as flip-flops 27PP0FF, 27SR0FF and the shift register flip-flops which were set during the call. When all flip-flops are in the normal condition, the circuit is prepared to receive additional information. The resetting of the flip-flops causes the release of relays 27IPP and 27ISR0. The release of those relays in turn causes the release of relays 41PP, 41SR0, 41SRC1 and 41EP. Release of relay 41SR0 causes the release of relay 38OL0. As seen in FIG. 39 when relay 24NK has operated and relays 41EP, 41SRC1 and 41TA0 have released, relay 39RL2 releases, in turn releasing relay 24NK. Release of relay 38OL1 again restores the connection to the remote unit not being served. Subsequently, when the remote unit serving the call normalizes, the signal pair to the control unit is completed and relay 41ITA0 releases, in turn releasing relay 41TA0.

(5) DETAILED DESCRIPTION OF TERMINATING CALL

(5.1) *Start signal to remote unit*

It will be assumed for purposes of illustration that a call is being initiated from a remote central office to subscriber 0 of FIG. 2. The call proceeds through the distant office and the local central office in the conventional manner. Ultimately, in accordance with the above-referred-to patent of A. J. Busch, a ground is placed in the central office line circuit on the sleeve conductor of line 00 of FIG. 22. This results in the operation of relay 17SL00 over the sleeve conductor, contacts of relays 28SC00, 19HMOA00, winding of relay 17SL00 to negative battery. Operation of relay 17SL00 completes a path for the operation of the identifying relays in the line lockout circuit unique to line 00 (and substation 0). Thus, relay 25LT00 is operated and completes a path for relay 25LU00.

Moreover relay 28TER0 is operated over a path from ground contacts of relays 39RL1, 39RL2, 22TGB0, 25LT00, 41TA0, 29OT0, 29ET0, 28DIS00, 28DIS10, 28D0, winding of relay 28TER0, contacts of relays 28TER0, 34Z3, 28TER1, 28TER0, 34Z3, 41SRC1, resistance 280 to negative battery.

It will be noted that the line lockout relays 25LT– and 25LU– are arranged in a chain to prevent other relays in the chain from operating after one relay has gained preference and operated. The preference chains are arranged over the contacts of relay 25Z00 to reverse preference on succeeding calls.

The operation of relay 25LU00 completes a path for relay 38LK0 to check that one, and only one, relay 25LT– and relay 25LU– have operated as shown in FIG. 38. Operation of relay 28TER0, as described above, opens a path at the contacts thereof to relays 28DIS00, 28SDP0 and 28RSDP0. Moreover, a path is completed for the operation of relay 41ATC00 from negative battery, winding of relay 41ATC00, contacts of relay 28TER0 to ground.

Operation of relay 28TER0 also completes an operating path for relay 41LI0 and extends a ground condition to the logic circuitry over gate 27TPG and the contacts of relay 38LK0. Moreover, a path is completed for the operation of relay 23ESM0 associated with line 00. Operation of relay 41LI0 completes a path through the operated relays 25LT00 and 25LU00 to the shift register circuit as seen in FIG. 30. In consequence thereof, signals are applied to conductors AI4 and AI7 as well as BI4 and BI7 to steer the identification of the called line in the corresponding shift register stages 31SA4FF, 31SA7FF, 26SB4FF and 26SB7FF. Moreover, an operating path is completed for relay 38OL1 which may be traced from negative battery, winding of relay 38OL1, contacts of relay 41ATC01 to ground. Relay 41ATC01 operated over an obvious path including the contacts of relay 41ATC00. The operation of relay 38OL1, as shown in FIG. 27, blocks service request calls from gaining preference and initiates the transmission of line information and call type to the remote circuit. In this respect it will be noted that the stages 31SC4FF and 31SC7FF were operated over conductors CI4 and CI7 and the contacts of relay 28TER0.

Operation of relay 41TCA1, as described above, completes an operating path through relays 41ATC00, 25LT00 and 25LU00 for the corresponding register relays 33T0 and 33U0. Thus, a path may be traced from ground, contacts of relays 39RL2, 41ATC00, 25LU00, 41TCA1, winding of relay 33U0 to negative battery. A corresponding path may be traced for relay 33T0.

(5.2) *Transmission of information stored in shift register*

When relays 38OL0, 41TCA1 and 38TUK have operated, additional paths are completed to the electronic logic circuitry to initiate the transmission of the information stored in the shift register. The operation of relay 38OL1, as described above, opens the signal pair to remote unit 1 which is not processing the call. The operation of relay 41ATC01 initiates the operation of the over-all timer circuit of FIG. 37. As discussed above, the operation of relay 38OL1 which opened the signal pair from the control unit to the inactive remote circuit results in the operation of the signal present detector at that remote unit which in turn is operative to remove the spacing frequency normally applied on the control pair to the control circuit. In consequence, the signal present detector 20SPD1 (not shown) detects the removal and operates relay 20ITA1 (not shown).

When flip-flop 27OTGFF is set over a path from positive battery, resistance 271, contacts of relays 38OL1, 41TCA1, 28TER0 and 38LK0, the "0" outputs thereof returns to the "zero" condition. Since the counter 32CTR–BC is in the normal condition, the output of gate 32CPOG is a "one" condition. This condition is inverted through gate 32INV6I and is delivered over conductor 32CP0–0 to the input of gate 27IGC0. As a result, the output of that gate is transferred to the "one" condition and monopulser 27T1MP is activated to gate the information into the shift register and reset all of the counters 21P–BC as described in Section 4.8. The oscillator 21K is energized under the control of gate 21CC3G and controls the gates 21PG1G through 21PG3G which in turn operate the shift register until gate 32CP16G is energized by the counter which in turn disables gate 21CC3G and arrests the operation of oscillator 21K.

As usual, when the first shift pulse is produced from gate 21PG1G, all of the information in the shift register is transferred and the output of flip-flop 31OSFF changes from a "zero" condition to a "one" condition to transmit the preliminary pulse.

The remainder of the information in the shift register is transmitted in the manner described above for a service request call. After each shift pulse is generated from gate 21PG1G, a "write" pulse is generated by gate 21P-G2G. Since the latter pulse is unnecessary at this time, the "write" gate 27WGG is inhibited by gate 27WIG which latter will block all of the "write" pulses until after gate 32CP16G is set and all the information has been transmitted from the shift register at the control circuit.

In the interim at the remote unit, the transmission of the start pulse or preliminary pulse is detected in the usual manner by the signal present detector (Section 3.25) and discriminator (Section 3.24). Gate 15STG is operated, in the manner described above, and the "one" condition signal from the gate is applied to timer 15GIT which in turn energizes gate 15MTG and monopulser 15MT to set flip-flop 11PPFF over conductor 15MTC. When the latter flip-flop is set, the input to inverter 11PPOI changes from a "one" condition to a "zero" condition to operate relay 11ST. In addition, gate 11ING is energized which in turn causes the setting of flip-flop 11INCFF. Relay 11SRP is released and relay 11SIC is operated as well as relay 4IC. Operation of these relays results in the release of relays 13LU–, 13LT– and 13LK permitting the processing of a terminating call. In consequence, if a service request call was actually in process at this time, the terminating call would be accorded preference. But, if the service request call had advanced to the identification of line information, relay 9SR would have operated to inhibit gate 11ING and prevent the setting of flip-flop 11INCFF. The time at which the starting pulse from the control unit arrives at the remote unit therefore determines the preference. If the pulse arrives before the line identification has been transmitted, the control unit obtains preference. If the pulse arrives after the line identification has been transmitted, the remote unit retains control of the call.

The setting of flip-flop 11INCFF, described above, energizes monopulser 11T6 to generate a 10 microsecond "one" condition pulse which is applied to monopulser 11T4. The latter generates a 10 microsecond "one" condition pulse which is applied to binary cell 6CTR1BC. At the end of the timing interval, the cell is set. The "zero" condition from flip-flop 11INCFF is applied to gate 16CC3G over conductor 11INCOC. Oscillator 16K is subsequently energized over gate 16CC1G in the manner described above for a service request call. The operation of the shift register in storing the information transmitted by the control unit is also similar to that described above for a service request call.

Oscillator 16K is arrested by gate 16CC3G when gate 6CP16G of the counter is energized. Thus, a path may be traced through inverter 68I, conductor 6P160C, gate 11CKT1G to gate 16CC3G. It will be noted that when the counter reached a count of 6, gate 6CP6G is energized and a signal is applied through inverter 6CP6AI and conductor 6CP6C to gate 11I6G and monopulser 11T8. The latter applies a 10 microsecond pulse to inverter 111I which in turn energizes (over conductor 11T5C) the inputs to gates 5CI–G. The other input to these gates is from the shift register flip-flops 5SA–FF. Thus, those flip-flops which are set will produce an equivalent setting in the corresponding flip-flops 5SC–FF. Since the call is a terminating call, it is assumed that flip-flops 5SC4FF and 5SC7FF will be set, in turn operating relays 5SC4 and 5SC7. When the latter relays operate, the corresponding relays 4C4 and 4C7 are operated and check relay 12CK is operated, in turn causing the operation of relay 9TER over a path including the contacts of relays 12CK, 4C4 and 4C7. Operation of relay 9TER causes relay 12TRK to operate. Relay 14SI1 is operated over an obvious path to transmit the line identification when it is received to the register.

It will be noted that the operating path for relay 12TRK included the operated contacts of relays 9TK0 and 9TK8. The latter relays were operated to identify the preselected trunk (again assumed to be trunk 0). When the trunk check relay 12TRK is operated, relay 9TS00 associated with the preselected trunk operates and opens the trunk path through the crossbar switches as shown in FIG. 2 to prevent current surges through the crosspoints when they close.

After relay 12TRK is operated, the select magnets 7SMA0 and 7SMA8 are operated in the manner described above and relay 7SMK is operated in the usual manner to verify the correct operation of the select magnets.

When the remote unit has received all of the line identification information, as indicated by the energization of gate 6CP16G, relay 6SR0 is operated through inverter 6P160I and the contacts of relay 4IC. Relay 4R0 is operated at the contacts of relay 6SR0 and the appropriate relays representing the line identification are operated, i.e., relays 5SA4, 5SA7, 10SB4 and 10SB7. Relays 4A4, 4A7, 4B4 and 4B7 are thereupon operated in the usual manner and check relay 12ABK is operated. When the latter relay is operated, as well as relay 12CK, relay 12SQ1 operates as a call progress indication indicating reception of line information as well as call type. An operating path for relay 14SO2 is now closed to steer the trunk information into the shift register as shown in FIG. 4. Since the preselected trunk is assumed to be trunk 0, information is delivered over conductors AI4, AI7, BI4 and BI7 to the corresponding shift register stages where it is stored.

The operation of relays 4A4, 4A7, 4B4 and 4B7, discussed above, completes a path through the contacts of relay 14SI1 to operate the register relays 9T0 and 9U0 in a manner similar to that discussed for a service request call. As usual, the check relay 12LRK is operated to verify that the register relays have correctly operated. The operation of the hold magnet is similar to that described in Section 4.6.

(5.3) *Select magnet operation and hold magnet operation at control unit*

In the interim at the control unit, when relay 23ESM0 is operated, as described above, the select magnets associated with the preselected trunk will operate in the manner described above for a service request call. However, if relay 24SMK fails to operate or if relay 23DSM operates, then relay 37TCF will operate.

Assuming that relay 24SMK operates in the normal manner, as described for a service request call, the appropriate hold magnets associated with the operated relays 33T0 and 33U0 will be closed, also as described above. When the hold magnet 19HMOA00 is operated, the sleeve relay 17SL00 is also operated. A ground condition is applied on the central office sleeve leads through the operated crosspoints to energize relay 18TBA00, also in the manner described for a service request call. Relay 18TB00 operates over an obvious path and the operation of the hold magnet check relay 19HMK causes the release of relay 24ESM0 which in turn releases the select magnets utilized in the call. At this time the networks at both the remote unit and the control unit are operated.

In the interim at the remote unit, when relay 12SQ2 is operated (after the hold magnet is operated) a path is completed for the operation of relay 14CKT which latter energizes gate 11CKTG to reset flip-flop 11PPFF and to trigger monopulser 11T2 which clears the line information by resetting the shift register over gates 11RSG, inverter 114I and conductor 11INC. Moreover, monopulser 11T1 is energized and over inverter 115I and conductor 11INC gates the trunk information into the shift register over conductors AI4, AI7, BI4 and BI7. The output of monopulser 11T1 resets counter 16P–BC. Gate 16CC3G is re-enabled and oscillator 16K is energized. Again, the gates 16PG1G–16PG3G are operated to advance the information in the shift register through the signaling circuit as described for a service request call. The operation continues until the counter gate 6CP27G changes from a "zero" condition to a "one" condition and disables gate 6CC3G over conductor 6CP27C. Relay 6SEP is operated over inverter 6P27OI to indicate that the trunk identification has been transmitted to the control unit.

The trunk information is stored in the control unit in a manner similar to that described for the reception of line information on the service request call with the exception that the oscillator 21K is controlled by gate 16CC3G and the counter is arrested by the energization of gate 32CP27G.

When relay 32IEP is released, in the manner described for a service request call, relay 41EP releases. At this time, relay 41PP is operated over the contacts of relays 41EP, 38TUK, 41TCA1 and 27IPP. The operation of relay 41PP completes an operating path for relay 36TIS. The operation of relay 36TIS completes a path for relay 24NK, in the manner described above, and releases relays 25LT00 and 25LU00. Relay 36TCC0 is operated over the contacts of relays 36TIS and 28TER0. Relay 380L0 is operated over the contacts of relays 36TIS and 41ATC01.

As usual, the operation of relay 380L0 opens the signal pair to the remote unit, as shown in FIG. 20, to indicate to the remote unit that the first pulse was received in the control circuit and also conditions the remote circuit for release.

The opening of the signal pair by the control unit is detected as usual in signal present detector 15SPD to cause the operation of relays 15STA and 4TA. The operation of relay 4EP after the trunk information is transmitted in conjunction with the operation of relay 4TA causes the operation of relay 140L over a path which may be traced from ground, contacts of relays 11SRP, 4TA, 4IC, 4EP, additional contacts of relay 4IC, winding of relay 140L to negative battery. The operation of relay 140L opens the signal pair to the control unit which responds by operating relay 20ITA0 as a signal to the control unit to release.

Prior thereto, the operation of relays 20ITA0 and 41TA0 completes an operating path for relay 32IR over the contacts of relay 24NK when gate 32CP27G is operated. The operation of relay 32IR completes a connection to relays 26SB– and 31SA– which operate according to the trunk information stored in the shift register. The relays which are operated in this case representing trunk 0 corresponds to relays 26B4, 26B7, 31SA4 and 31SA7. Subsequently, relay 24ABK checks the operation of these relays.

(5.4) *Trunk check on terminating call*

As indicated above, the trunk information representing the connected trunk at the remote unit has been transmitted to the control unit and stored in the register thereat. It remains now to verify that the trunk identity transmitted from the remote unit (illustratively trunk 0) is the same as the trunk stored in the register at the control unit.

The operation of relay 24ABK as described above, completes an operating path for relay 36RF which may be traced from ground, contacts of relays 36TIS, 24ABK, 41A1, 41A7, 41B4, 41B7, winding of relay 36RF to negative battery. In addition, a path is prepared for relay 37TCF and relay 23TCK.

It will be noted that relays 36RF and 37TCF are operated only in the event of a trouble condition, relay 36RF in the event of a remote circuit failure and relay 37TCF in the event of a trunk check failure.

The operation of relay 23TCK is effected from negative battery, resistance 231, contacts of relays 24ABK, 36TCC0, 40CT00, 29TK00, 36TCC0, 41B7, 41B4, 41A4, 41A7, 36TCC0, 29ET0, 23DSM, winding of relay 23TCK to ground. The operation of relay 23TCK completes a path for relay 40CT00, which in turn completes the circuit through the ring conductor of the trunk extending to the remote unit as shown in FIG. 17.

Relay 40CTK is operated from negative battery, winding of relay 40CTK, contacts of relays 29TK00, 40CT00 to ground. Select magnet 23SMOA0 is released at the contacts of relay 40CT00. The operation of relay 40CTK completes a path for the operation of relay 39RL1 which in turn opens the locking path for relay 38LK0 as well as the path for hold magnet 19HMA00. In addition, relay 28TER0 is released at the contacts of relay 39RL1. Relay 28D0 is operated as is relay 39RL2. Relay 29TK00 is released at the contacts of relay 39RL1. Release of relay 29TK00 completes a locking path for relay 40CT00.

In addition the release of relay 29TK00 opens the operating path for relay 40CTK and 29AT0.

Relay 28TER0 is released when relay 29ET0 releases and relay 28D0 operates as shown in FIG. 28. The release of relay 28TER0 effects the release of relays 41ATC00, 36TCC0, 41LI0 and causes the operation of relay 22TGB0. The release of relay 41ATC00 in turn causes the release of relays 40TCK 41TCA1. Release of the latter relay in turn effects the release of relay 24NK, 36TIS and 34RC4. Release of relay 36TIS effects the release of relay 23TCK and relay 380L0.

Operation of relay 39RL2 as described above, initiates the operation of timer relay 39TM3 and opens the hold path of relays 24SMK, 33T0 and 33U0. Release of relay 24NK interrupts the operating path for relay 24ABK. Release of relay 33T0 in turn releases relay 19HMK and the release of relay 38LK0 opens the operating path of relay 38TUK. Release of the latter relay in turn opens the operating path for relay 41PP, the release of which causes relay 36TIS to release.

Operation of relay 39RL1 completes a path for the operation of timer 37TM2. If relay 39RL1 has not released before relay 37TM2 operates, an alarm (not shown) is energized. However, if the relays associated with the locking path of relay 39RL1 have released and relay 39RL2 has operated, relay 37TM2 is prevented from operating.

As indicated above, relay 380L0 has released, thereby completing the signal control pair to the remote unit as an indication to the remote circuit to release.

At the remote unit, relays 15STA and 4TA are operated in the usual manner, and the operation of relay 41EP as described above together with the operation of relay 4TA, effects the operation of relay 140L, thereby opening the signal pair to the control unit. When the control unit closed the signal pair as described above, relay 15STA releases and relay 12SQ3 operates over a path from negative battery, winding of relay 12SQ3, contacts of relays 4IC, 4TA, 140L to ground. Operation of relay 12SQ3 indicates the successful transmission of trunk information. When relay 12SQ3 is operated, relay 14RL1 operates over a path from negative battery, resistance 142, contacts of relay 14TM2, winding of relay 14RL1, contacts of relays 14RL2, 12SQ3, 4IC, 4TA and 11ST to ground. The operation of relay 14RL1 opens the operating path of relay 9TK0 which releases, in turn releasing relays 12TRK, 20H, 8HMK and 7SMK. In addition, select magnets 7SMA0 and 7SMA8 release and relay 14RL2 operates. When the latter relay operates, relay 14RL1 releases.

The operation of relay 14RL1, in conjunction with the release of relay 14RL2, causes the operation of relay 14RLS, which in turn delivers a release signal as shown in FIG. 6 to the solid state logic circuitry over conductor 6RLSC which resets flip-flops 11PPFF, 5SC–FF and 11INCFF, as well as cells 6CTR–BC. When flip-flops 5SC–FF reset, the associated relays 5SC– and 4C–, as well as relays 9TER and 14SI1, are released. The resetting of flip-flop 11INCFF causes the release of relays 11SIC, 4IC, 12SQ1–12SQ3 and relay 14SO2. The release of relay 12SQ1, effects the release of relays 12LRK, 9T0, and 9U0. The release of the foregoing relays effects the release of relays 14RL2, 140L and 14RLS. As usual, when relay 140L is released, the path to the control unit is closed.

This transmits a signal to the control unit which releases relay 20ITA0, as an indication that the remote unit is now in the normal condition. Thereupon, the control unit proceeds to release and to return to the normal condition.

Thus, when relay 20ITA0 is released, the corresponding relay 41TA0 is released. Release of the latter relay transmits a release signal as shown in FIG. 32 to the electronic logic circuitry over conductor 32RLSC. The release of relay 41TA0 releases relays 41ATCO1 and 380L1. Since remote unit 0 is processing the call, the release of relay 380L1 completes the signal pair to the remote unit not being used on the call. The latter remote unit in turn completes its signal pair to the control unit indicating that it is in the normal condition.

The release signal to the solid state logic circuitry over conductor 32RLSC causes the resetting of flip-flops 270TGFF, 27PP0FF, the shift register flip-flops and the counter binary cells. When flip-flop 27PP0FF resets, the output of gate 27PPOG changes from a "zero" condition to a "one" condition and causes release of relay 27IPP. The release of the shift register flip-flops effects the release of the associated relays and the resetting of the counter binary cells causes the release of relay 32IR.

When the shift register output relays have released, the associated relays 41A– and 41B– release, causing the operation of relay 24NK. Release of relay 27IPP, in turn causes the release of relay 41PP which together with the release of relay 41TA0 causes the release of relay 39RL2. Release of relay 39RL2 in turn releases relay 24NK and the operation of relay 39TN3 to return the circuit to a normal condition.

When relay 20ITA1 (not shown) releases, the associated relay 41TA1 releases thereby allowing calls to be made to both remote units.

(6) DISCONNECT CALL

As indicated in the general description above, a disconnect call is initiated after each service request and terminating call in order to select a trunk for the next succeeding call. A disconnect call is initiated in the control unit when relay 28D0 is operated, as described above, and relay 22TGB0 is normal indicating an idle trunk is available. As indicated in the preceding section, relay 28D0 is operated during the release of the service request or terminating call. It is also operated when there is an attempt to establish a terminating call and a trunk has not been preselected.

Normally, after a service request call or a terminating call, all 16 trunks to the remote unit involved will be connected and a disconnect call is made to release an idle trunk. As will be explained herein in detail, the detection of two or more trunks in the released condition (evidenced by the operation of relay 40CHM0) will result in a special disconnect call which will select all of the released trunks until all 16 trunks are connected. When a special disconnect call is made the call is similar to a normal disconnect call with the exception that the hold magnet will not be released since the trunk is already released. Moreover, the trunk preference circuit will not be used since only the trunks that are released will be selected. If, during a special disconnect call, it is determined that the trunk was connected to a line and the trunk memory (relay 40CT–) was not available (indicated by the operation of relay 360HM) the appropriate hold magnet will be released.

(6.1) *Start of disconnect call*

Operation of relay 28D0 opens the operating paths to the other relays in the call preference circuit for group 0. Moreover, a path is completed for the operation of relays 28SC00 and 28DIS00. Operation of relay 28DIS00 completes a path for the operation of relay 28SCO1 and relay 28DISO1. Moreover, the preference circuit for group 1 is precluded from initiating a disconnect call. Relay 38LK0 is released at the contacts of relay 28DIS00. An operating path for relay 41ATC00 is also completed at the contacts of relay 28DIS00. The operation of relay 28SC00 opens the sleeve conductor to the line equipment at the central office as shown in FIG. 17. This results in the release of relay 17SL00 (assuming that the relays 25LT00 and 25LU00 were operated).

Operation of relay 28DISO1 completes a path for the operation of those relays 18TBA– which have an operated relay 18TB– associated therewith. The operation of a particular relay 18TB– indicates that the particular trunk is busy. The operation of relay 28DISO2 completes a path in FIG. 35 to the shift register over conductors CI0 and CI1 to register a disconnect call. Moreover, an operating path is completed for the preferred trunk relay 29TKO1 (assuming that trunk 1 is the next preselected trunk) as the trunk is idle and relay 40CHM0 is unoperated. In addition, relay 41DT1 is operated at the contacts of relay 28DISO2. Operation of the latter relay partially completes a path for extending the trunk information to the shift register as shown in FIGS. 30 and 35. Operation of relay 41ATC00 completes an operating path for relay 380L1 (not shown) which opens the control pair to the remote unit not being used on the call.

Operation of relay 41TCA1 partially completes an operating path for relays 33T0 and 33U0.

The information from the electromechanical portion of the control circuit identifying the trunk to be released is gated into the shift register in the usual manner. This information, together with a preliminary pulse, in transmitted to the remote unit. As usual, when the first shift pulse is produced the output of flip-flop 310SFF changes from a "zero" condition to a "one" condition.

At the remote unit the reception of a start pulse and the transmission of the type of call information is similar to that discussed above for a terminating call. On a disconnect call, however, relay 9D1 is operated for a normal disconnect call and relay 9D2 for a special disconnect call. The operation of relay 9D1 causes the operation of relays 9DIS0–9DIS9. The contacts of relays 9DIS0–9DIS9 interrupt the path to relays 2L00–2L09, respectively. When relay 9D is operated, the locking path for relays 9TK– is interrupted to release any such relays that have remained operated from previous calls. Relay 14SI2 is operated over an obvious path. The latter relay steers the trunk information when it is received from the control unit to the trunk register.

The transmission of the trunk information from the control unit and the reception thereof at the remote unit is in accordance with the procedure described above for a terminating call. Assuming that the trunk to be disconnected is trunk TK1, the appropriate relays 5SA– and 10SB– will be operated followed by the operation of corresponding relays 4A– and 4B–. When the latter relays are operated a path is completed through the contacts of relays 14SI2 to operate relay 9TK0. This path may be traced from negative battery, winding of relay 9TK0, contacts of relays 14SI2, 4B4, and 4B7 to ground. Since trunk 1 is the preselected trunk, relay 9TK9 is also operated over the contacts of relays 4A2 and 4A7. The operated relays 4A– determine the trunk steering level whereas the operating relays 4B– determine the trunk select level. Relay 12TRK is operated to check that relays 9TK– have operated correctly. When relay 12TRK operates, a path is completed to relay 9TSO1 associated with the trunk to be disconnected. The operation of the latter relay opens the path through the switch to prevent current surges and closes a path through the relay associated with the line connected to the trunk which is to be released. Assuming that the line is substation 17, relay 2L17 will be operated from negative battery, winding of relay 2L17, sleeve conductor of the trunk, contacts of relays 9TS00, 7RH, 7OH, and winding of relay 2XPK to ground. Both relays 2L17 and 2XPK are operated over this path. As a result of the operation of relay 2L17, the appropriate relays 13LT3 (not shown) and 13LU0 are operated. Again check relay 13LK operates in the usual manner. When the latter relay operates, relay 13LS is operated in turn causing the operation of relays 9T3 (not shown) and 9U0. Thereafter, check relay 12LRK is operated in the usual manner.

When relay 12LRK is operated, as described above, a path is completed to operate relay 7RH. This path may be traced from negative battery, winding of relay 7RH, contacts of relays 70H, 8XPK1, 9D and 12LRK to ground. Operation of relay 7RH results in the application from negative battery, resistance 82, contacts of relays 7RH, 9T1 and 9U7 of a potential to hold magnet 9HMA17 to ground, opposite in direction to that provided for operating the magnet. The reverse current through the hold magnet releases the magnet but prior thereto, relay 8HRK is shunted over the contacts of relays 70H, 9T1 and 9V7 and 8HMA17 to ground. When hold magnet 8HMA17 releases, relay 8HRK operates over the contacts of relay 7RH and resistor 85.

(6.2) *Trunk preference on a normal disconnect call*

The trunk preferred for disconnection at the control unit is determined by a combination of trunk preference relays 34TPRO1–34TPRO5 for group 0 and relays 34Z0 for group 0 and relays 34TPR11–34TPR15 and 34Z1 for group 1 (not shown) as explained in Section 3.41. After the preferred trunk has been selected, one or more of these relays operates or releases for the next call in order that a particular trunk be preferred once during 16 successive calls.

The preference circuit is arranged to operate relay 34TPRO1 initially as explained in Section 3.41 supra. Thereafter, on subsequent calls, the path may be traced from negative battery, contacts of relay 34TPRO5, winding of relay 34TPRO1, contacts of relay 34TPRO1, additional contacts of relay 34TPRO5, contacts of relays 28DISO2, 24ABK, 36TIS, 19HMK, 38TUK, 29TRK, 39RL1 to ground. Relay 34W0 operates over the contacts of relay 34TPRO1. Operation of relay 34W0 completes a path for relay 34TPRO1 through the contacts of relay 34Z0 and the contacts of relay 34W0. Operation of relay 34TPRO1 removes the shunt path from relay 34Z0 which operates.

Subsequently, the trunk identity is returned to the control circuit from the remote circuit and a sequence of operations is performed similar to that described in Section 5.4.

(6.3) *Trunk preference on a special disconnect call*

A special disconnect call is made, as explained above, in Section 3.42, when more than one trunk in a group has a released relay 40CT– associated therewith in turn causing the operation of relay 40CHM0. When one relay 40CT– is released, the current in both windings of relay 40CHM0 is balanced and the relay elements released. When two or more relays 40CT– are released, the current in the primary winding is sufficient to operate relay 40CHM0. When relay 40CHM0 is operated, those trunks which have relays 40CT– and 18TB– released will complete operating paths to the associated relays 29TK–.

Assuming that trunks 6 and 7 are released, relays 29TKO6 and 29TKO7 (not shown) will be operated in turn causing the operation of relay 29ET0 and 29OT0. It will be seen from FIG. 29 that a holding path is completed for the lowest numbered relay 29TK–, in this case relay 29TKO6. As usual, check relay 29TRK is operated. The operation of relay 29TRK initiates the transmission of trunk information to the remote unit.

(6.4) *Line identification on a special disconnect call*

Normally when a special disconnect call is made, a line will not be identified when trunk relay 29TRK operates and completes a connection through the operated trunk relay 29TKO4 to the sleeve of the trunk to be disconnected since the released relay 40CT– indicates that the trunk is released. In consequence, relay 38TUK will not be operated to provide a path to release the hold magnets.

However, if relay 40CT– had been incorrectly released and the trunk remained connected to a line, the ground applied on the sleeve conductor will operate sleeve relay 17SL– of the connected line. In addition, an operating path will be completed for the line lockout and identification relays associated with the sleeve relay unique to the line connected to the trunk being released.

The operation of the sleeve relay and the line lockout and identification relays completes an operating path for the relays 33T– and 33U– associated with the line to be identified. Thereafter, the sequence for a special disconnect call is the same as is a normal disconnect call.

The operation of relay 38LK0 completes a path for the operation of relay 38TUK. Thereupon, the operation of relay 24HM0 completes a path for releasing the hold magnets associated with the identified line in the manner described above for the remote unit hold magnets.

When the hold magnets release, the operating path for relay 19HMK is opened and relay 34TPRO3 is operated, providing that relay 34TRRO3 was priorly released and relay 34TRO2 was operated.

At the remote unit when relay 12TRK is operated, a path is completed through relays 2XPK, 7RH, 12SQ2, 9D2, and 12TRK to operate relay 8XPK2. Relay 9TSO1 is operated and completes a path through relay 2XPK when relay 12TRK is operated. Relay 2XPK will be operated when a line is connected to the trunk on a special disconnect call and thereafter, the call will follow the same sequence as for a normal disconnect call. If relay 2XPK does not operate, relay 8XPK2 will operate and complete a path to operate relay 8HRK. When the latter relay operates, a path is completed to operate relay 12SQ2 which in turn releases relays 9TSO1, 5SA– and 10SB– as well as the associated relays 4A– and 4B–. Relay 13LK– is released thereby releasing relays 13LT– and 13LU–. When relay 14CKT is operated, a ground is applied to gate 11CKTG which initiates the transmission of the trunk information in the manner described above.

The open line signals between the control unit and the remote unit are the same as those described on a terminating call. The release signal, however, does not effect the release of relays 9TU1 and 9TU9 which instead serve as the preselected trunk on the next service request or terminating call. When relay 14RL1 is operated, a path is closed through the contacts of relay D to operate relay 14RL2. The hold path for relays 9TU1 and 9TK9 is through the contacts of relay 9D and relay 14RL1.

(6.5) *Trunk check at control unit*

The trunk checking procedure is similar to that described above for a terminating call with the exception that relay 34PTRO1 is operated at the contacts of relay 24ABK. Moreover, the operation of relay 23TCK opens the operating path of relay 37TCF and closes an operating path for relay 39RL1. The operation of relay 39RL1 releases relay 38LK0 and removes battery from the hold magnets. The operating path for relays 28DIS00 and 28SC00 is opened although the hold path remains closed. Relay 28D0 is released at the contacts of relay 39RL1. The release of the latter relay causes the release of relays 28DIS00 and 28SC00. The release of the remaining control relays is similar to that described above for a terminating call as is the release of the solid state logic circuitry. When relay 41ATCO1 is released, the operating path for relay 380L1 is opened in turn completing the signal pair to the remote unit in serving the call.

Release of the relays 41A– and 41B– cause the operation of relay 24NK which in turn causes relay 39RL2 to release. The latter in turn releases relay 24NK.

(7) SERVICE DENIAL CALL

Occasionally, it becomes necessary to "deny" service to a particular customer whose line is functioning abnormally. For example, the subscriber may have received a terminating call and allowed his receiver to remain off hook.

Service may be denied to the substation serving that subscriber by initiating a service denial call from the control unit. Under these conditions, it is necessary for maintenance personnel at the central office to connect the service denial terminal of group 0 or group 1 to one of the terminals of group 0 or group 1. For illustrative purposes, it will be assumed that service should be denied to line 00.

Operation of key 18SDOK results in the operation of relay 28SDP0. The operation of the relay 28SDP0 completes an operating path for relays 28DIS00 and 28SC00. The operation of relay 28SC00 opens the sleeve conductors of all of the lines in the associated group to the central office line circuit as shown in FIG. 17. The operation of relay 28DIS00 completes a path for the operation of relay 28DISO1. Operation of the latter relay completes a locking path to those relays 18TBA– associated with all busy trunks in the group. Relay 41ATC00 is operated over the contacts of relay 28DISO1 and relay 37SD0 is operated at the contacts of relay 28DISO1.

Operation of relay 41ATC00 completes a path for the operation of relay 41TCA1 if all relays 25T– and 25U– are released. Moreover, relay 380L1 is operated over the contacts of relay 41ATC00 as well as relay 41ATC01. Operation of the latter relay starts the timing cycle of timer 37TM5 and the operation of relay 380L1 opens the signal pair to the remote unit not being served.

Operation of relay 41TCA2 completes an operating path for relay 17SL00 associated with the line to be denied service.

Operation of relay 37SD0 as described above completes a path for the transmission of service denial class information to the shift register. Thus, conductors CI1 and CI2 are energized over the contacts of relay 37SD0 to indicate a service denial call. In addition, a path is completed for the operation of relay 41LI0 as well as for relay 17SL00. The latter path may be traced from negative battery, winding of relay 17SL00, contacts of relay 19HMOA00, sleeve conductor, terminal S00, terminal SD0, key 18SD0K, contacts of relays 37SD0, 41TCA1 to ground.

Operation of relay 17SL00 initiates a sequence of operations including line identification that are similar to a terminating call with the exception that the select magnets will not be operated. The operation of relay 38TUK completes a path in FIG. 27 to the electronic logic circuitry to initiate the transmission of line information to the remote unit. Moreover, unlike a terminating call relay 17SL00 will not be released when the hold magnet operates nor will the preselected trunk be used or released. Therefore, the associated relay 40CT00 (assuming the selected trunk is trunk 0) will not operate in turn preventing relay 40CTK from operating.

The remote unit responds to the transmission of information relating to the service denial call by operating relay 9SD1 in response to the operation of relays 4C1 and 4C2. Other operations by the remote unit are similar to those for a terminating call with the exception that relays 12TRK, 9TS00, 7SMK, 14SO2, 2XPK, 8XPK1 and 2L00 are not operated. As indicated above the select magnets are not operated. Relay 7RH is operated over the contacts of relays 9SD2 and 12LRK. Thus, when the hold magnet is operated no select fingers are engaged to connect the line to a trunk. Moreover, the substation loop is opened at the contacts of relay 8HMA00. In lieu of transmitting the usual trunk signal, a check signal consisting of A digit 9 and B digit 0 is sent to the control unit.

When the control unit receives this information relays 41A2, 41A7, 41B4 and 41B7 are operated, in turn operating relay 24ABK; key 37SD0 may be released at this time to open the operating path for relay 28SDP0. Release of the latter relay causes relay 39RL1 to operate and the circuit is released in a manner similar to that for a terminating call.

(8) RELEASE SERVICE DENIAL CALL

As indicated above the loop to the substation on a service denial call is opened at the contacts of hold magnet 8HMA00 and in consequence the customer has a "dead" line i.e., no dial tone and no sidetone. When the condition necessitates, the line to the subscriber may be reclosed by personnel at the control unit through the initiating of a release service denial call. The call proceeds initially in a manner similar to that of a service denial call except that a release service denial terminal is used. Under these conditions key 37RSD0 is operated in turn operating relay 28RDP0. Thereafter the call proceeds as a disconnect call with the exception that trunk selection will not take place since relay 28DISO2 does not operate nor does relay 29TRK. Moreover, as described above, a service denial call relay 17SL00 (assuming the line is 00) will not release when the hold magnets release.

At the remote unit the circuit operation for a release service denial call is the same as for a terminating call described above with the exception that relay 9SD2 is operated instead of relay 9TER and, moreover relays 12TRK, 9TS–, 7SMK, 14SO2, 2XPK1, 8XPK1, 2L00 and the corresponding select magnets are not operated. Moreover, relay 7RH is operated over the contacts of relay 9SD2 and the hold magnet is released instead of operated. In addition, relay 8HRK operates in place of relay 8HMK and the same code if used, is a service denial call (A digit 9 and B digit 0) is sent to the control unit.

The response at the control unit to this signal is the same as that for a service denial call. It will be noted that a trunk is not preselected by a service denial call.

(9) TIMING OPERATIONS AND CHECKING CIRCUITS

The preceding description of operation assumed successful completion of each function. Various timing circuits are included which are effective in the event of abnormal operations to recycle the equipment, transmit alarms and prevent other calls from being initiated. In the event of successful call completions, the following timing and checking operations may be ignored.

(9.1) *Recycle timing*

The recycle timer associated with relay 37TM1 is similar in over-all aspect to the timer associated with relay 14RT of the remote unit. For a call originated at the control circuit, the first (longer) interval of the recycle timer is between the end of signaling to the remote unit (characterized by the operation of relay 41EP) and the reception of a reply signal from the remote end (release of relay 41EP). The second (shorter) interval is between the start of signaling from the remote end (characterized by the operation of relay 36TIS) and the operation of relay 24ABK which indicates that the information has been checked.

When the ground condition is removed from the timing circuit, the transistor timer will respond by operating after a period of time controlled by an RC network. Two timing intervals are available. The one for short timing interval being 100 to 150 milliseconds and the other for a long timing interval being 500 to 600 milliseconds.

A service request call initiates recycle timing when relay 36RTR operates. If relay 24ABK does not operate (as seen in FIG. 37) before the short timing interval, relay 37TM1 will operate to close an operating path for recycle relay 37RC1. The operation of relay 37RC1 recycles the logic circuitry at the contacts of relay 37RC1 in FIG. 32. Operation of relay 37RC1 applies a ground potential to the timing circuit coupled to relay 37TM1 to recycle the timer and cause the operation of relay 37TM1. Release of the latter relay completes an operating path for relay 37RC2 which in turn releases relay 37RC1. Release of the latter relay removes the signal condition from the electronic logic circuitry.

Subsequent operation of relay 36RTR initiates the second operation of the short timing circuit interval of the timer connected to relay 37TM1.

A terminating call to the remote unit will initiate the operation of the timing circuit when relay 41EP operates. In the manner described above, relay 37RC1 operates if relay 37TM1 is operated. Operation of relay 37RC1 effects the results described above on a service request and in addition completes an operating path for relay 37RC3. Operation of the latter relay completes a path to signal the electronic logic circuitry to return to the reset condition as shown in FIG. 32 and, in addition, opens the conductor to flip-flop 270TGFF. Moreover, the timing circuit is again grounded over the contacts of relay 37RC3 and 41TCA1 to release relay 37TM1.

Release of the latter relay completes an operating path for relay 37RC2 over the contacts of relay 37RC1. Operation of relay 37RC2 causes the release of relay 37RC1 which in turn removes the recycle signal from the electronic logic circuitry in FIG. 32. Release of relay 37RC1 effects the transmission of the information stored in the electronic logic circuitry to the remote unit and release of relay 37RC3. If the remote unit fails to receive the correct information, a trouble signal will be returned instead of trunk information to operate relay 36RF. The latter relay is operated by the transmission of signals from the remote unit effective to operate relays 41A1, 41A7, 42B4 and 41B7. Operation of relay 36RF results in the printing of a trouble record by means not shown herein as not essential to the present invention followed by a trouble release.

A terminating call to the remote unit initiates the second interval of timing for short timing interval for relay 37TM1 when relay 36TIS operates. If relay 24ABK does not operate before the end of the timing interval relay 37TM1 operates. Release of relay 41TIS (due to recycling of the electronic circuit) causes the timer associated with relay 37TM1 to recycle and release relay 37TM1. Relay 37RC2 operates and releases relay 37RC1. A subsequent operation of the timer and relay 37TM1 completes a path to relay 37RC2 which effects the printing of a trouble record. Operation of the latter relay will complete an operating path for relay 37RC1 which in turn will cause the operation of relay 37RC4 over the contacts of relay 41PP. Operation of relay 37RC4 transmits a signal to the electronic logic circuitry to recycle to clock phase 16 as shown in FIG. 32. Moreover, the battery potential is kept from relays 25LT– of the group being served (by the contacts of relay 41TIS) and an operating path provided for relay 380L0 (assuming that group 0 is being served).

(9.2) *Timing for release of relay 39RL1*

This function is performed by the timing circuit associated with relay 37TM2. If relay 39RL1 does not release before the operate time of relay 37TM2 the latter relay will operate which opens the operating path of relay 380L0 (assuming that remote unit 0 is being served) and opens the operating path of relay 39RL1. Relay 39RL2 is operated over the contacts of relay 37TM2.

(9.3) *Timing for release of relay 39RL2*

If relay 39RL2 is not released, relay 39TM3 will release to effect the release of relay 39RL2 by means not shown herein as not essential to an understanding of the present invention.

(9.4) *Over-all timer*

The operation of relay 41ATC00, 41ATCO1 or 41SRC1 will start the operation of the over-all timer circuit associated with relay 37TM5. If the call is not completed before 12 to 14 seconds relay 37TM5 will operate. The operation of the relay will result in the operation of relay 39RL1.

(9.5) *Hold magnet failure relays*

A service request call operates relay 36HMF1 when relay 41SCR1 is operated over the contacts of relay 24ABK. When relay 24ABK operates the operating path for slow release relay 36HMF1 is open. If relay 19HMK does not operate prior to the release interval of relay 36HMF1 a path is completed for relay 36HMF2 over the contacts of relay 36HMF. Operation of relay 36HMF2 opens the operating path for relay 36TISR and closes an operating path for relay 36SS. In addition the contacts of relay 36HMF2 in FIG. 35 connect a ground contact to the shift register conductors to transmit a trouble signal to the remote unit.

(9.6) *Trunk check failure relay*

When the information received from the remote relay has been checked on a two-out-of-five basis as determined by relay 24ABK on a terminating call an operating path is closed for slow-to-operate relay 37TCF. If the trunk check is not completed, within the time to operate relay 37TCF, the operation of that relay will cause a trouble record to be made by facilities not shown herein but well known in the art followed by a trouble release.

Operation of relay 23DSM opens the operating path for relay 23TCK which in turn causes relay 37TCF to operate and generate the same sequence of operation as described above.

(9.7) *Hold magnet timing*

If a trouble release occurs on a disconnect or service denial call, relay 39HMT operates when the hold magnets are closed and relay 19HMK has operated. The operating path for relay 39HMT remains closed until relay 40CTK is operated. Slow-to-release relay 39HMT releases thereafter and completes a path to operate relay 39RL1. This interval assures that the hold magnets have sufficient time to build up the magnetic field which keeps the hold magnets magnetically latched.

(9.8) *Trunk overflow circuit*

When all trunks are busy in group 0, relay 22TGB0 is operated. When all trunks are busy in group 1 relay 22TGB1 (not shown) is operated for group 1. A terminating call effects the operation of the respective relays 17SL–, 25LT– and 25LU– as described above. However, the associated relay 28TER0 or 28TER1 will not operate in view of the contacts of relay 22TGB– in series therewith. However, a path will be available through the contacts of the operated relays 22TGB–, 25LU– and 17SL– to apply a call progress tone on the ring conductor of the line appearance and to connect the tip and ring conductors to tube TBG0 to trip ringing. When the central office equipment is released ground will be remade from the sleeve conductor in turn causing the release of relay 17SL– and the associated relays 25LT– and 25LU–.

(10) PREFERENCE CONTROL

The preference between terminating calls and service request calls is controlled by the logic circuitry. If a service request call obtains preference relay 27ISR0 is operated in turn causing the operation of relay 41SRC1 which removes battery from the preference relays in FIG. 28.

If simultaneous disconnect and terminating calls occur the operation of relay 28TER0 or relay 28TER1 will remove battery from the preference relays for other calls and the terminating call will obtain preference. The operation of relay 28D0 or the corresponding relay for group 1 will prevent service denial calls from gaining preference and will prevent the operation of relay 28TER0 or 28TER1.

(10.1) *Terminating preference*

When relays 34W3 and 34Z3 are in the normal condition group 0 will be preferred. The operation of relay 28TER0 closes an operating path for relay 34W3 and a shunt path to prevent relay 34Z4 from operating. Operation of relay 34W3 closes an operating path for relay 34Z3. When relay 28TER0 releases the shunt path of relay 34Z3 is removed causing that relay to operate. Operation of relay 34Z3 changes the preference of the groups and allows group 1 to be preferred. This cycle of operation of relays 34W3 and 34Z3 prevents a failure in one group from affecting calls to the other group.

(10.2) *Line lockout preference*

If relays 34W4 and 25Z00–25Z03 are normal the preference in group 0 for relays 25LT– is from relay 25LT00 to 25LT07. The preference for relays 25LU– is from 25LU00 to 25LU09. When relay 41ATC00 operates on the first call an operating path is completed for relay 34W4. When relay 36TIS operates a path is completed for relay 25Z00. With relay 25Z00 operated, the preference in group 0 is from 25LT07 to 25LT00 and since relay 25Z01 is normal, the preference is from 25LU09 to 25LU00. When relay 41ATC0 operates on the next call a shunt path is completed which causes relay 34W4 to release. Operation of relay 36TIS closes an operating path for relay 25Z01. Operation of the latter relay changes the preference in group 0 from relay 25LU09 to relay 25LU00 and the previously operated relay 25Z00 retains the preference of 25LT07 to 25LT00. When relay 41ATC00 operates on the next call an operating path for relay 34W4 is completed. Operation of relay 36TIS causes the release of relay 25Z00. When only relay 25Z1 is operated the preference in group 0 is from 25LT00 to 25LT07 and from 25LU09 to 25LU00.

On the following call the operation of relay 41ATC00 causes the release of relay 34W4. Subsequent operation of relay 36TIS releases relay 25Z01 and the preference returns to that described initially. This cycle continues and prevents one line from denying service to any other line.

The preference arrangement for group 1 although not shown is similar to that described above.

(10.3) *Trunk group busy*

The operating path for relay 22TGB0 is closed when all of the trunk busy relays 18TB– in the group are operated. Operation of relay 22TGB0 closes the path to the line overflow circuit in FIG. 22 and prevents the operation of relay 28TER0. In addition, relays 28DIS00 and 28SC00 are prevented from operating.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator system including a telephone central office, a plurality of remote substation lines, a lesser plurality of trunks extending from said office, remote switching means for coupling said lines to said trunks under control of said office, and means in said remote switching means responsive to signals from said office indicative of the selection of a particular trunk for connection to a service requesting line for connecting said line to said trunk and transmitting to said office the identity of said connected trunk.

2. A telephone line concentrator system including a telephone central office, a plurality of remote substation lines, a plurality of line terminations in said office individual to said lines, a lesser plurality of trunks extending from said office, remote concentrator means for connecting said lines to said trunks, means at said office effective on a terminating call to a called one of said lines for coupling a particular trunk to said termination of said called line, and means responsive to signals from said concentrator means indicative of the connection of a particular trunk to said called line for comparing the identity of said particular trunk transmitted by said remote concentrator means with the identity of said particular trunk connected to said called line termination at said office.

3. A telephone line concentrator system including a telephone central office, a plurality of remote substation lines, a lesser plurality of trunks extending from said office, remote switching means for connecting said lines to said trunks under control of said office, means in said central office for preselecting a particular trunk to be used on a subsequent connection, means in said office for transmitting said particular trunk identity to said remote switching means, means in said remote switching means effective in response to a service request call at one of said substations for coupling said particular trunk to said line, additional means for transmitting said particular trunk identity from said office to said remote switching means, and comparator means at said remote switching means for checking the identity of the actual trunk connected to said service requesting line with the identity transmitted from said office to verify that the correct trunk has been connetced.

4. A telephone line concentrator system including a telephone central office, a plurality of remote substation lines, line terminations in said office individual to said lines, a lesser plurality of trunks extending from said office, remote switching means for connecting said lines to said trunks under control of said office, trunk selecting means for preselecting a predetermined trunk for connection to a line on a subsequent call, means in said office responsive to a terminating call to one of said lines for transmitting said called line identity to said remote switching means and for connecting said predetermined trunk to said called line termination, means in said remote switching means for transmitting the trunk identity of said predetermined trunk to said office, and comparator means in said office for comparing said trunk identity transmitted from said remote switching means with the identity of said trunk actually connected to said called line termination at said office.

5. A telephone line concentrator system including a plurality of remote substation lines, a telephone central office, a lesser plurality of trunks extending from said office, remote switching means for connecting said lines to said trunks under control of said office, means at said remote switching means and said office for storing the identity of a preselected trunk for use on a succeeding connection, a plurality of line terminations in said office individual to said substation lines, means in said office effectve in response to a terminating call to a called one of said substation lines for coupling said preselected trunk to said line termination individual to said called line in said office, means at said remote switching means for coupling said called line to said preselected trunk and for transmitting signals indicative of the identity of said trunk to said office, and comparator means in said office responsive to the reception of said signals for comparing said transmitted trunk identity with the identity of said trunk connected to said called line termination to verify that said line and called line termination are connected to the same trunk.

6. A remote telephone line concentrator switching system including a telephone central office, a plurality of remote substation lines, a plurality of trunks extending from said office, remote switching means for connecting said lines to said trunks under control of said office, register means at said remote switching means and at said office for storing the identity of a preselected trunk for use in a succeeding calling connection, a plurality of line terminations at said office individual to said lines, means at said office effective in response to a service request calling condition on a calling one of said substation lines for connecting said preselected trunk to said line termination individual to said calling line and for transmitting signals representative of said trunk identity to said remote switching means, means at said remote switching means for connecting said calling line to said preselected trunk under control of said register means, and comparator means at said remote switching means effective in response to the reception of said trunk identity signals for comparing the identity of said trunk connected to said calling line with the identity of said trunk transmitted from said office.

7. A telephone line concentrator system including a plurality of remote substation lines, a telephone central office, a plurality of trunks fewer in number than said lines extending from said office, a remote unit, trunk register means in said remote unit and said central office for storing signals indicative of the identity of a preselected trunk for use on a succeeding connection, shift register means in said remote unit and said central office for storing signals transmitted therebetween, a plurality of line terminations in said office individual to said lines, means at said office and said remote unit effective in response to a calling condition on one of said lines for connecting said calling line and said termination individual to said calling line to said preselected trunk, means at said central office for storing the identity of said preselected trunk in said shift register at said office and for transmitting said trunk identity to said shift register at said remote unit, and comparator means at said remote unit jointly responsive to said shift register means at said remote unit and said trunk register means at said remote unit for verifying that said calling line and said termination individual to said calling line are connected to said preselected trunk.

8. A telephone line concentrator system in accordance with claim 7 including in addition means at said central office and at said remote switching means effective in response to a terminating call to a called one of said lines for connecting said called line and said termination individual to said called line to said preselected trunk, means in said remote switching means for thereafter transferring signals indicative of the identity of said trunk to said shift register thereat, means for transmitting said identity to said shift register at said office, and comparator means at said office jointly responsive to said shift register means and to said trunk register means for verifying that said called line and said called termination are connected to the same trunk.

9. A telephone line concentrator system including a telephone central office, a plurality of remote substation lines, a lesser plurality of trunks extending from said office, remote switching means for coupling said lines to said trunks, means at said office for selecting a particular trunk for connection to one of said lines and for transmitting the identity of said trunk to said remote switching means, means at said remote switching means for connecting said one line to said particular trunk and for transmitting the identity of said trunk actually connected to said line to said central office, and means at said central office for comparing the identity of said trunk actually connected with the identity of said preselected trunk.

10. A telephone line concentrator system including a telephone central office, a plurality of remote substation lines, a lesser plurality of trunks extending from said office, a remote unit, remote switching means at said remote unit for coupling said lines to said trunks under control of said office, a plurality of line terminations at said office individual to said lines, means in said office for maintaining all of said trunks except a preselected trunk connected between said lines and line terminations, means effective in response to a service request condition at a calling one of said substations for coupling said preselected trunk to said calling line at said remote switching means and to said calling line termination at said office, and means at said office for thereafter transmitting the identity of said preselected trunk to said remote unit for comparison with the identity of said trunk actually connected at said unit.

11. A telephone line concentrator system including a telephone central office, a plurality of remote substation lines, a lesser plurality of trunks extending from said office, remote switching means for coupling said lines to said trunks under control of said office, a plurality of line terminations individual to said lines at said office, delayed disconnect means effective in response to service request and terminating calls to maintain all of said trunks except a preselected trunk coupled between said lines and respective line terminations after the conclusion of said calls, means effective on a terminating call to a called one of said substations for coupling said preselected trunk to said called line and called line termination, and means at said remote switching means for thereafter transmitting the identity of said preselected trunk to said office for comparison with the trunk actually connected to said line termination at said office.

12. A telephone line concentrator system including a telephone central office, a plurality of remote substation lines, a plurality of trunks extending from said office, a remote unit, remote switching means at said remote unit for coupling said lines to said trunks under control of said office, a plurality of line terminations at said office individual to said lines, means at said office and at said remote switching means effective on a calling condition at one of said lines for coupling a preselected trunk to said line at said remote switching means and to said respective termination at said office to complete a path between said line and said office, and means effective after the completion of said path for transmitting from said central office to said remote unit the identity of said trunk coupled to said line termination at said office for verification comparison with the identity of said trunk coupled to said line at said remote switching means.

13. A universal telephone line concentrator system including a telephone central office, a plurality of remote substation lines, a plurality of trunks extending from said office, remote switching means for coupling said lines to said trunks under control of said office, a plurality of line terminations individual to said lines at said office, trunk identity checking means at said remote switching means including a trunk check relay, means effective on a calling condition at one of said lines for completing a connection over a preselected trunk at said remote switching means and at said office between said calling line and said calling line termination, means at said office effective subsequent to the completion of said connection for transmitting said preselected trunk identity to said remote switching means, and means including said trunk check relay means for comparing the transmitted identity of said trunk with the identity of said trunk actually connected at said remote switching means.

14. A data set concentrator system including a telephone central office, a plurality of remote data lines, a plurality of trunks extending from said office, a remote unit, remote switching means at said remote unit for coupling said lines to said trunks under control of said office, a plurality of line terminations individual to said lines at said office, said remote switching means including a plurality of vertical and horizontal conductive paths, means for connecting said lines to said vertical paths, means for connecting said trunks to said horizontal paths, signaling means at said remote unit and at said office for transmitting control signals therebetween, said signaling means including shift register means, receiving means and transmitting means, means at said office effective in response to an originating call at one of said lines for coupling said line to said corresponding line termination over a preselected idle trunk, additional means at said office for thereafter storing the identity of said preselected trunk in said shift register means at said office, additional means for actuating said shift register means to control said transmitting means at said office to transmit said identity to said receiving means at said remote unit, and means at said remote unit responsive to the reception of said identity in said receiving means for storing said identity in said shift register means at said remote unit.

15. A data set concentrator system in accordance with claim 14 including in addition trunk register means at said remote unit, means for transferring said trunk identity from said shift register to said trunk register means, trunk check relay means, and comparator means jointly responsive to the operation of said trunk register means and to the identity of said preselected trunk actually connected to said data line for operating said trunk check relay means to verify that said line is connected to the correct trunk.

16. A data set concentrator system in accordance with claim 15 wherein said trunk register means includes a plurality of relays individual to the tens and units designations of preselected trunks and a further plurality of relays individual to said horizontal conductive paths, and additional means coupling the contacts of said relays in circuit with said trunk check relay.

17. A data line concentrator system including a plurality of data lines, a telephone central office, a plurality of trunks extending from said office, a remote unit, remote switching means at said remote unit for coupling said lines to said trunks under control of said office, a plurality of line terminations in said office individual to said lines, said switching means including a plurality of crossbar switches having horizontal and vertical conductive paths, means connecting said lines to said vertical conductive paths, means for coupling said trunks to said horizontal conductive paths, means for preselecting a predetermined trunk for utilization on a succeeding originating and terminating connection, means for storing the identity of said predetermined trunk at said remote unit and at said office, signaling means at said remote unit and said office including electronic shift register means, transmitting means and receiving means at said remote unit and said office, means at said office effective on a terminating call to a called one of said lines for coupling said line to said corresponding line termination at said office, additional means effective subsequent to the coupling of said line to said line termination for effecting the transmission of the identity of said preselected trunk connected to said line from said remote unit to said office including means for storing said preselected trunk identity in said shift register means, additional means effective in response to said trunk identity stored in said shift register means for actuating said transmitting means at said remote unit to transmit said identity to said receiving means at said office, and means at said office effective in response to the reception of said identity by said receiving means for transferring said identity to said electronic shift register at said office.

18. A data line concentrator system in accordance with claim 17 including in addition trunk check relay means at said office, comparator means at said office jointly responsive to the trunk identity stored in said shift register means and to the trunk identity of said preselected trunk connected to said line termination for verifying that said line termination and said preselected trunk are correctly interconnected.

19. A telephone line concentrator system including a telephone central office, a plurality of remote substation lines, a lesser plurality of trunks extending from said office, remote switching means for coupling said lines to said trunks under control of said office, signaling means for transferring control signals between said remote switching means and said office, a control channel coupling said signaling means, means in said signaling means for transmitting mark and space frequencies and for maintaining said space frequency on said channel during intervals between the transmission of control signals, and means at said central office and said remote switching means for governing said signaling means to remove said mark and space frequencies from said control channel to transmit supervisory indications therebetween.

20. A telephone line concentrator system including a telephone central office, a plurality of remote substation lines, a plurality of trunks extending from said office, remote switching means for coupling said lines to said trunks under control of said office, signaling means at said remote switching means and said office, a control channel coupling said signaling means, means in said signaling means for applying mark and space frequency signals to said channel to transmit the identities of said lines and trunks, means at said remote switching means effective on a calling condition at one of said lines for governing said signaling means to transmit said calling line identity over said control channel, control means responsive to the reception of said line identity for coupling said line to a preselected trunk, and means effective in response to the release of said control means in said central office for governing said signaling means to remove said mark and space frequency signals from said channel to indicate the release of said equipment at said office.

21. A telephone line concentrator system in accordance with claim 20 including in addition means at said remote switching means responsive to said removal of said mark and space frequencies for governing said signaling means at said remote switching means to remove said mark and space frequencies from said control channel.

22. A telephone line concentrator system in accordance with claim 21 wherein said control channel includes a pair of control trunks for unidirectional transmission of mark and space frequency signals between said remote switching means and said office.

References Cited

UNITED STATES PATENTS

| | | | |
|---|---|---|---|
| 3,190,968 | 6/1965 | Krom | 179—18.3 |
| 3,206,553 | 9/1965 | Lucas et al. | 179—18.3 |

KATHLEEN H. CLAFFY, *Primary Examiner.*

L. A. WRIGHT, *Assistant Examiner.*